US011392830B2

(12) United States Patent
Ozcan et al.

(10) Patent No.: US 11,392,830 B2
(45) Date of Patent: Jul. 19, 2022

(54) DEVICES AND METHODS EMPLOYING OPTICAL-BASED MACHINE LEARNING USING DIFFRACTIVE DEEP NEURAL NETWORKS

(71) Applicant: THE REGENTS OF THE UNIVERSITY OF CALIFORNIA, Oakland, CA (US)

(72) Inventors: Aydogan Ozcan, Los Angeles, CA (US); Yair Rivenson, Los Angeles, CA (US); Xing Lin, Los Angeles, CA (US); Deniz Mengu, Los Angeles, CA (US); Yi Luo, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 8 days.

(21) Appl. No.: 17/046,293

(22) PCT Filed: Apr. 12, 2019

(86) PCT No.: PCT/US2019/027275
§ 371 (c)(1),
(2) Date: Oct. 8, 2020

(87) PCT Pub. No.: WO2019/200289
PCT Pub. Date: Oct. 17, 2019

(65) Prior Publication Data

US 2021/0142170 A1 May 13, 2021

Related U.S. Application Data

(60) Provisional application No. 62/657,405, filed on Apr. 13, 2018, provisional application No. 62/703,029,
(Continued)

(51) Int. Cl.
*G06N 3/08* (2006.01)
*G02B 5/18* (2006.01)
(Continued)

(52) U.S. Cl.
CPC ............ *G06N 3/08* (2013.01); *G02B 5/1866* (2013.01); *G02B 27/4205* (2013.01);
(Continued)

(58) Field of Classification Search
CPC ........... G06N 3/08; G06N 3/04; G06N 3/082; G06N 3/0675; G06N 3/084; G02B 5/1866;
(Continued)

(56) References Cited

U.S. PATENT DOCUMENTS 4,963,725 A * 10/1990 Hong .................... G06N 3/067
359/107
5,080,464 A * 1/1992 Toyoda .................. G06V 10/88
359/107
(Continued)

OTHER PUBLICATIONS

Bagherian, H. et al., On-Chip Optical Convolutional Neural Networks, arXiv:1808.03303v2 [cs.ET] Aug. 16, 2018.
(Continued)

*Primary Examiner* — Juan A Torres
(74) *Attorney, Agent, or Firm* — Vista IP Law Group LLP

(57) ABSTRACT

An all-optical Diffractive Deep Neural Network ($D^2NN$) architecture learns to implement various functions or tasks after deep learning-based design of the passive diffractive or reflective substrate layers that work collectively to perform the desired function or task. This architecture was successfully confirmed experimentally by creating 3D-printed $D^2NNs$ that learned to implement handwritten classifications and lens function at the terahertz spectrum. This all-optical deep learning framework can perform, at the speed of light, various complex functions and tasks that
(Continued)

computer-based neural networks can implement, and will find applications in all-optical image analysis, feature detection and object classification, also enabling new camera designs and optical components that can learn to perform unique tasks using $D^2$NNs. In alternative embodiments, the all-optical $D^2$NN is used as a front-end in conjunction with a trained, digital neural network back-end.

32 Claims, 38 Drawing Sheets

Related U.S. Application Data filed on Jul. 25, 2018, provisional application No. 62/740,724, filed on Oct. 3, 2018.

(51) Int. Cl.

| | |
|---|---|
| ***G02B 27/42*** | (2006.01) |
| ***G06K 9/62*** | (2022.01) |
| ***G06N 3/04*** | (2006.01) |
| ***G06V 10/94*** | (2022.01) |
| ***G06V 10/147*** | (2022.01) |

(52) U.S. Cl.

CPC ......... *G02B 27/4277* (2013.01); *G06K 9/628* (2013.01); *G06K 9/6256* (2013.01); *G06N 3/04* (2013.01); *G06V 10/147* (2022.01); *G06V 10/95* (2022.01)

(58) Field of Classification Search

CPC ............ G02B 27/4205; G02B 27/4277; G06K 9/6256; G06K 9/628; G06V 10/147; G06V 10/95; G03H 2240/24; G03H 1/0244; G03H 1/26

USPC .......................................................... 382/158

See application file for complete search history.

(56) References Cited

U.S. PATENT DOCUMENTS

| | | | | |
|---|---|---|---|---|
| 5,095,459 | A | 3/1992 | Ohta et al. | |
| 5,255,362 | A * | 10/1993 | Brandstetter .......... | G06V 10/10 382/158 |
| 5,440,671 | A * | 8/1995 | Shiratani .............. | G06N 3/0675 708/801 |
| 5,842,191 | A | 11/1998 | Stearns | |
| 6,445,470 | B1 | 9/2002 | Jenkins et al. | |
| 7,512,573 | B2 * | 3/2009 | Martinez ................ | G06N 3/067 706/15 |
| 10,217,023 | B1 * | 2/2019 | Rubin .................. | G06N 3/0675 |
| 11,017,309 | B2 * | 5/2021 | Roques-Carmes .. | G06N 3/0454 |
| 2010/0209830 | A1 | 8/2010 | Carcasi et al. | |
| 2017/0351293 | A1 | 12/2017 | Carolan et al. | |

OTHER PUBLICATIONS

Brunner, D. et al., Parallel photonic information processing at gigabyte per second data rates using transient states, Nature Communications, 4:1364, DOI: 10.1038/ncomms2368, www.nature.com/naturecommunications, Publication Year 2013.

Bueno, J. et al., Reinforcement Learning in a large scale photonic Recurrent Neural Network, arXiv:1711 05133v2 [cs.NE] Nov. 15, 2017.

Chakraborty, I. et al., Toward Fast Neural Computing using All-Photonic Phase Change Spiking Neurons, arXiv:1804.00267v2 [cs.ET] Aug. 28, 2018.

Chang, J. et al., Hybrid optical-electronic convolutional neural networks with optimized diffractive optics for image classification. Scientific Report (2018) 8:12324, DOI: 10.1038/s41598-018-30619-y.

Chen, Y. et al., Deep Learning-Based Classification of Hyperspectral Data, IEEE Journal of Selected Topics in Applied Earth Observations and Remote Sensing, vol. 7, No. 6, Jun. 2014.

Cignoni, P. et al., MeshLab: an Open-Source Mesh Processing Tool, Eurographics Italian Chapter Conference (2008).

Farhat, N. H. et al., Optical implementation of the Hopfield model, May 15, 1985, vol. 24, No. 10, Applied Optics, 1469-1475.

Girshick, R. et al., Rich feature hierarchies for accurate object detection and semantic segmentation Tech report (v5), arXiv:1311.2524V5 [cs.CV] Oct. 22, 2014.

Golik, P. et al., Cross-Entropy vs. Squared Error Training: a Theoretical and Experimental Comparison, Human Language Technology and Pattern Recognition, Computer Science Department, RWTH Aachen University, 52056 Aachen, Germany (2013).

Grischkowsky, D. et al., Far-infrared time-domain spectroscopy with terahertz beams of dielectrics and semiconductors, J. Opt. Soc. Am. B/vol. 7, No. 10/Oct. 1990.

Hermans, M. et al., Trainable & Dynamic Computing: Error Backpropagation Through Physical Media, arXiv:1407 6637v1 [cs.NE] Jul. 24, 2014.

Hughes, T.W. et al., Training of photonic neural networks through in situ backpropagation, arXiv:1805.09943v1 [physics.optics] May 25, 2018.

Kazhdan, M. et al., Screened Poisson Surface Reconstruction, ACM Transactions on Graphics, vol. VV, No. N, Article XXX, Publication date: 2013.

Khorasaninejad, M. et al., Metalenses at visible wavelengths: Diffraction-limited focusing and subwavelength resolution imaging, sciencemag.org, SCIENCE, Jun. 3, 2016, vol. 352, Issue 6290, 1190-1194.

Kildishev, A. V. et al., Planar Photonics with Metasurfaces, Science 339, 1232009 (2013). DOI: 10.1126/science.1232009.

Kingma, D. P. et al., ADAM: A Method for Stochastic Optimization, arXiv:1412.6980v9 [cs.LG] Jan. 30, 2017.

Lecun, Y. et al., GradientBased Learning Applied to Document Recognition, Proc. of the IEEE, Nov. 1998 (46 pages).

Lin, X. et al., All-optical machine learning using diffractive deep neural networks, Science 361, 1004-1008 (2018), Sep. 7, 2018.

Psaltis, D. et al., Optical information processing based on an associative-memory model of neural nets with thresholding and feedback, Optics Letters, vol. 10, No. 2, Feb. 1985.

Psaltis, D. et al., Adaptive optical networks using photorefractive crystals, Applied Optics, vol. 27, No. 9, May 1, 1988.

Shastri, B. et al., Principles of Neuromorphic Photonics, arXiv:1801.00016v1 [cs.ET] Dec. 29, 2017.

Shen, Y. et al., Deep Learning with Coherent Nanophotonic Circuits, arXiv:1610.02365v1 [physics.optics] Oct. 7, 2016.

Srivastava, N. et al., Dropout: A Simple Way to Prevent Neural Networks from Overfitting, Journal of Machine Learning Research 15 (2014) 1929-1958 Submitted 11/13; Published Jun. 2014.

Tang, Y. et al., Deep Learning using Linear Support Vector Machines, arXiv:1306.0239v4 [cs.LG] Feb. 21, 2015.

Trabelsi, C. et al., Deep Complex Networks, arXiv:1705.09792v4 [cs.NE] Feb. 25, 2018.

Wagner, K. et al., Multilayer optical learning networks, Dec. 1, 1987, vol. 26, No. 23, Applied Optics, 5061-5076.

Wan, Li et al., Regularization of Neural Networks using DropConnect, Proceedings of the 30 th International Conference on Machine Learning, Atlanta, Georgia, USA, 2013.

Wang, Z. et al., Image Quality Assessment: From Error Visibility to Structural Similarity, IEEE Transactions on Image Processing, vol. 13, No. 4, Apr. 2004.

Weverka, R. T. et al., Fully interconnected, two-dimensional neural arrays using wavelength-multiplexed volume holograms, Optics Letters, vol. 16, No. 11, Jun. 1, 1991.

Xiao, Y. et al., Nonlinear Metasurface Based on Giant Optical Kerr Response of Gold Quantum Wells, ACS Photonics, 5(5), May 1, 2018, DOI:10.1021/acsphotonics.7b01140.

Yin, X. et al., Artificial Kerr-type medium using metamaterials, Apr. 9, 2012, vol. 20, No. 8, Optics Express, 8543-8550.

PCT International Search Report for PCT/US2019/027275, Applicant: The Regents of the University of California, Form PCT/ISA/210 and 220, dated Aug. 19, 2019 (5 pages).

(56) References Cited

OTHER PUBLICATIONS

PCT Written Opinion of the International Search Authority for PCT/US2019/027275, Applicant: The Regents of the University of California, Form PCT/ISA/237, dated Aug. 19, 2019 (9 pages).
Javidi, B. et al., Optical implementation of neural networks for face recognition by the use of nonlinear joint transform correlators, Applied Optics, vol. 34, No. 20, Jul. 10, 1995, 3950-3962.
Jutamulia, S. et al., Overview of hybrid optical neural networks, Optics & Laser Technology, vol. 28, No. 2, pp. 59-72, 1996.
Psaltis, D. et al., Holography in artificial neural networks. Nature. 343, 325-330 (1990).
Soures, N. et al., Neuro-MMI: A Hybrid Photonic-Electronic Machine Learning Platform. In 2018 IEEE Photonics Society Summer Topical Meeting Series (SUM); 2018; pp. 187-188.
Ku, F. T. S., II Optical Neural Networks: Architecture, Design and Models. In Progress in Optics; Wolf, E., Ed.; Elsevier, 1993; vol. 32, pp. 61-144.
Yu, F. et al., Flat optics with designer metasurfaces. Nature Materials. 13, 139-150 (2014).
Caulfield, H.J. et al., Optical Neural Networks. Proc. IEEE 1989, 77 (10), 1573-1583.
PCT International Preliminary Report on Patentability (Chapter 1 of the Patent Cooperation Treaty) for PCT/US2019/027275, Applicant: The Regents of the University of California, Form PCT/IB/326 and 373, dated Oct. 22, 2020 (11 pages).

* cited by examiner

"Conventional"

All-Optical

| | $\Delta_z = 40\times\lambda$ | $\Delta_z = 4\times\lambda$ |
|---|---|---|
| Phase only | 97.18 | 94.12 |
| Complex | 97.81 | 96.01 |

Hybrid Systems

| # of detectors | Optical Modulation | Digital Neural Networks | | | | | | | | | |
|---|---|---|---|---|---|---|---|---|---|---|---|
| | | Single FC Layer | | 2C2F-1 | | LeNet | | 2C2F-64 | | ResNet | |
| 10 | Phase only | 97.65 | 93.12 | N/A | N/A | N/A | N/A | N/A | N/A | N/A | N/A |
| | Complex | 98.02 | 95.96 | N/A | N/A | N/A | N/A | N/A | N/A | N/A | N/A |
| 10×10 | Phase only | 98.71 | 98.21 | 98.12 | 97.62 | 98.42 | 98.25 | 98.55 | 98.23 | N/A | N/A |
| | Complex | 98.29 | 98.20 | 98.35 | 97.60 | 98.59 | 98.25 | 98.56 | 98.31 | N/A | N/A |
| 25×25 | Phase only | 98.80 | 96.89 | 97.83 | 98.26 | 98.77 | 98.10 | 98.86 | 98.13 | N/A | N/A |
| | Complex | 98.64 | 97.50 | 98.37 | 98.14 | 98.62 | 98.10 | 98.57 | 98.18 | N/A | N/A |
| 50×50 | Phase only | 98.82 | 98.07 | 98.50 | 97.88 | 98.65 | 97.93 | 98.92 | 98.35 | 98.97 | 98.09 |
| | Complex | 98.81 | 97.99 | 98.17 | 98.22 | 98.56 | 98.06 | 98.63 | 98.32 | 98.54 | 98.11 |

Imaging Optics Based Classification Systems

| # of detectors | Single FC Layer | 2C2F-1 | LeNet | 2C2F-64 | ResNet |
|---|---|---|---|---|---|
| 10×10 | 91.50 | 89.73 | 98.36 | 98.18 | N/A |
| 25×25 | 92.91 | 95.50 | 98.83 | 98.99 | N/A |
| 50×50 | 92.44 | 97.13 | 98.95 | 99.04 | 99.53 |

*FIG. 34*

All-Optical

| | $\Delta_z = 40\times\lambda$ | $\Delta_z = 4\times\lambda$ |
|---|---|---|
| Phase only | 88.57 | 85.69 |
| Complex | 88.94 | 88.29 |

Hybrid Systems

| # of detectors | Optical Modulation | Digital Neural Networks | | | | | | | | | |
|---|---|---|---|---|---|---|---|---|---|---|---|
| | | Single FC Layer | | 2C2F-1 | | LeNet | | 2C2F-64 | | ResNet | |
| 10 | Phase only | 88.88 | 87.76 | N/A | N/A | N/A | N/A | N/A | N/A | N/A | N/A |
| | Complex | 89.57 | 88.40 | N/A | N/A | N/A | N/A | N/A | N/A | N/A | N/A |
| 10×10 | Phase only | 90.04 | 88.84 | 89.55 | 88.83 | 90.24 | 89.19 | 90.08 | 89.76 | N/A | N/A |
| | Complex | 89.96 | 88.88 | 89.26 | 89.43 | 90.24 | 89.55 | 89.92 | 89.88 | N/A | N/A |
| 25×25 | Phase only | 90.08 | 88.75 | 89.87 | 89.02 | 89.96 | 89.20 | 89.84 | 89.66 | N/A | N/A |
| | Complex | 90.25 | 88.57 | 89.94 | 89.50 | 89.79 | 89.64 | 89.75 | 89.83 | N/A | N/A |
| 50×50 | Phase only | 90.22 | 89.43 | 89.42 | 89.72 | 89.71 | 89.24 | 89.66 | 90.30 | 89.20 | 89.43 |
| | Complex | 89.54 | 89.45 | 90.11 | 89.79 | 89.74 | 89.76 | 89.29 | 90.45 | 89.29 | 89.40 |

Imaging Optics Based Classification Systems

| # of detectors | Single FC Layer | 2C2F-1 | LeNet | 2C2F-64 | ResNet |
|---|---|---|---|---|---|
| 10×10 | 81.20 | 76.83 | 87.44 | 88.11 | N/A |
| 25×25 | 84.47 | 81.76 | 90.19 | 91.6 | N/A |
| 50×50 | 84.49 | 87.11 | 90.33 | 91.9 | 93.46 |

*FIG. 35*

All-Optical

| | $\Delta_z = 40\times\lambda$ | $\Delta_z = 4\times\lambda$ |
|---|---|---|
| Phase only | 97.18 | 94.12 |
| Complex | 97.81 | 96.01 |

Hybrid Systems

| | | Digital Neural Networks | | | | | | | | | |
|---|---|---|---|---|---|---|---|---|---|---|---|
| # of detectors | Optical Modulation | Single FC Layer | | 2C2F-1 | | LeNet | | 2C2F-64 | | ResNet | |
| 10 | Phase only | 97.65 | 93.12 | N/A | N/A | N/A | N/A | N/A | N/A | N/A | N/A |
| | Complex | 98.02 | 95.96 | N/A | N/A | N/A | N/A | N/A | N/A | N/A | N/A |
| 10×10 | Phase only | 98.23 | 98.17 | 98.22 | 97.98 | 98.31 | 98.53 | 98.93 | 98.32 | N/A | N/A |
| | Complex | 98.07 | 98.51 | 97.87 | 98.16 | 98.42 | 98.56 | 99.00 | 98.42 | N/A | N/A |
| 25×25 | Phase only | 98.28 | 98.06 | 98.47 | 98.25 | 98.70 | 98.34 | 98.75 | 98.36 | N/A | N/A |
| | Complex | 98.33 | 97.90 | 98.45 | 98.39 | 98.37 | 98.74 | 98.92 | 98.55 | N/A | N/A |
| 50×50 | Phase only | 98.22 | 98.36 | 98.57 | 98.45 | 98.42 | 98.49 | 98.88 | 98.46 | 98.38 | 99.02 |
| | Complex | 98.35 | 98.19 | 98.32 | 98.49 | 98.71 | 98.45 | 99.07 | 98.13 | 98.43 | 99.16 |

Imaging Optics Based Classification Systems

| # of detectors | Single FC Layer | 2C2F-1 | LeNet | 2C2F-64 | ResNet |
|---|---|---|---|---|---|
| 10×10 | 91.50 | 89.73 | 98.36 | 98.18 | N/A |
| 25×25 | 92.91 | 95.50 | 98.83 | 98.99 | N/A |
| 50×50 | 92.44 | 97.13 | 98.95 | 99.04 | 99.53 |

*FIG. 36*

All-Optical

| | $\Delta_z = 40\times\lambda$ | $\Delta_z = 4\times\lambda$ |
|---|---|---|
| Phase only | 89.13 | 85.98 |
| Complex | 89.32 | 88.54 |

Hybrid Systems

| # of detectors | Optical Modulation | Digital Neural Networks: Single FC Layer | | 2C2F-1 | | LeNet | | 2C2F-64 | | ResNet | |
|---|---|---|---|---|---|---|---|---|---|---|---|
| 10 | Phase only | 88.40 | 85.54 | N/A | N/A | N/A | N/A | N/A | N/A | N/A | N/A |
| | Complex | 88.69 | 88.84 | N/A | N/A | N/A | N/A | N/A | N/A | N/A | N/A |
| 10×10 | Phase only | 88.67 | 89.90 | 89.05 | 88.95 | 88.66 | 89.56 | 89.12 | 88.79 | N/A | N/A |
| | Complex | 88.82 | 89.60 | 89.02 | 88.93 | 89.25 | 89.68 | 89.46 | 89.51 | N/A | N/A |
| 25×25 | Phase only | 88.88 | 89.37 | 88.71 | 88.63 | 88.27 | 89.64 | 89.16 | 88.50 | N/A | N/A |
| | Complex | 89.45 | 89.82 | 89.06 | 88.80 | 89.03 | 89.79 | 89.47 | 88.99 | N/A | N/A |
| 50×50 | Phase only | 88.98 | 89.55 | 88.23 | 88.39 | 88.28 | 89.20 | 88.99 | 88.79 | 88.22 | 88.94 |
| | Complex | 89.34 | 89.84 | 88.94 | 88.55 | 87.81 | 89.27 | 89.32 | 88.99 | 88.59 | 88.98 |

Imaging Optics Based Classification Systems

| # of detectors | Single FC Layer | 2C2F-1 | LeNet | 2C2F-64 | ResNet |
|---|---|---|---|---|---|
| 10×10 | 81.20 | 76.83 | 87.44 | 88.11 | N/A |
| 25×25 | 84.47 | 81.76 | 90.19 | 91.6 | N/A |
| 50×50 | 84.49 | 87.11 | 90.33 | 91.9 | 93.46 |

*FIG. 37*

DEVICES AND METHODS EMPLOYING OPTICAL-BASED MACHINE LEARNING USING DIFFRACTIVE DEEP NEURAL NETWORKS

RELATED APPLICATIONS

This Application is a U.S. National Stage filing under 35 U.S.C. § 371 of International Application No. PCT/US2019/027275, filed Apr. 12, 2019, which claims priority to U.S. Provisional Patent Application No. 62/657,405 filed on Apr. 13, 2018, U.S. Provisional Patent Application No. 62/703,029 filed on Jul. 25, 2018 and U.S. Provisional Patent Application No. 62/740,724 filed on Oct. 3, 2018, which are hereby incorporated by reference. Priority is claimed pursuant to 35 U.S.C. §§ 119, 371 and any other applicable statute.

TECHNICAL FIELD

The technical field generally relates to an optical deep learning physical architecture or platform that can perform, at the speed of light, various complex functions and tasks that current computer-based neural networks can implement. The optical deep learning physical architecture or platform has applications in image analysis, feature detection, object classification, camera designs, and other optical components that can learn to perform unique functions or tasks.

BACKGROUND

Deep learning is one of the fastest-growing machine learning methods, and it uses multi-layered artificial neural networks implemented in a computer to digitally learn data representation and abstraction, and perform advanced tasks, comparable to or even superior than the performance of human experts. Recent examples where deep learning has made major advances in machine learning include medical image analysis, speech recognition, language translation, image classification, among others. Beyond some of these mainstream applications, deep learning methods are also being used for solving inverse imaging problems.

Optics in machine learning has been widely explored due to its unique advantages, encompassing power efficiency, speed and scalability. Yu et al., for example, describe different types of optical neural networks that are formed as liquid-crystal televisions (LCTV)-based optical neural networks, compact optical neural networks, mirror-array interconnected neural networks, and optical disk-based neural networks. See Yu et al., Optical Neural Networks: Architecture, Design and Models. In Progress in Optics; Wolf, E., Ed., Elsevier, 1993, Vol. 32, pp 61-144. Some of the earlier work include optical implementations of various neural network architectures to perform specific tasks. For example, Javidi et al. describe the optical implementation of neural networks for face recognition by the use of nonlinear joint transform correlators. See Javidi et al., Optical Implementation of Neural Networks for Face Recognition by the Use of Nonlinear Joint Transform Correlators. *Appl. Opt.* 1995, 34 (20), 3950-3962. Optical-based neural networks have the advantage that they can perform various complex functions at the speed of light.

SUMMARY

In one embodiment, an all-optical deep learning framework or architecture is disclosed where the neural network is physically formed by multiple layers of diffractive surfaces that work in collaboration with one another to optically perform an arbitrary function that the digital version of the network can statistically learn. Thus, while the inference/prediction of the physical network is all-optical, the learning part that leads to the design of the physical network embodiment is done through a computer. This framework is described sometimes herein as Diffractive Deep Neural Network ($D^2NN$) and demonstrates its inference capabilities through both simulations and experiments. A $D^2NN$ can be physically created by using several transmissive and/or reflective substrate layers, where individual points or small regions located on a given physical layer either transmits or reflects the incoming wave, representing an artificial "neuron" that is connected to other "neurons" of the subsequent or following layers through optical diffraction. A $D^2NN$ encompasses structures that have only transmissive substrate layers, only reflective substrate layers, as well as combinations of transmissive and reflective substrate layers.

In one embodiment, the artificial neurons are created by physical features that are formed on a surface of or within a substrate. These physical features may be used alter phase and/or amplitude of the light wave that is transmitted through or reflected by the substrate. In some embodiments, the physical features that form the various neurons that exist in a given layer may include different thicknesses of material used in the substrate. In other embodiments, the physical features used to form the neurons may include different material compositions or material properties formed at discrete locations used in the substrate. These different physical features that form the physical "neurons" in the substrate may be formed, in some embodiments, as an array of discrete regions or areas that are located across the two- or three-dimensional surface of the physical substrate layers. In one particular embodiment, the physical features are created by additive manufacturing techniques such as 3D printing but it should be appreciated that other techniques such as lithography or the like may be used to generate the "neurons" in the different layers.

In one embodiment, an all-optical diffractive deep neural network device includes a plurality of optically transmissive substrate layers arranged in an optical path, each of the plurality of optically transmissive substrate layers including a plurality of physical features formed on or within the plurality of optically transmissive substrate layers and having different complex-valued transmission coefficients as a function of lateral coordinates across each substrate layer, wherein the plurality of optically transmissive substrate layers and the plurality of physical features thereon collectively define a trained mapping function between an input optical image or input optical signal to the plurality of optically transmissive substrate layers and an output optical image or output optical signal created by optical diffraction through the plurality of optically transmissive substrate layers. The device includes one or more optical sensors configured to capture the output optical image or output optical signal resulting from the plurality of optically transmissive substrate layers.

In another embodiment, an all-optical diffractive deep neural network device includes a plurality of optically reflective substrate layers arranged along an optical path, each of the plurality of optically reflective substrate layers including a plurality of physical features formed on or within the plurality of optically reflective substrate layers, wherein the plurality of optically reflective substrate layers and the plurality of physical features collectively define a trained mapping function between an input optical image or input optical signal to the plurality of optically reflective substrate layers and an output optical image or output optical signal from the plurality of optically reflective substrate layers. The device includes one or more optical sensors configured to capture the output optical image or output optical signal from the plurality of optically reflective substrate layers.

In another embodiment, an all-optical diffractive deep neural network device includes a plurality of substrate layers positioned along an optical path, the plurality of substrate layers having one or more optically reflective substrate layers and one or more optically transmissive substrate layers including a plurality of physical features formed on or within the respective optically reflective substrate layer(s) and optically transmissive substrate layer(s), wherein the plurality of substrate layers collectively define a trained mapping function between an input optical image or input optical signal to the plurality of substrate layers and an output optical image or output optical signal from the plurality of substrate layers. The device further includes one or more optical sensors configured to capture the output optical image or output optical signal from the plurality of substrate layers.

In another embodiment, an all-optical diffractive deep neural network device includes a plurality of substrate layers positioned along an optical path, the plurality of substrate layers having one or more optically reflective substrate layers and/or optically transmissive substrate layers including a plurality of physical features formed on or within the respective optically reflective substrate layer(s) and/or optically transmissive substrate layer(s), at least one of the plurality of substrate layers including spatial light modulator(s) therein or thereon, wherein the plurality of substrate layers collectively define a trained mapping function between an input optical image or input optical signal to the plurality of substrate layers and an output optical image or output optical signal from the plurality of substrate layers. The device includes one or more optical sensors configured to capture the output optical image or output optical signal from the plurality of substrate layers.

In another embodiment, a method of forming an all-optical multi-layer diffractive network includes training a software-based deep neural network to perform one or more specific optical functions for a multi-layer transmissive and/or reflective network having a plurality of optically diffractive or optically reflective physical features located in different two dimensional locations in each of the layers of the network, wherein the training comprises feeding an input layer of the multi-layer network with training images or training optical signals and computing an optical output of the network through optical transmission and/or reflection through the multi-layer network and iteratively adjusting complex-valued transmission and/or reflection coefficients for each layer of the network until optimized transmission/reflection coefficients are obtained. A physical embodiment of the multi-layer transmissive or reflective network is then manufactured that includes a plurality of substrate layers having physical features that match the optimized transmission/reflection coefficients obtained by the trained deep neural network.

In another embodiment, a method of using an all-optical multi-layer transmissive and/or reflective network includes providing a multi-layer transmissive and/or reflective network having a plurality of substrate layers positioned along an optical path, the plurality of substrate layers including one or more optically reflective and/or optically transmissive substrate layers, wherein the plurality of substrate layers collectively define a trained mapping function between an input optical image or input optical signal to the plurality of substrate layers and an output optical image or output optical signal from the plurality of substrate layers. An object is illuminated with a light source to create the input optical image or input optical signal that is directed to the plurality of substrate layers positioned along the optical path. The output optical image or output optical signal is captured from the plurality of substrate layers with one or more optical sensors.

In another embodiment, a hybrid optical and electronic neural network-based system includes an all-optical front-end having a plurality of optically transmissive substrate layers arranged in an optical path, each of the plurality of optically transmissive substrate layers including a plurality of physical features formed on or within the plurality of optically transmissive substrate layers having different complex-valued transmission coefficients as a function of lateral coordinates across each substrate layer, wherein the plurality of optically transmissive substrate layers and the plurality of physical features collectively define a trained mapping function between an input optical image or input optical signal to the plurality of optically transmissive substrate layers and an output optical image or output optical signal created by optical diffraction through the plurality of optically transmissive substrate layers. The system includes one or more optical sensors configured to capture the output optical image or output optical signal resulting from the plurality of optically transmissive substrate layers. The system further includes a trained, digital neural network configured to receive as an input the output optical image or output optical signal resulting from the plurality of optically transmissive substrate layers and output a final output optical image or final output optical signal.

In another embodiment, a hybrid optical and electronic neural network-based system includes an all-optical front-end having a plurality of optically reflective substrate layers arranged along an optical path, each of the plurality of optically reflective substrate layers including a plurality of physical features, wherein the plurality of optically reflective substrate layers and the plurality of physical features thereon collectively define a trained mapping function between an input optical image or input optical signal to the plurality of optically reflective substrate layers and an output optical image or output optical signal from the plurality of optically reflective substrate layers. The system includes one or more optical sensors configured to capture the output optical image or output optical signal from the plurality of optically reflective layers. The system further includes a trained digital neural network configured to receive as an input the output optical image or output optical signal resulting from the plurality of optically reflective substrate layers and output a final output optical image or final output optical signal.

In another embodiment, a method of forming an optical-based multi-layer deep neural network includes training a software-based deep neural network to perform a specific function or task using a multi-layer transmissive and/or reflective network having a plurality of neurons located in each of the layers, wherein the training comprises feeding an input layer of the multi-layer network with training images or signals and computing an output of the network through optical transmission and/or reflection through the multi-layer network and iteratively adjusting the complex-valued transmission and/or reflection coefficients for the neurons of each layer of the network until optimized transmission/reflection coefficients are obtained, wherein the optimized transmission/reflection coefficients are obtained by parameterization of neuron transmission and/or reflection values and error back-propagation. A physical embodiment of the multi-layer transmissive and/or reflective network is then manufactured that includes a plurality of substrate layers having physical features corresponding to the neurons that match the optimized transmission/reflection coefficients obtained by the trained deep neural network.

BRIEF DESCRIPTION OF THE DRAWINGS

FIG. 15A illustrates the confusion matrix and the energy distribution percentage for numerical testing results for 10,000 different handwritten digits (~1,000 for each digit), achieving a classification accuracy of 91.75% using a 5-layer design.

FIG. 19A illustrates the confusion matrix and the energy distribution percentage for numerical testing results for 10,000 different fashion products (~1,000 per class), achieving a classification accuracy of 81.13% using a 5-layer design.

FIGS. 20A, 20C show the amplitude and phase information of the wave that is propagating within a $D^2NN$, trained for amplitude imaging. The object was composed of 3 Dirac-delta functions spread in x direction. FIGS. 20B, 20D show the same except without the $D^2NN$. 'L' refers to each diffractive layer of the network. FIGS. 20C and 20D also show the cross-sectional view along the z direction indicated by the dashed lines in FIGS. 20A, 20B, respectively.

FIG. 30A shows a convergence curve and confusion matrix for a phase-only, fully-connected $D^2NN$ ($\Delta_Z$=40λ) design. FIG. 30B illustrates a convergence curve and confusion matrix for a phase-only, partially-connected $D^2NN$ ($\Delta_Z$=4λ) design. FIGS. 30C and 30D are counterparts of FIGS. 30A and 30B, respectively, for complex-modulation $D^2NN$ designs, where both the amplitude and phase of each neuron are trainable parameters.

FIG. 30A shows a convergence curve and confusion matrix for a phase-only, fully-connected $D^2NN$ ($\Delta_Z$=40λ) design. FIG. 30B illustrates a convergence curve and confusion matrix for a phase-only, partially-connected $D^2NN$ ($\Delta_Z$=4λ) design. FIGS. 30C and 30D are counterparts of FIGS. 30A and 30B, respectively, for complex-modulation $D^2NN$ designs, where both the amplitude and phase of each neuron are trainable parameters.

FIG. 34 illustrates blind testing accuracies (reported in percentage) for all-optical ($D^2NN$ only), $D^2NN$ and perfect imager-based hybrid systems used herein for MNIST dataset. In the $D^2NN$-based hybrid networks reported here, 5 different digital neural networks spanning from a single fully-connected layer to ResNet-50 were co-trained with a $D^2NN$ design, placed before the electronic neural network. All the electronic neural networks used ReLU as the nonlinear activation function, and all the $D^2NN$ designs were based on spatially and temporally coherent illumination and linear optical materials, with 5 diffractive layers. Different shaded columns refer to $\Delta_Z$=40×λ and $\Delta_Z$=4×λ, respectively.

FIG. 35 illustrates blind testing accuracies (reported in percentage) for all-optical ($D^2NN$ only), $D^2NN$ and perfect imager-based hybrid systems used herein for Fashion-MNIST dataset. In the $D^2NN$-based hybrid networks reported here, 5 different digital neural networks spanning from a single fully-connected layer to ResNet-50 were co-trained with a $D^2NN$ design, placed before the electronic neural network. All the electronic neural networks used ReLU as the nonlinear activation function, and all the $D^2NN$ designs were based on spatially and temporally coherent illumination and linear materials, with 5 diffractive layers. Different shaded columns refer to $\Delta_Z$=40×λ and $\Delta_Z$=4×λ, respectively. For the results reported in the all-optical part of this table, Fashion-MNIST objects were encoded in the amplitude channel of the input plane.

FIG. 36 illustrates blind testing accuracies (reported in percentage) for all-optical ($D^2NN$ only), $D^2NN$ and perfect imager-based hybrid systems used for MNIST dataset. The $D^2NN$ and 5 different digital neural networks were jointly-trained at the same time from scratch. All the electronic neural networks used ReLU as the nonlinear activation function, and all the $D^2NN$ designs were based on spatially and temporally coherent illumination and linear materials, with 5 diffractive layers. Different shaded columns refer to $\Delta_Z$=40×λ and $\Delta_Z$=4×λ, respectively.

FIG. 37 illustrates blind testing accuracies (reported in percentage) for all-optical ($D^2NN$ only), $D^2NN$ and perfect imager-based hybrid systems used herein for Fashion-MNIST dataset. The $D^2NN$ and 5 different digital neural networks were jointly-trained at the same time from scratch. In addition, the objects were encoded in the phase channel (0-2π) at the input plane. All the electronic neural networks used ReLU as the nonlinear activation function, and all the $D^2NN$ designs were based on spatially and temporally coherent illumination and linear materials, with 5 diffractive layers. Different shaded columns refer to $\Delta_Z$=40×λ and $\Delta_Z$=4×λ, respectively.

FIG. 38A illustrates the first stage of the hybrid system training. FIG. 38B illustrates the second stage of the hybrid system training starts with the already trained diffractive layers (first 5 layers) from FIG. 38A and an electronic neural network, replacing the operations after intensity detection at the sensor. Note that the spherical waves between the consequent layers in FIG. 38A and FIG. 38B illustrate free space wave propagation.

DETAILED DESCRIPTION OF THE ILLUSTRATED EMBODIMENTS

Figure 1:
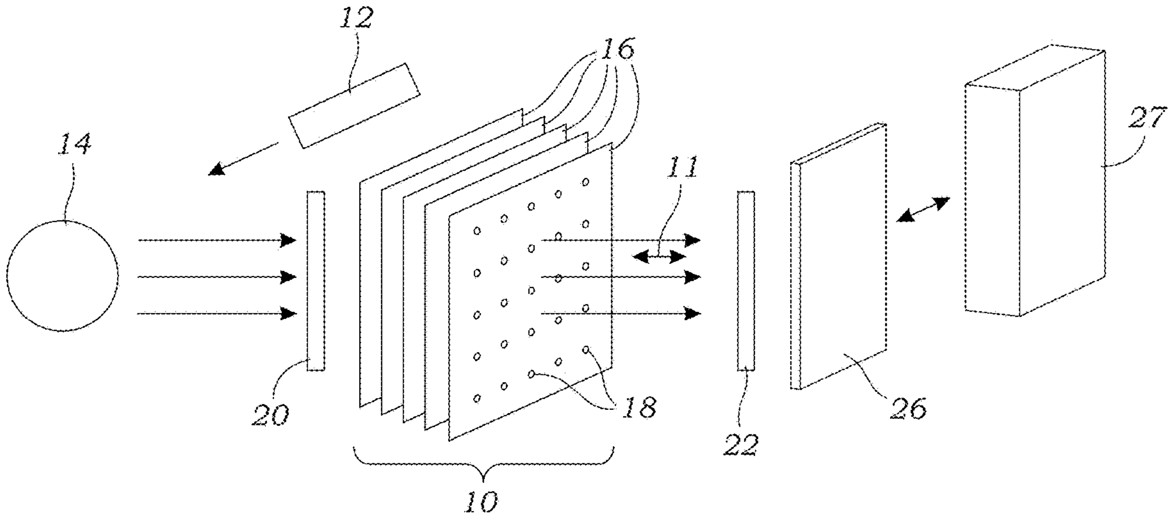
FIG. 1 schematically illustrates one embodiment of a $D^2NN$ that is used in transmission mode according to one embodiment. A source of light (which may be natural or artificial) directs light onto an object which reflect (or passes through the object in other embodiments) and is directed through the $D^2NN$. In this mode, light passes through the individual substrate layers that form the $D^2NN$. The light that passes through the $D^2NN$ is then detected by an optical detection device (e.g., optical sensor).

FIG. 1 schematically illustrates one embodiment of a Diffractive Deep Neural Network $D^2NN$ 10 that is used in transmission mode according to one embodiment. A source of light 12 directs light onto an object 14 (or multiple objects 14) which reflects and is directed through the $D^2NN$ 10. The object 14 may be macro-sized (i.e., large such as those visible without magnification) in some embodiments. In other embodiments, for example, for microscopic applications, the object(s) 14 may be very small (e.g., microscopic). The $D^2NN$ 10 contains a plurality of substrates 16 that form layers (referred to herein sometimes as substrate layers 16) which may be formed as a physical substrate or matrix of optically transmissive material (for transmission mode) or optically reflective material (for reflective mode one or more materials in the $D^2NN$ 10 form a reflective surface). Exemplary materials that may be used for the substrate layers 16 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same.

While FIG. 1 illustrates light reflecting off the object 14, in other embodiments the light passes through the object 14 and is then directed through the $D^2NN$ 10 along an optical path 11. In still other embodiments, the object 14 may emit fluorescent light or emissive radiation in response to the light from the source of light 12. For example, the source of light 12 may act as an excitation light source and the $D^2NN$ 10 receives fluorescent light that is emitted from the object 14. The source of light 12 may include a natural light source such as the sun. The source of light 12 may also include an artificial light source such as a laser, light bulb, light emitting diode (LED), laser diode, and the like. The source of light 12 may produce coherent light, incoherent light, or partially coherent light. In some instances, the source of light 12 may be filtered prior to illuminating the object 14. The source of light 12 that illuminates the object 14 may have any number of wavelengths including visible light (e.g., light with a wavelength in the range of about 380 nm to about 740 nm) as well as light outside the perception range of humans. For example, the wavelength operating range may extend beyond the visible perception range of humans (e.g., from about 300 nm to about 1,000 nm). The long wavelength light used in the experiments described herein was used due to the coarse resolution of the physical features 18 contained in the layers 16 during the 3D printing process used to fabricate the $D^2NN$ 10. Shorter wavelengths of light may be used for $D^2NN$ 10 with smaller physical feature 18 sizes.

Figure 2:
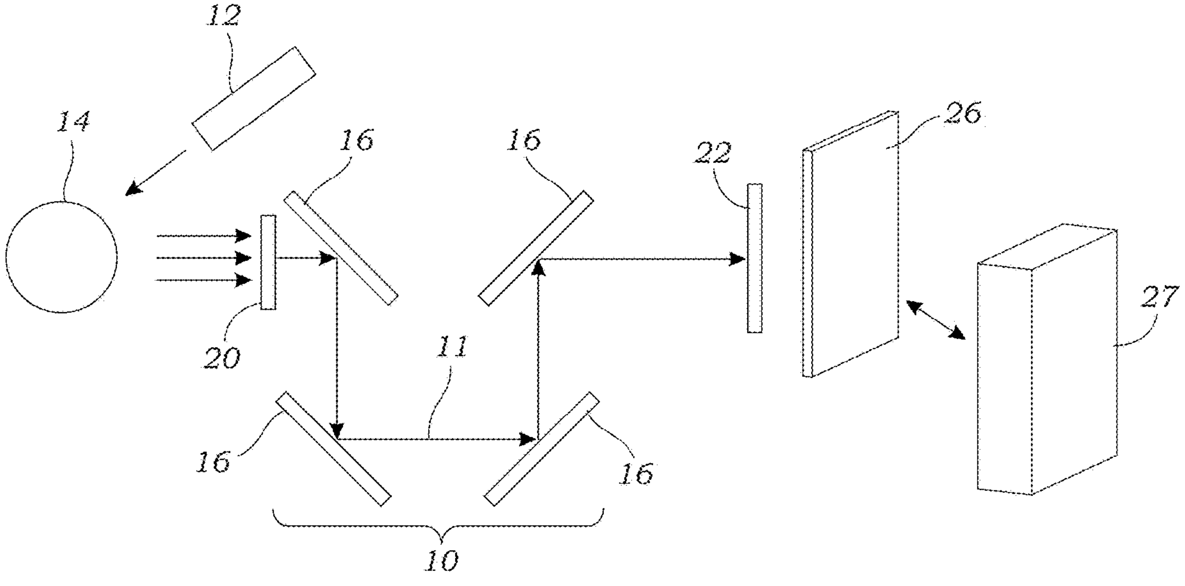
FIG. 2 schematically illustrates another embodiment of a $D^2NN$ that is used in reflection mode according to one embodiment. A source of light (which may be natural or artificial) directs light onto an object which reflect (or passes through the object in other embodiments) and is directed to a $D^2NN$ that is setup in reflection mode. In this mode, light reflects off the individual substrate layers that form the $D^2NN$. The reflected light from the $D^2NN$ is then detected by an optical detection device (e.g., optical sensor).

Each substrate layer 16 of the $D^2NN$ 10 has a plurality of physical features 18 formed on the surface of the substrate layer 16 or within the substrate layer 16 itself that collectively define a pattern of physical locations along the length and width of each substrate layer 16 that have varied complex-valued transmission coefficients (or varied complex-valued transmission reflection coefficients for the embodiment of FIG. 2). The physical features 18 formed on or in the layers 16 thus create a pattern of physical locations within the layers 16 that have different complex-valued transmission coefficients as a function of lateral coordinates (e.g., length and width and in some embodiments depth) across each substrate layer 16. In some embodiments, each separate physical feature 18 may define a discrete physical location on the substrate layer 16 while in other embodiments, multiple physical features 18 may combine or collectively define a physical region with a particular complex-valued transmission coefficient. The plurality of optically transmissive layers 16 arranged along the optical path 11 collectively define a trained mapping function between an input optical image or input optical signal 20 to the plurality layers 16 and an output optical image or output optical signal 22 created by optical diffraction through the plurality of substrate layers 16.

Figure 3:
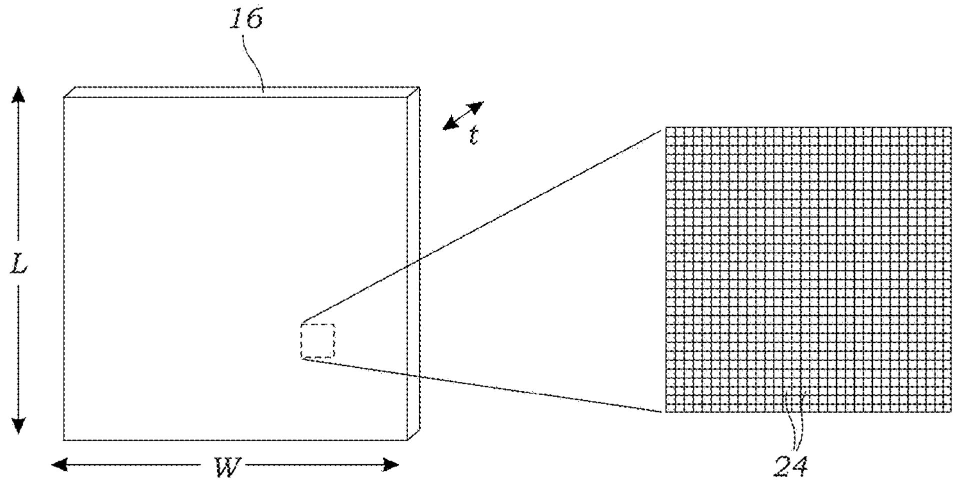
FIG. 3 illustrates a single substrate layer of a $D^2NN$. The substrate layer may be made from a material that is optically transmissive (for transmission mode) or an optically reflective material (for reflective mode). The substrate layer, which may be formed as a substrate or plate in some embodiments, has surface features formed across the substrate layer. The surface features form a patterned surface (e.g., an array) having different complex-valued transmission (or reflection) coefficients as a function of lateral coordinates across each substrate layer. These surface features act as artificial "neurons" that connect to other "neurons" of other substrate layers of the $D^2NN$ through optical diffraction (or reflection) and alter the phase and/or amplitude of the light wave.

The pattern of physical locations formed by the physical features 18 may define, in some embodiments, an array located across the surface of the substrate layer 16. With reference to FIG. 3, the substrate layer 16 in one embodiment is a two-dimensional generally planer substrate having a length (L), width (W), and thickness (t) that all may vary depending on the particular application. In other embodiments, the substrate layer 16 may be non-planer such as, for example, curved. In addition, while FIG. 3 illustrates a rectangular or square-shaped substrate layer 16 different geometries are contemplated. With reference to FIG. 1 and FIG. 3, the physical features 18 and the physical regions formed thereby act as artificial "neurons" 24 as seen in FIG. 3 that connect to other "neurons" 24 of other substrate layers 16 of the $D^2NN$ 10 (as seen, for example, in FIGS. 1 and 2) through optical diffraction (or reflection in the case of the embodiment of FIG. 2) and alter the phase and/or amplitude of the light wave. The particular number and density of the physical features 18 or artificial neurons 24 that are formed in each substrate layer 16 may vary depending on the type of application. In some embodiments, the total number of artificial neurons 24 may only need to be in the hundreds or thousands while in other embodiments, hundreds of thousands or millions of neurons 24 or more may be used. Likewise, the number of layers 16 that are used in a particular $D^2NN$ 10 may vary although it typically ranges from at least two substrate layers 16 to less than ten substrate layers 16.

As seen in FIG. 1, the output optical image or output optical signal 22 is captured by one or more optical sensors 26. The optical sensor 26 may include, for example, an image sensor (e.g., CMOS image sensor or image chip such as CCD), photodetectors (e.g., photodiode such as avalanche photodiode detector (APD)), photomultiplier (PMT) device, and the like. The one or more optical sensors 26 may, in some embodiments, be coupled to a computing device 27 (e.g., a computer or the like such as a personal computer, laptop, server, mobile computing device) that is used to acquire, store, process, manipulate, and/or transfer the output optical image or output optical signal 22. In other embodiments, the optical sensor 26 may be integrated within a device such as a camera that is configured to acquire, store, process, manipulate, and/or transfer the output optical image or output optical signal 22. For example, the $D^2NN$ 10 may integrated inside a camera according to one embodiment.

FIG. 2 schematically illustrates one embodiment of a $D^2NN$ 10 that is used in reflection mode according to one embodiment. Similar components and features shared with the embodiment of FIG. 1 are labeled similarly. In this embodiment, the object is illuminated with light from the light source 12 as described previously. Light that is reflected by, transmitted through, or emitted by the object 14 (e.g., fluorescent light) forms the input optical image or input optical signal 20 that is input to the $D^2NN$ 10. In this embodiment, the $D^2NN$ 10 operates in reflection mode whereby light is reflected by a plurality of substrate layers 16. As seen in the embodiment of FIG. 2, the optical path 11 is a folded optical path as a result of the reflections off the plurality of substrate layers 16. The number of substrate layers 16 may vary depending on the particular function or task that is to be performed as noted above. Each substrate layer 16 of the $D^2NN$ 10 has a plurality of physical features 18 formed on the surface of the substrate layer 16 or within the substrate layer 16 itself that collectively define a pattern of physical locations along the length and width of each substrate layer 16 that have varied complex-valued reflection coefficients. Like the FIG. 1 embodiment, the output optical image or output optical signal 22 is captured by one or more optical sensors 26. The one or more optical sensors 26 may be coupled to a computing device 27 as noted or integrated into a device such as a camera as noted above.

Figure 4:
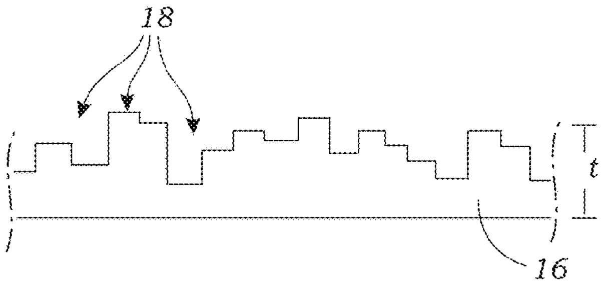
FIG. 4 schematically illustrates a cross-sectional view of a single substrate layer of a $D^2NN$ according to one embodiment. In this embodiment, the surface features are formed by adjusting the thickness of the substrate layer that forms the $D^2NN$. These different thicknesses may define peaks and valleys in the substrate layer that act as the artificial "neurons."

FIG. 4 illustrates one embodiment of how different physical features 18 are formed in the substrate layer 16. In this embodiment, a substrate 16 has different thicknesses (t) of material at different lateral locations along the substrate layer 16. In one embodiment, the different thicknesses (t) modulates the phase of the light passing through the substrate layer 16. This type of physical feature 18 may be used, for instance, in the transmission mode embodiment of FIG. 1. The different thicknesses of material in the substrate layer 16 forms a plurality of discrete "peaks" and "valleys" that control the complex-valued transmission coefficient of the neurons 24 formed in the substrate layer 16. As explained herein, the different thicknesses of the substrate layer 16 may be formed using additive manufacturing techniques (e.g., 3D printing) or lithographic methods utilized in semiconductor processing. This includes well-known wet and dry etching processes that can form very small lithographic features on a substrate 16. Lithographic methods may be used to form very small and dense physical features 18 on the substrate layer 16 which may be used with shorter wavelengths of the light. As seen in FIG. 4, in this embodiment, the physical features 18 are fixed in permanent state (i.e., the surface profile is established and remains the same once complete).

Figure 5:
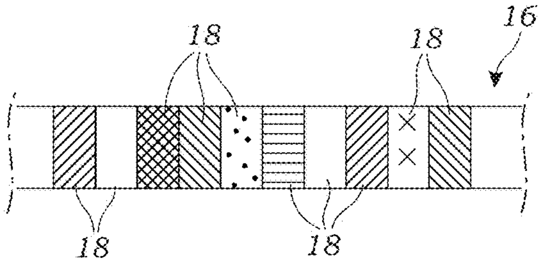
FIG. 5 schematically illustrates a cross-sectional view of a single substrate layer of a $D^2NN$ according to another embodiment. In this embodiment, the different surface features are formed by altering the material composition or material properties of the single substrate layer at different lateral locations across the substrate layer. This may be accomplished by doping the substrate layer with a dopant or incorporating other optical materials into the substrate layer. Metamaterials or plasmonic structures may also be incorporated into the substrate layer.

FIG. 5 illustrates another embodiment in which the physical features 18 are created or formed within the substrate 16. In this embodiment, the substrate 16 may have a substantially uniform thickness but have different regions of the substrate 16 have different optical properties. For example, the complex-valued refractive index of the substrate layers 16 may altered by doping the substrate layers 16 with a dopant (e.g., ions or the like) to form the regions of neurons 24 in the substrate layers 16 with controlled transmission properties. In still other embodiments, optical nonlinearity can be incorporated into the deep optical network design using various optical non-linear materials (crystals, polymers, semiconductor materials, doped glasses, polymers, organic materials, semiconductors, graphene, quantum dots, carbon nanotubes, and the like) that are incorporated into the substrate 16. A masking layer or coating that partially transmits or partially blocks light in different lateral locations on the substrate 16 may also be used to form the neurons 16 on the substrate layers 16.

Alternatively, the complex-valued transmission function of a neuron 24 can also engineered by using metamaterial or plasmonic structures. Combinations of all these techniques may also be used. In other embodiments, non-passive components may be incorporated in into the substrates 16 such as spatial light modulators (SLMs). SLMs are devices that imposes spatial varying modulation of the phase, amplitude, or polarization of a light. SLMs may include optically addressed SLMs and electrically addressed SLM. Electric SLMs include liquid crystal-based technologies that are switched by using thin-film transistors (for transmission applications) or silicon backplanes (for reflective applications). Another example of an electric SLM includes magneto-optic devices that use pixelated crystals of aluminum garnet switched by an array of magnetic coils using the magneto-optical effect. Additional electronic SLMs include devices that use nanofabricated deformable or moveable mirrors that are electrostatically controlled to selectively deflect light.

Figure 6:
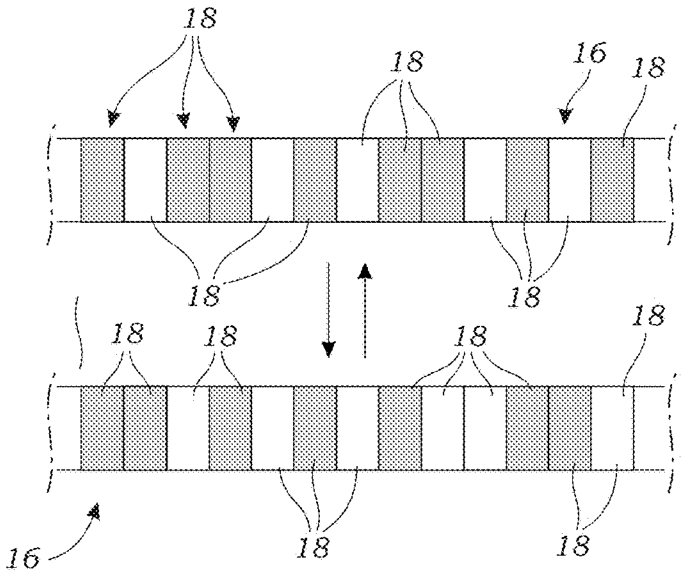
FIG. 6 schematically illustrates a cross-sectional view of a single substrate layer of a $D^2NN$ according to another embodiment. In this embodiment, the substrate layer is reconfigurable in that the optical properties of the various artificial neurons may be changed, for example, by application of a stimulus (e.g., electrical current or field). An example includes spatial light modulators (SLMs) which can change their optical properties. In this embodiment, the neuronal structure is not fixed and can be dynamically changed or tuned as appropriate. This embodiment, for example, can provide a learning $D^2NN$ or a changeable $D^2NN$ that can be altered on-the-fly to improve the performance, compensate for aberrations, or even change another task.

FIG. 6 schematically illustrates a cross-sectional view of a single substrate layer 16 of a $D^2NN$ 10 according to another embodiment. In this embodiment, the substrate 16 is reconfigurable in that the optical properties of the various physical features 18 that form the artificial neurons 24 may be changed, for example, by application of a stimulus (e.g., electrical current or field). An example includes spatial light modulators (SLMs) discussed above which can change their optical properties. In other embodiments, the layers may use the DC electro-optic effect to introduce optical nonlinearity into the substrates 16 of a $D^2NN$ 10 and require a DC electric-field for each substrate 16 of the diffractive neural network 10. This electric-field (or electric current) can be externally applied to each substrate layer 16 of a $D^2NN$ 10. Alternatively, one can also use poled materials with very strong built-in electric fields as part of the material (e.g., poled crystals or glasses). In this embodiment, the neuronal structure is not fixed and can be dynamically changed or tuned as appropriate. This embodiment, for example, can provide a learning $D^2NN$ 10 or a changeable $D^2NN$ 10 that can be altered on-the-fly to improve the performance, compensate for aberrations, or even change another task.

Figure 7:
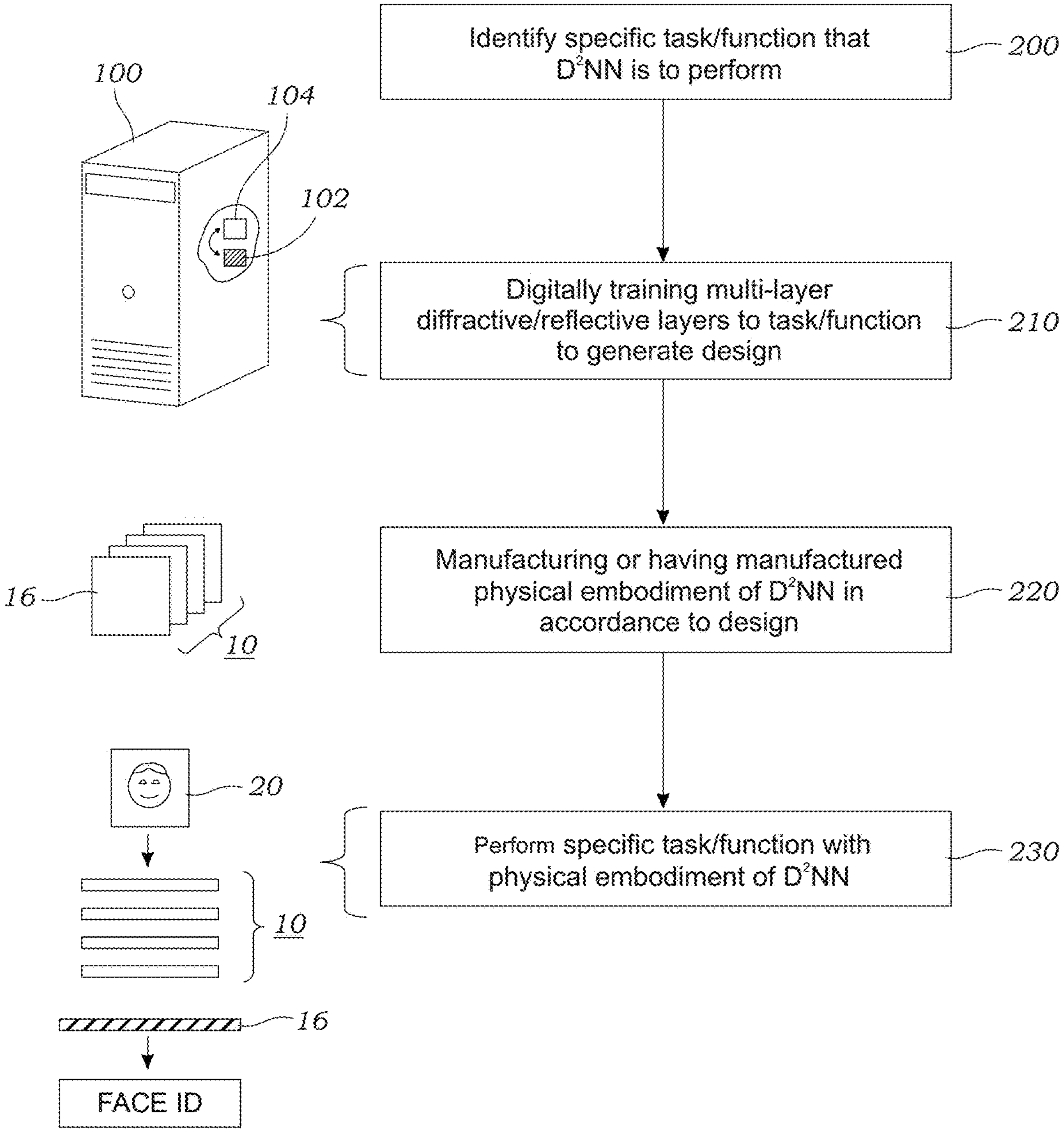
FIG. 7 illustrates a flowchart of the operations according to one embodiment to create and use a $D^2NN$.

FIG. 7 illustrates a flowchart of the operations or processes according to one embodiment to create and use a $D^2NN$ 10. As seen in operation 200 of FIG. 7, a specific task/function is first identified that the $D^2NN$ 10 will perform. This may include classification of one or more objects 14 contained in an image or classification of the image itself. For example, a classification scheme may classify images run through system as a natural setting (e.g., forest or mountains) or a non-natural setting. The system may further be used to tag or identify certain features within the classified image. For example, the system may be able to tag or identify "trees" that are contained within a natural setting image. The task or function may also include performing one or more imaging operations (e.g., image magnification, enhance spatial features of the object 14, improved resolution, feature highlighting, image feature tagging, etc.). In the particular example illustrated in FIG. 7, the task/function is to take the input image 20 and identify a face in the input image (Face ID). Once the task or function has been established, a computing device 100 having one or more processors 102 executes software 104 thereon to then digitally train a model or mathematical representation of multi-layer diffractive or reflective substrate layers 16 to the desired task or function to then generate a design for a physical embodiment of the $D^2NN$ 10. This operation is illustrated as operation 210 in FIG. 7. The design has the physical layout for the different physical features 18 that form the artificial neurons 24 in each of the plurality of physical substrates 16 which are present in the $D^2NN$ 10 may then be used to make a physical embodiment that reflects the computer-derived design. Operation 220 reflects that the design is used to manufacture or have manufactured the physical embodiment of the $D^2NN$ 10 in accordance with the design. The design, in some embodiments, may be embodied in a software format (e.g., SolidWorks, AutoCAD, Inventor, or other computer-aided design (CAD) program or lithographic software program) may then be manufactured into a physical embodiment that includes the plurality of substrates 16. The physical substrate layers 16, once manufactured may be mounted or disposed in a holder 30 such as that illustrated in FIG. 8. The holder 30 may include a number of slots 32 formed therein to hold the substrates 16 in the required sequence and with the required spacing between adjacent layers (if needed). Once the physical embodiment of the $D^2NN$ 10 has been made, the $D^2NN$ 10 is then used to perform the specific task or function as illustrated in operation 230 of FIG. 7.

Figure 8:
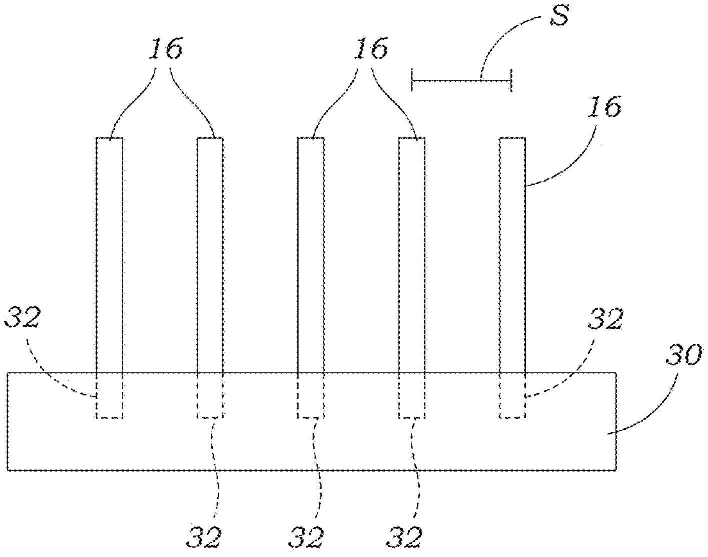
FIG. 8 illustrates an embodiment of a holder that is used to secure the substrates used in a $D^2NN$.

As noted above, the particular spacing of the substrates 16 that make the $D^2NN$ 10 may be maintained using the holder 30 of FIG. 8. The holder 30 may contact one or more peripheral surfaces of the substrate 16. In some embodiments, the holder 30 may contain a number of slots 32 that provide the ability of the user to adjust the spacing (S) between adjacent substrates 16. A single holder 30 can thus be used to hold different $D^2NNs$ 10. In some embodiments, the substrates 16 may be permanently secured to the holder 30 while in other embodiments, the substrates 16 may be removable from the holder 30.

Figure 9:
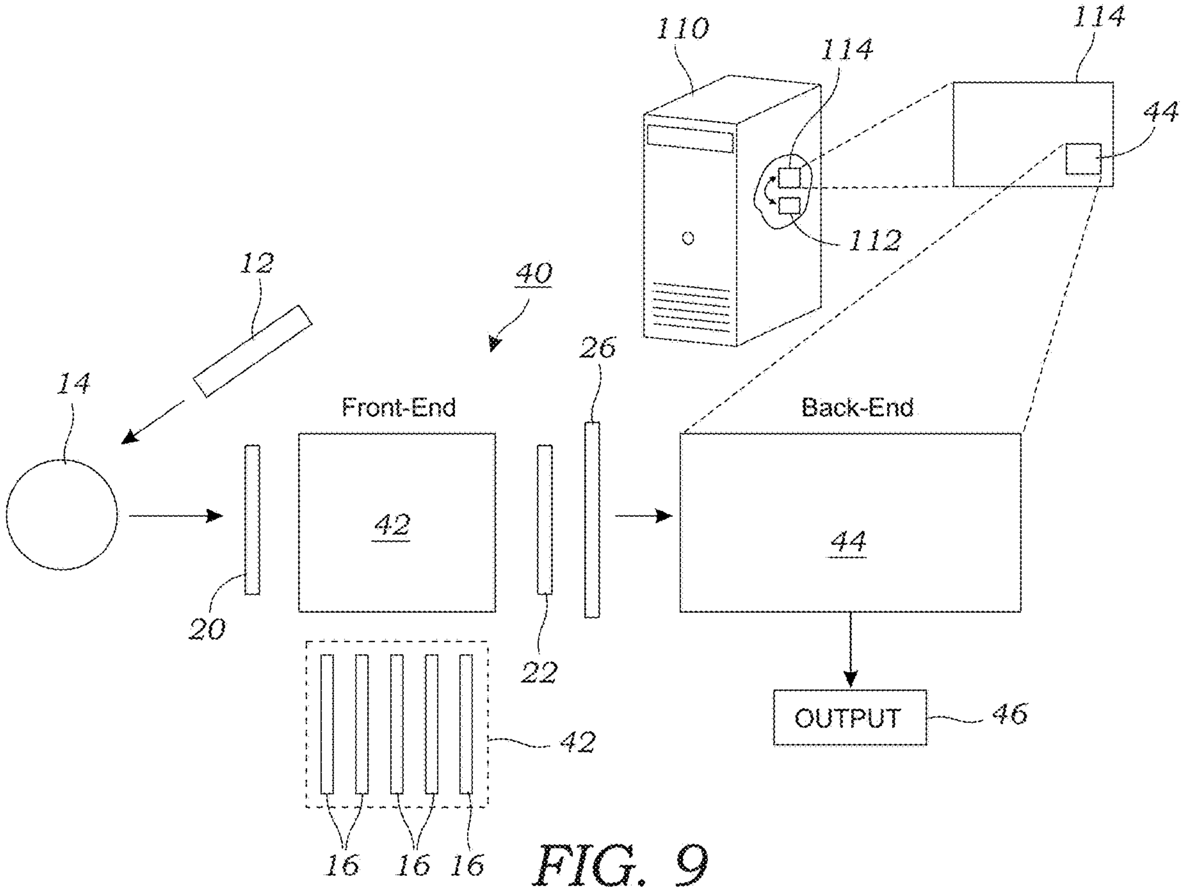
FIG. 9 schematically illustrates an embodiment of a hybrid optical and electronic neural network-based system. This embodiment includes an all-optical $D^2NN$ front-end and a digital or electronic trained neural network back-end.

FIG. 9 illustrates schematically an embodiment of a hybrid optical and electronic neural network-based neural network system 40 according to one embodiment. In this embodiment, a $D^2NN$ front-end 42 is used in conjunction with a back-end trained electronic or digital neural network 44. That is to say, the system in hybrid in that it uses an all-optical $D^2NN$ front-end 42 in combination with a back-end (all-electronic) trained deep neural network 44. One of the advantages of this embodiment is that the hybrid system may take advantage of the benefits of the optical $D^2NN$ front-end 42 such as the high speed with a shallow, less computationally intensive digital back end 44. The $D^2NN$ front-end 42 may be configured to do the bulk of the work (which is performed at the speed of light) while the electronic or digital back-end deep neural network 44 may be shallow having fewer layers in the neural network 44 which can be processed quicker and less power. Likewise, the hybrid optical and electronic neural network-based neural network system 40 may enable the formation of a less complex $D^2NN$ front-end 42, for example, a $D^2NN$ front-end 42 that has fewer substrates 16 or fewer number or density of physical features 18 or artificial neurons 24. Furthermore, a $D^2NN$ front-end 42 that is integrated with a back-end electronic neural network 44 can significantly reduce the number of input pixels into the electronic neural network 44 using an ultra-compact front-end $D^2NN$ 42 with a layer-to-layer distance of a few wavelengths, also reducing the complexity of the successive electronic network 44.

The $D^2NN$ front-end 42 is the same as the $D^2NN$ 10 described herein. The $D^2NN$ front-end 42 may operation in transmission mode like that illustrated in FIG. 1 or it may operate in reflection mode as illustrated in FIG. 2. The plurality of substrates 16 used in the $D^2NN$ front-end 42 collectively define a trained mapping function between an input optical image or input optical signal 20 to the plurality layers 16 and an output optical image or output optical signal 22 created by optical diffraction or reflection through the plurality of substrates 16 that makeup the $D^2NN$ front-end 42. The output optical image or output optical signal 22 is then used as an input to the back-end trained neural network 44. The electronic or digital trained neural network 44 is implemented using a computing device 110 having one or more processors 112 that execute software 114 that runs the trained neural network 44. The input to the electronic or digital trained neural network 44, as explained above, is the output optical image or output optical signal 22 of the $D^2NN$ front-end 42. The electronic or digital trained neural network 44 generates an output 46. The output 46 is the specific task/function that the hybrid optical and electronic neural network-based neural network system 40 was designed to achieve. This may be, as explained in the prior embodiments, classification or an optical signal or optical image or magnification, enhance spatial features of the object 14, improved resolution, feature highlighting, image feature tagging, etc.

Figure 10:
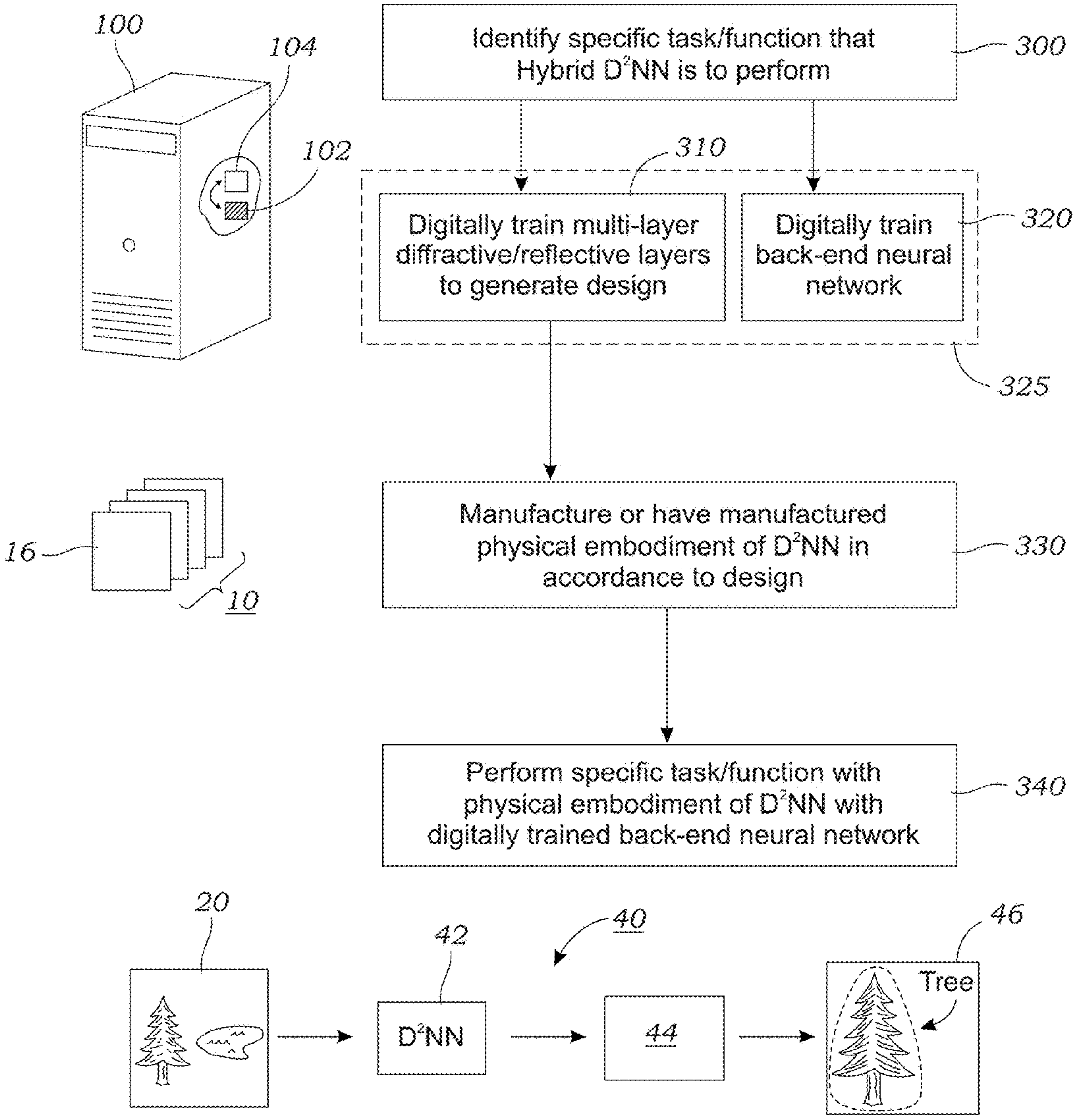
FIG. 10 illustrates a flowchart of the operations according to one embodiment to create and use a hybrid optical and electronic neural network-based system.

FIG. 10 illustrates a flowchart of the operations or processes according to one embodiment to create and use a hybrid optical and electronic neural network-based neural network system 40. As seen in operation 300 of FIG. 10, a specific task/function is first identified that the system 40 will perform. This may include classification of one or more objects 14 contained in an image or classification of the image itself. For example, a classification scheme may classify images run through system as a natural setting (e.g., forest or mountains) or a non-natural setting. The system may further be used to tag or identify certain features within the classified image. For example, the system 40 may be able to tag or identify "trees" that are contained within a natural setting image (illustrated in FIG. 10). The task or function may also include performing one or more imaging operations (e.g., image magnification, enhance spatial features of the object 14, improved resolution, feature highlighting, image feature tagging, etc.). Once the task or function has been established, a computing device 100 having one or more processors 102 executes software 104 thereon to then digitally train a model or mathematical representation of multi-layer diffractive/reflective substrate layers 16 to the desired task or function to then generate a design for a physical embodiment of the $D^2NN$ front-end 42. This operation is illustrated as operation 310 in FIG. 10. The design has the physical layout for the different physical features 18 that form the artificial neurons 24 in each of the plurality of physical substrates 16 which are present in the $D^2NN$ front-end 42 may then be used to make a physical embodiment that reflects the computer-derived design. In addition, the back-end trained electronic or digital neural network 44 is trained as seen in operation 320 using training images or training optical signals. This training is used to optimize the parameters of the neural network 44. This training operation 320 may conducted on the same or different computing device 100 described above that was used to generate the $D^2NN$ front-end 42. Further, training the model or mathematical representation of a multi-layer diffractive/reflective substrate layers 16 used in the $D^2NN$ front-end 42 to perform the desired task or function may be done jointing or simultaneously with the training of the back-end electronic or digital neural network 44 as illustrated in dashed line 325.

Operation 330 illustrates that the step of manufacturing or have manufactured the physical embodiment of the $D^2NN$ front-end 42 in accordance with the design. The design, in some embodiments, may be embodied in a software format (e.g., SolidWorks, AutoCAD, Inventor, or other computer-aided design (CAD) program or lithographic software program) may then be manufactured into a physical embodiment that includes the plurality of substrates 16. The physical substrate layers 16, once manufactured may be mounted or disposed in a holder 30 such as that illustrated in FIG. 8 as previously described. Once the physical embodiment of the $D^2NN$ front-end 42 has been made, the $D^2NN$ front-end 42 is then used to perform the specific task or function in combination with the back-end trained electronic or digital neural network 44 as illustrated in operation 340 in FIG. 10. In this embodiment, the input optical image or input optical signal 20 shows an image that contains outdoor scenery. The specific task or function of the hybrid optical and electronic neural network-based neural network system 40 is to identify trees in the image. As seen in the output image 46, the tree is tagged and identified as a tree in the image.

Experimental—All-Optical $D^2NN$ $D^2NN$ Architecture. Experiments were conducted using a transmission-based $D^2NN$ as illustrated in FIGS. 1, 11A-11C, 14A, 14B. The $D^2NN$ 10 that was tested included multiple transmissive layers, where each point on a given layer acts as an artificial neuron 24, with a complex-valued transmission (or reflection) coefficient. These transmission/reflection coefficients of each substrate layer 16 can be trained using deep learning to perform a task function between the input optical signal or input optical image 20 (sometimes referred to herein as the input plane) and the output optical signal or output optical image 22 (sometimes referred to as the output plane) of the network. The $D^2NN$ 10 that was subject to experimental testing was used as part of a coherent transmissive network with phase-only modulation at each substrate layer 16, which is approximated as a thin optical element. In this case, each substrate layer 16 of the $D^2NN$ 10 modulates the wavefront of the transmitted field through the phase values (i.e., biases) of its neurons.

After this learning phase, the $D^2NN$ 10 design is fixed, and once it is fabricated (e.g., 3D-printed or the like), the physical $D^2NN$ 10 manifestation performs the learned function or task at the speed of light.

Figures 11A, 11B, 11C, 11D, 11E:
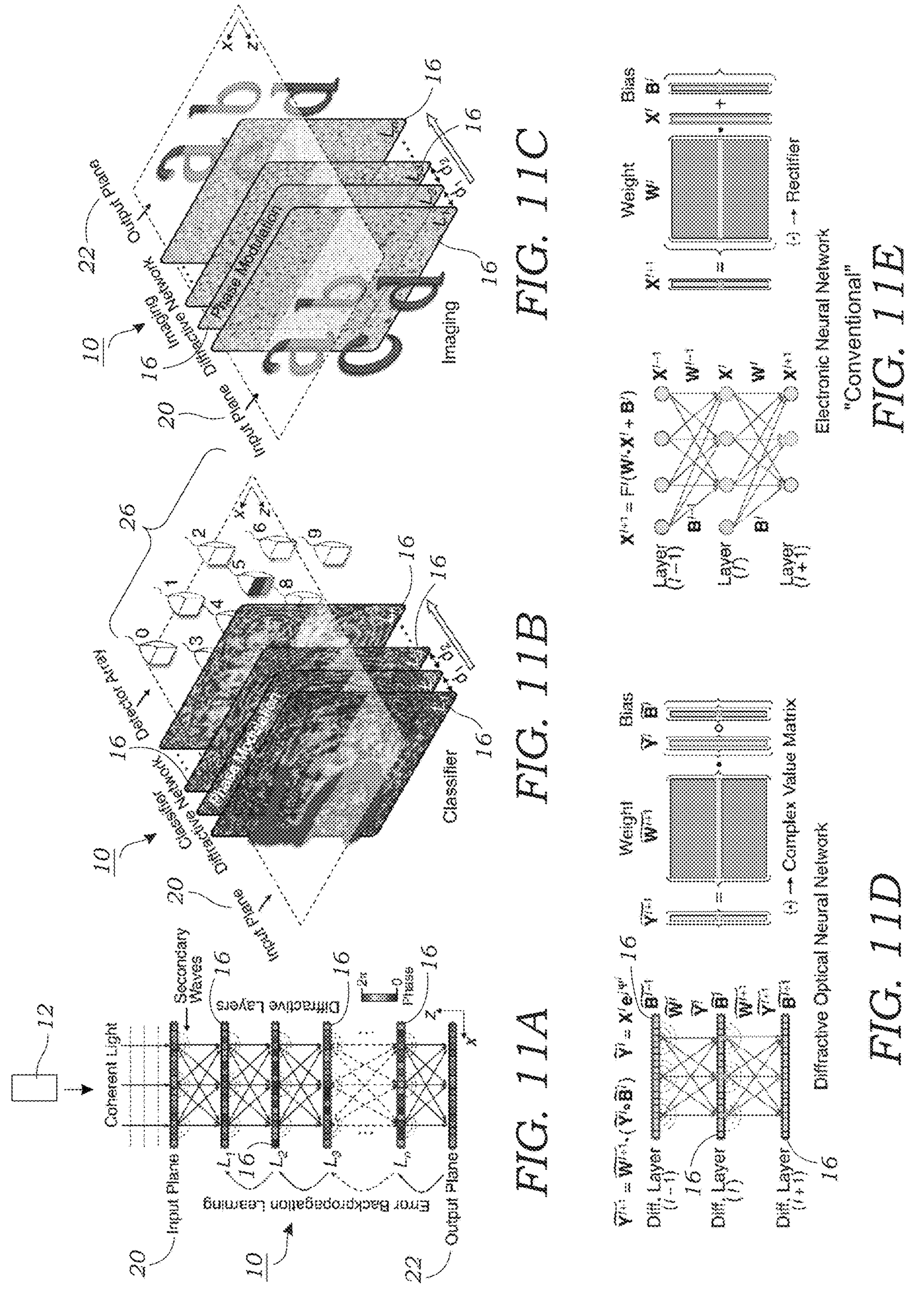
FIG. 11A illustrates a schematic view of a transmission-based $D^2NN$ showing coherent light from a light source that generates the input optical signal or input optical image 20 (e.g., input plane) that then passes through a multi-layer $D^2NN$ and generates an output optical signal or output optical image 22 (e.g., output plane).
FIG. 11B illustrates a perspective view of a transmission-based $D^2NN$ that is used as a digit classifier as explained herein (for handwritten digits and fashion products). The output optical signal or output optical image of the $D^2NN$ was captured using an optical sensor that was formed by an array of optical detectors.
FIG. 11C illustrates a perspective view of a transmission-based $D^2NN$ that is used for a "lens" imaging task/function (e.g., amplitude imaging).
FIG. 11D schematically illustrates the $D^2NN$ used for the experiments described herein.
FIG. 11E illustrates a conventional electronic or digital neural network.

FIG. 11A illustrates a schematic view of a transmission-based $D^2NN$ 10 showing coherent light from a light source 12 that generates the input optical signal or input optical image 20 (e.g., input plane) that then passes through a multi-layer $D^2NN$ 10 and generates an output optical signal or output optical image 22 (e.g., output plane). During training, error backpropagation learning is used to define the complex-valued transmission coefficients for the physical locations across each substrate layer 16 that forms the $D^2NN$ 10. FIG. 11B illustrates a perspective view of a transmission-based $D^2NN$ 10 that is used as a digit classifier as explained herein (for handwritten digits and fashion products). The output optical signal or output optical image 22 of the $D^2NN$ 10 was captured using an optical sensor 26 that was formed by an array of optical detectors. FIG. 11C illustrates a perspective view of a transmission-based $D^2NN$ 10 that is used for a "lens" imaging task/function (e.g., amplitude imaging). FIG. 11D schematically illustrates the $D^2NN$ 10 used for the experiments described herein while FIG. 11E illustrates a conventional electronic or digital neural network. Based on coherent waves, the $D^2NN$ 10 operates on complex-valued inputs, with multiplicative bias terms. Weights in a $D^2NN$ 10 are based on free-space diffraction and determine the coherent interference of the secondary waves that are phase and/or amplitude modulated by the previous layers. "o" refers to a Hadamard product operation. The electronic neural network of FIG. 11E refers to the conventional neural network virtually implemented in a computer.

Wave analysis in a $D^2NN$.

Following the Rayleigh-Sommerfeld diffraction equation, one can consider every single neuron 24 of a given $D^2NN$ substrate layer 16 as a secondary source of a wave that is composed of the following optical mode:

$$w_i^l(x, y, z) = \frac{z - z_i}{r^2}\left(\frac{1}{2\pi r} + \frac{1}{j\lambda}\right)\exp\left(\frac{j2\pi r}{\lambda}\right), \tag{1}$$

where l represents the l-th layer of the network, i represents the i-th neuron located at $(x_i, y_i, z_i)$ of layer l, λ is the illumination wavelength, $r=\sqrt{(x-x_i)^2+(y-y_i)^2+(z-z_i)^2}$ and $j=\sqrt{-1}$. The amplitude and relative phase of this secondary wave are determined by the product of the input wave to the neuron 24 and its transmission coefficient (t), both of which are complex-valued functions. Based on this, for the l-th layer of the network, one can write the output function $(n_i^l)$ of the i-th neuron located at $(x_i, y_i, z_i)$ as:

$$n_i^l(x, y, z)=w_i^l(x, y, z)\cdot t_i^l(x_i, y_i, z_i)\cdot\Sigma_k n_k^{l-1}(x_i, y_i, z_i)=w_i^l(x, y, z)\cdot|A|\cdot e^{j\Delta\theta}, \tag{2}$$

where $m_i^l(x_i, y_i, z_i)=\Sigma_k n_k^{l-1}(x_i, y_i, z_i)$ defines the input wave to i-th neuron of layer l, |A| refers to the relative amplitude of the secondary wave, and Δθ refers to the additional phase delay that the secondary wave encounters due to the input wave to the neuron 24 and its transmission coefficient. These secondary waves diffract between the substrate layers 16 and interfere with each other forming a complex wave at the surface of the next layer, feeding its neurons 24. The transmission coefficient of a neuron 24 is composed of amplitude and phase terms, i.e., $t_i^l(x_i, y_i, z_i)=a_i^l(x_i, y_i, z_i)\exp(j\phi_i^l(x_i, y_i, z_i))$, and for a phase-only $D^2NN$ 10 architecture the amplitude $a_i^l(x_i, y_i, z_i)$ is assumed to be a constant, ideally 1, ignoring the optical losses, which are addressed herein. In general, a complex-valued modulation at each substrate layer 16 improves the inference performance of the diffractive network (see e.g., FIGS. 12 and 13).

Through deep learning, the phase values of the neurons 24 of each substrate layer 16 of the diffractive network are iteratively adjusted (trained) to perform a specific function or task by feeding training data at the input layer and then computing the network's output through optical diffraction. Based on the calculated error with respect to the target output, determined by the desired function, the network structure and its neuron phase values are optimized using an error back-propagation algorithm, which is based on the stochastic gradient descent approach used in conventional deep learning.

Compared to standard deep neural networks, a $D^2NN$ 10 is not only different in that it is a physical and all-optical deep network, but also it possesses some unique architectural differences. First, the inputs for neurons 24 are complex-valued, determined by wave interference and a multiplicative bias, i.e., the transmission/reflection coefficients. Second, the individual function of a neuron 24 is the phase and amplitude modulation of its input to output a secondary wave, unlike e.g., a sigmoid, a rectified linear unit (ReLU) or other nonlinear neuron functions used in modern deep neural networks. Third, each neuron's 24 output is coupled to the neurons 24 of the next substrate layer 16 through wave propagation and coherent (or partially-coherent) interference, providing a unique form of interconnectivity within the network 10. For example, the way that a $D^2NN$ 10 adjusts its receptive field, which is a parameter used in convolutional neural networks, is quite different than the traditional neural networks, and is based on the axial spacing between different substrate layers 16, the signal-to-noise ratio (SNR) at the output layer as well as the spatial and temporal coherence properties of the illumination source. The secondary wave of each neuron 24 will in theory diffract in all angles, affecting in principle all the neurons 24 of the following layer. However, for a given spacing between the successive substrate layers 16, the intensity of the wave from a neuron 24 will decay below the detection noise floor after a certain propagation distance; the radius of this propagation distance at the next substrate layer 16 practically sets the receptive field of a diffractive neural network and can be physically adjusted by changing the spacing between the substrate layers 16, the intensity of the input optical beam, the detection SNR or the coherence length and diameter of the illumination source 12.

Figure 14A:
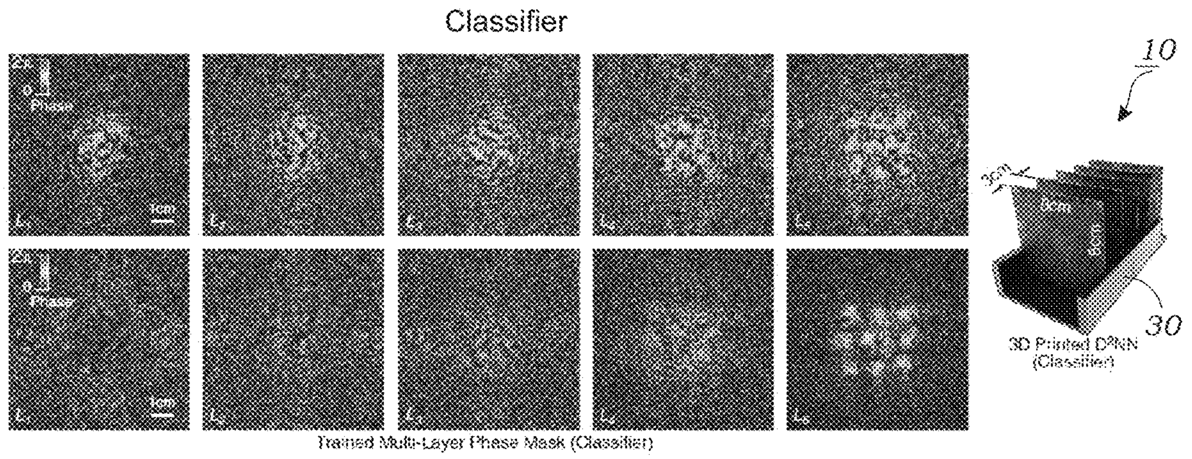
FIG. 14A illustrates the final designs of five different layers ($L_1$, $L_2$, . . . , $L_5$) of the handwritten digit classifier, fashion product classifier $D^2NN$. An image of the $D^2NN$ in a holder is shown on the right side of the page.

$D^2NN$ trained for handwritten digit classification. To demonstrate the performance of the $D^2NN$ platform, a $D^2NN$ was first trained as a digit classifier to perform automated classification of handwritten digits, from zero to nine (FIG. 11B and FIG. 14A). For this task, phase-only transmission masks were designed by training a 5-layer $D^2NN$ with ~55,000 images (5,000 validation images) from MNIST (Modified National Institute of Standards and Technology) handwritten digit database. Input digits were encoded into the amplitude of the input field to the $D^2NN$, and the diffractive network was trained to map input digits into ten different detector regions, one for each digit. The classification criterion was to find the detector that has the maximum optical signal and this was also used as a loss function during the network training.

Figure 12:
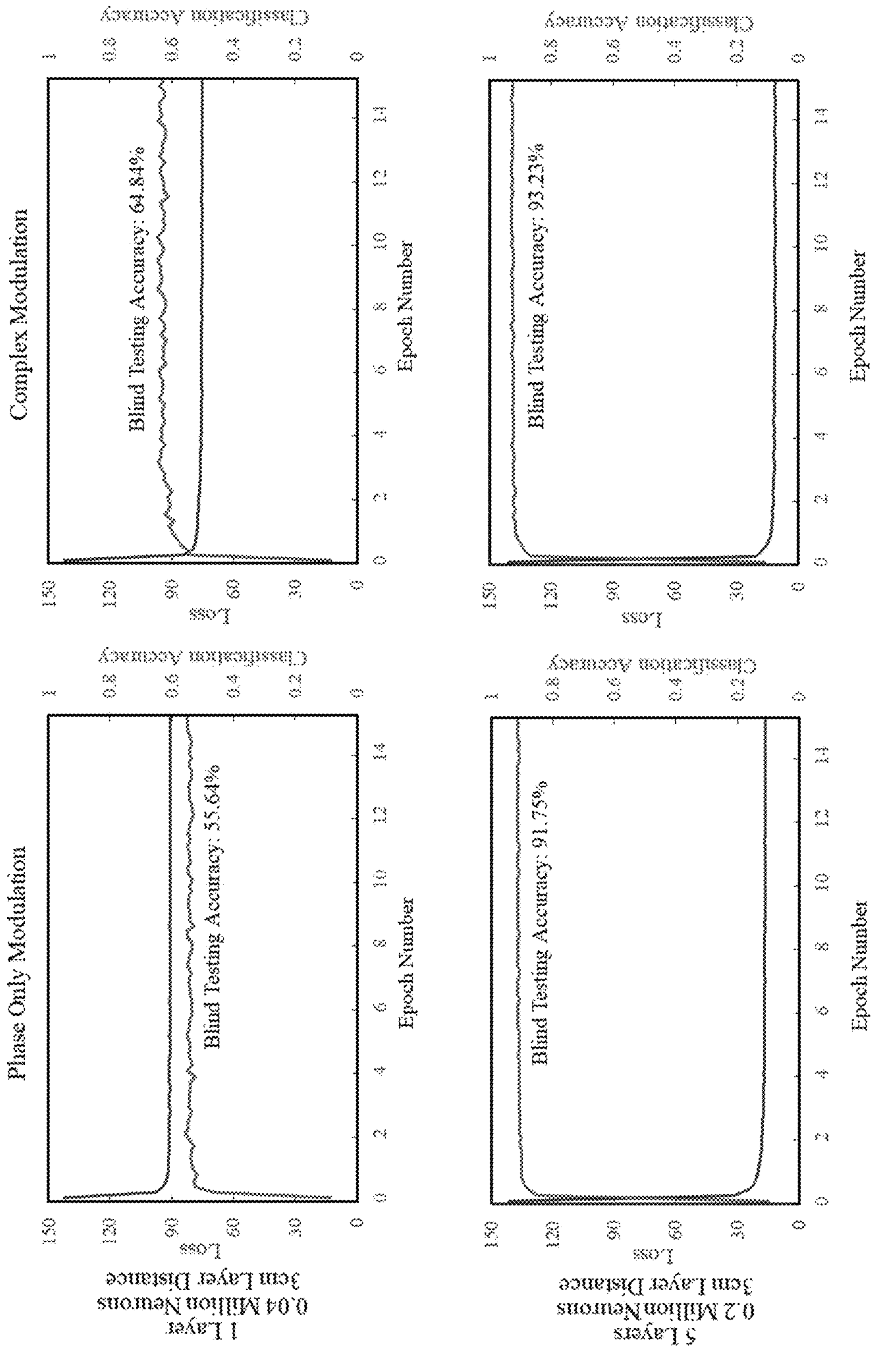
FIG. 12 illustrates training convergence plots of a phase-only modulation $D^2NN$ (left column) and a complex-valued (i.e., phase and amplitude) modulation $D^2NN$ (right column) as a function of the number of diffractive layers (N=1 and 5) and the number of neurons used in the network. The y-axis values in each plot report the MNIST digit classification accuracy and the loss values as a function of the epoch number for the testing datasets. For the same number of diffractive layers, using complex-valued modulation and increasing the spacing between each layer increases the number of connections of the diffractive network, further helping to improve its inference success (also see FIG. 13, top two rows). For N=1, layer distance (3 cm) refers to the distance between the sample/output plane and the diffractive layer. The same physical neuron size was used in each case, matching the MNIST $D^2NN$ design reported herein. For each class, the detector width was 4.8 mm.
Figures 15A, 15B, 15C:
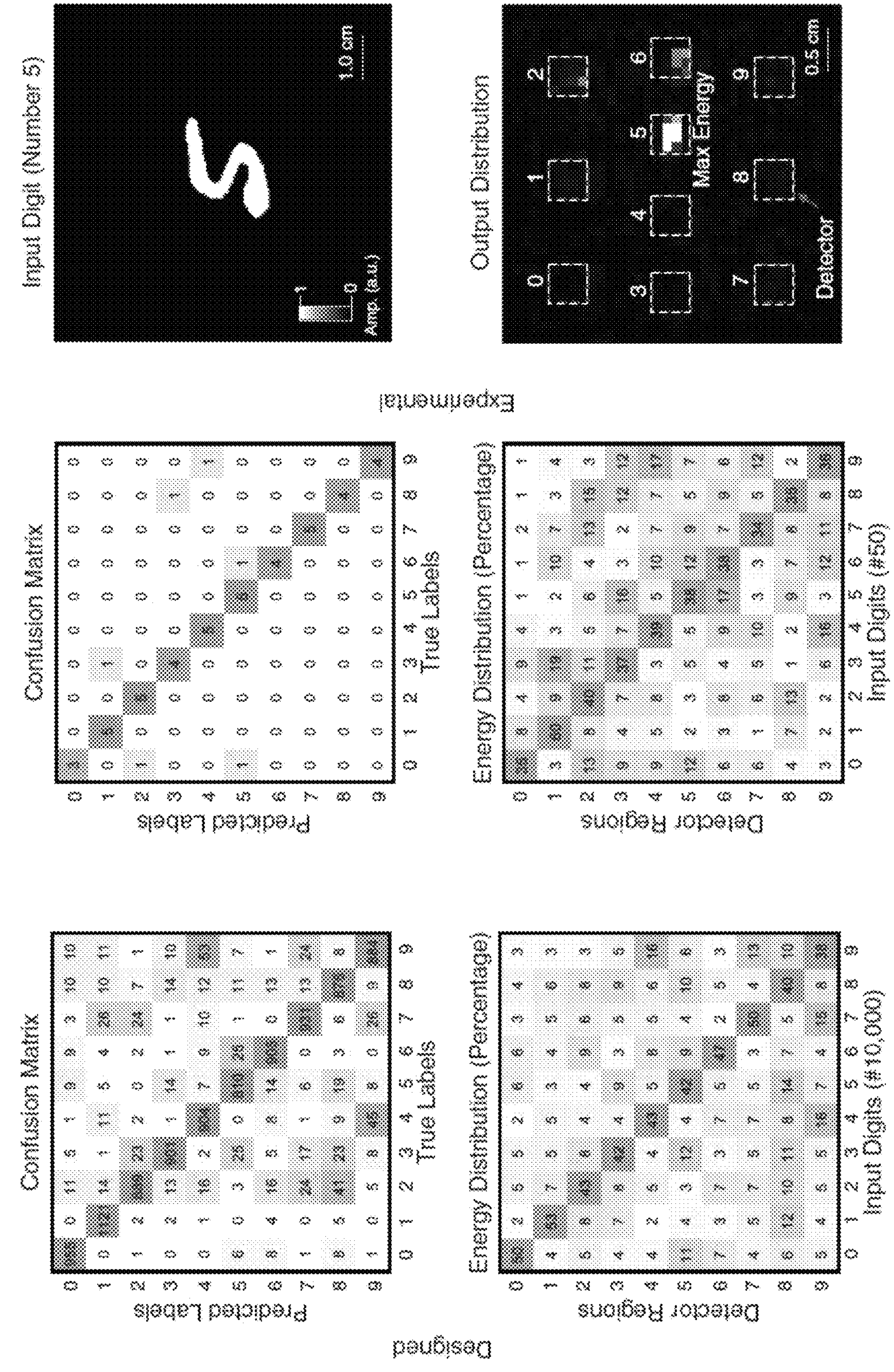
FIG. 15A illustrates how a 3D-printed $D^2NN$ successfully classifies handwritten input digits (0, 1, . . . , 9) based on ten (10) different detector regions at the output plane of the network, each corresponding to one digit.
FIG. 15B illustrates the confusion matrix and the energy distribution percentage for experimental results, using fifty (50) different handwritten digits that were 3D-printed (i.e., 5 for each digit) selected among the images that numerical testing (FIG. 15A) was successful.
FIG. 15C illustrates an input digit "5" that is input to the $D^2NN$ along with the output plane at the trained detector regions for each digit. The dotted squares represent the trained detector regions for each digit (number is shown next to each region).
Figure 15D:
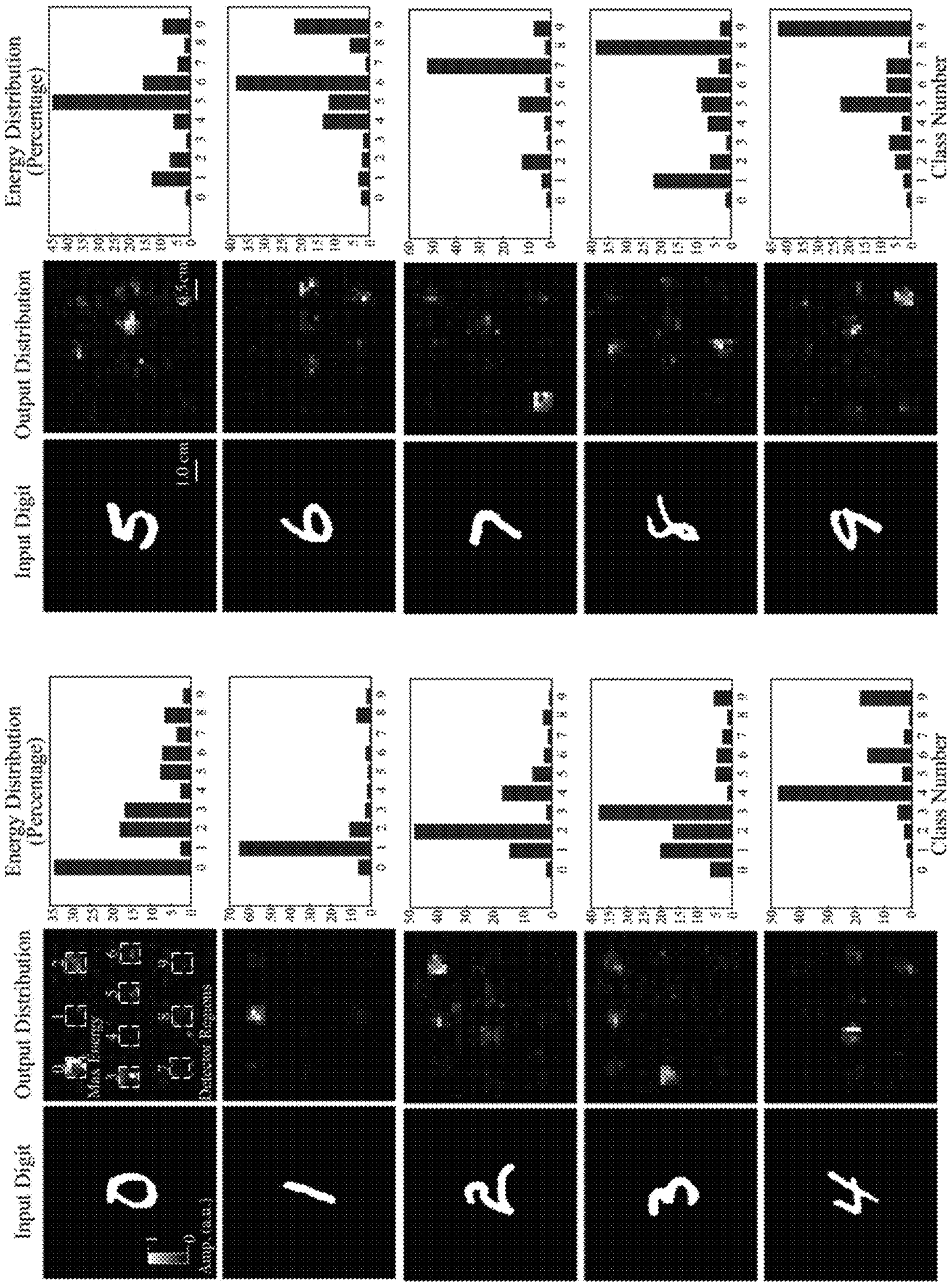
FIG. 15D illustrates a summary of some of the experimental results achieved with the 3D-printed handwritten digit classification $D^2NN$. The energy distribution percentage corresponding to each digit at the output plane shows that $D^2NN$ has the maximum energy focused on the target detector region of each respective digit.

After its training, the design of the $D^2NN$ digit classifier was numerically tested using 10,000 images from MNIST test dataset (which were not used as part of the training or validation image sets) and achieved a classification accuracy of 91.75% (FIG. 15A and FIG. 12). In addition to the classification performance of the diffractive network, FIG. 15A also reports the energy distribution observed at the network output plane for the same 10,000 test digits, the results of which clearly demonstrate that the diffractive network learned to focus the input energy of each handwritten digit into the correct (i.e., the target) detector region that it was trained for.

Figure 16:
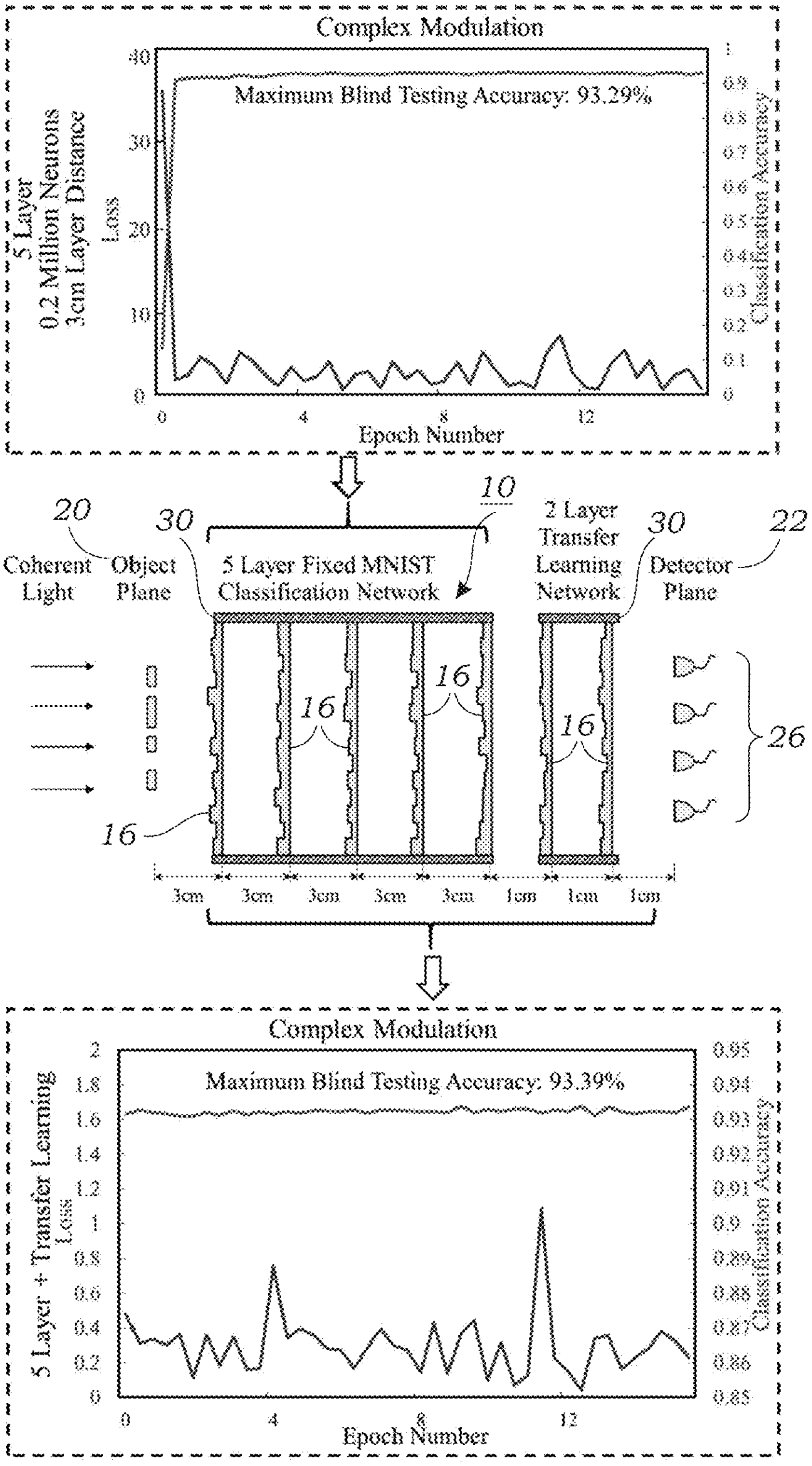
FIG. 16 (top) illustrates MNIST training convergence plot of a complex-valued modulation $D^2NN$ for N=10 layers and 0.4 million neurons in total. The y-axis values report the MNIST digit classification accuracy and the loss values as a function of the epoch number for the testing dataset. The middle of FIG. 16 illustrates a modular, Lego®-like physical transfer learning behavior for $D^2NN$ framework, i.e., additional layers are patched to an existing $D^2NN$ to improve its inference performance. In this example shown here, two (2) additional layers were trained that were placed right at the exit of an existing (i.e., fixed) 5-layer $D^2NN$. The bottom graph shows that after the training of the additional two (2) layers, the inference success of the resulting "patched" diffractive neural network has reached 93.39% for MNIST testing dataset. For each class, the detector width was 0.8 mm.

As reported in FIGS. 12 and 16, by using complex-valued modulation and increasing the number of substrate layers 16, neurons 24 and connections in the diffractive network 10, the classification accuracy can be further improved; for example FIG. 16 demonstrates a modular, Lego®-like physical transfer learning behavior for $D^2NN$ framework, where the inference performance of an already existing $D^2NN$ can be further improved by adding new diffractive substrate layers 16 to it or in some cases by peeling off (i.e., discarding) some of the existing substrate layers 16, where the new substrate layers 16 to be added are trained for improved inference (coming from the entire diffractive network: old and new layers). Using a patch of two (2) substrate layers 16 added to an existing and fixed $D^2NN$ 10 design (N=5), improved the MNIST classification accuracy to 93.39% (see FIG. 16); the state-of-the-art convolutional neural network performance has been reported as 99.60%-99.77%.

Following these numerical results, the 5-layer $D^2NN$ design was 3D printed (FIG. 14A), with each substrate layer 16 having an area of 8×8 cm, followed by ten detector regions defined at the output plane of the diffractive network (FIGS. 11B and 15C), and tested its inference performance using continuous wave illumination at 0.4 THz. (FIG. 14C). Phase values of each substrate layer's 16 neurons 24 were physically encoded using the relative thickness of each 3D-printed neuron 24 (i.e., physical feature 18). Numerical testing of this 5-layer $D^2NN$ design achieved a classification accuracy of 91.75% over ~10,000 test images (FIG. 15A), and to quantify the match between these numerical testing results and the experiments, 50 handwritten digits i.e., 5 different inputs per digit, selected among the same 91.75% of the test images were 3D printed and demonstrated that numerical testing was successful. For each input object that is uniformly illuminated with the THz source, the output plane was imaged of the $D^2NN$ to map the intensity distribution for each detector region that is assigned to a digit. The results illustrated in FIG. 15B demonstrate the success of the 3D-printed diffractive neural network 10 and its inference capability: the average intensity distribution at the output plane of the network for each input digit clearly reveals that the 3D-printed $D^2NN$ 10 was able to focus the input energy of the beam and achieve a maximum signal at the corresponding detector region that was assigned for that digit. Despite 3D-printing errors, possible alignment issues, and other experimental error sources in the experimental set-up, the match between the experimental and numerical testing of the 5-layer $D^2NN$ design was found to be 88% (FIG. 15B). This relatively small reduction in the performance of the experimental network compared to the numerical testing is especially more pronounced for the digit "0" since it is challenging to 3D-print the large void region at the center of the digit; similar printing challenges were also observed for other digits that have void regions, e.g., "6", "8", "9" (FIG. 15B).

Figure 13:
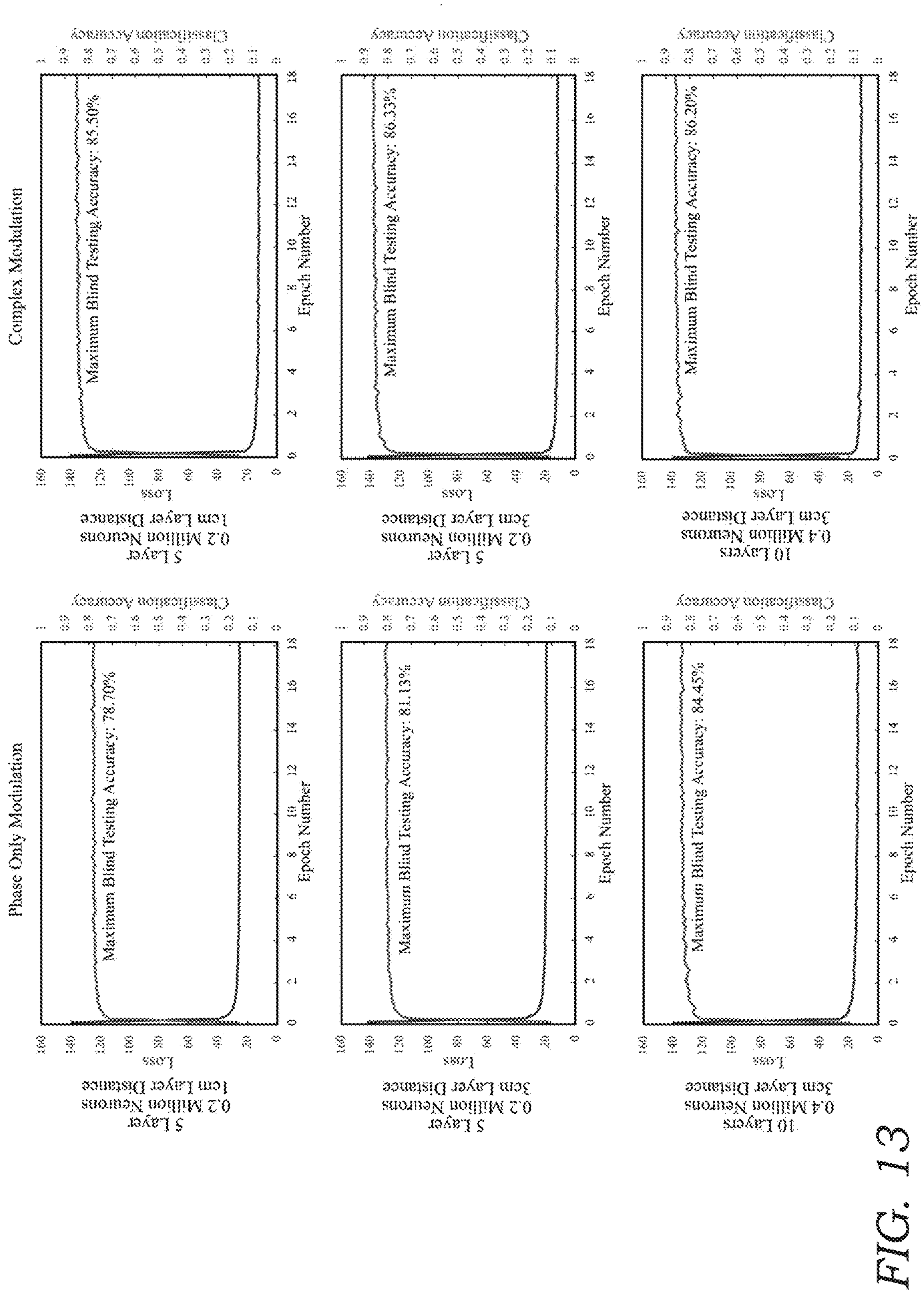
FIG. 13 illustrates fashion MNIST results achieved with $D^2NN$ framework. Training convergence plots of phase-only as well as complex-valued modulation $D^2NN$s (for N=5 and N=10 layers). The y-axis values in each plot report the Fashion MNIST classification accuracy and the loss values as a function of the epoch number for the testing datasets. The $1^{st}$ row and $2^{nd}$ row refer to the same diffractive neural network design (N=5 and 0.2 million neurons in total), except with one difference, the physical space between the layers: 1 cm vs. 3 cm, respectively, which affects the number of connections in the network. As expected, the fully connected networks (with 3 cm layer-to-layer distance) have better inference performance compared to the 1st row that has 1 cm layer-to-layer distance. For each class, the detector width was 4.8 mm.
Figure 17:
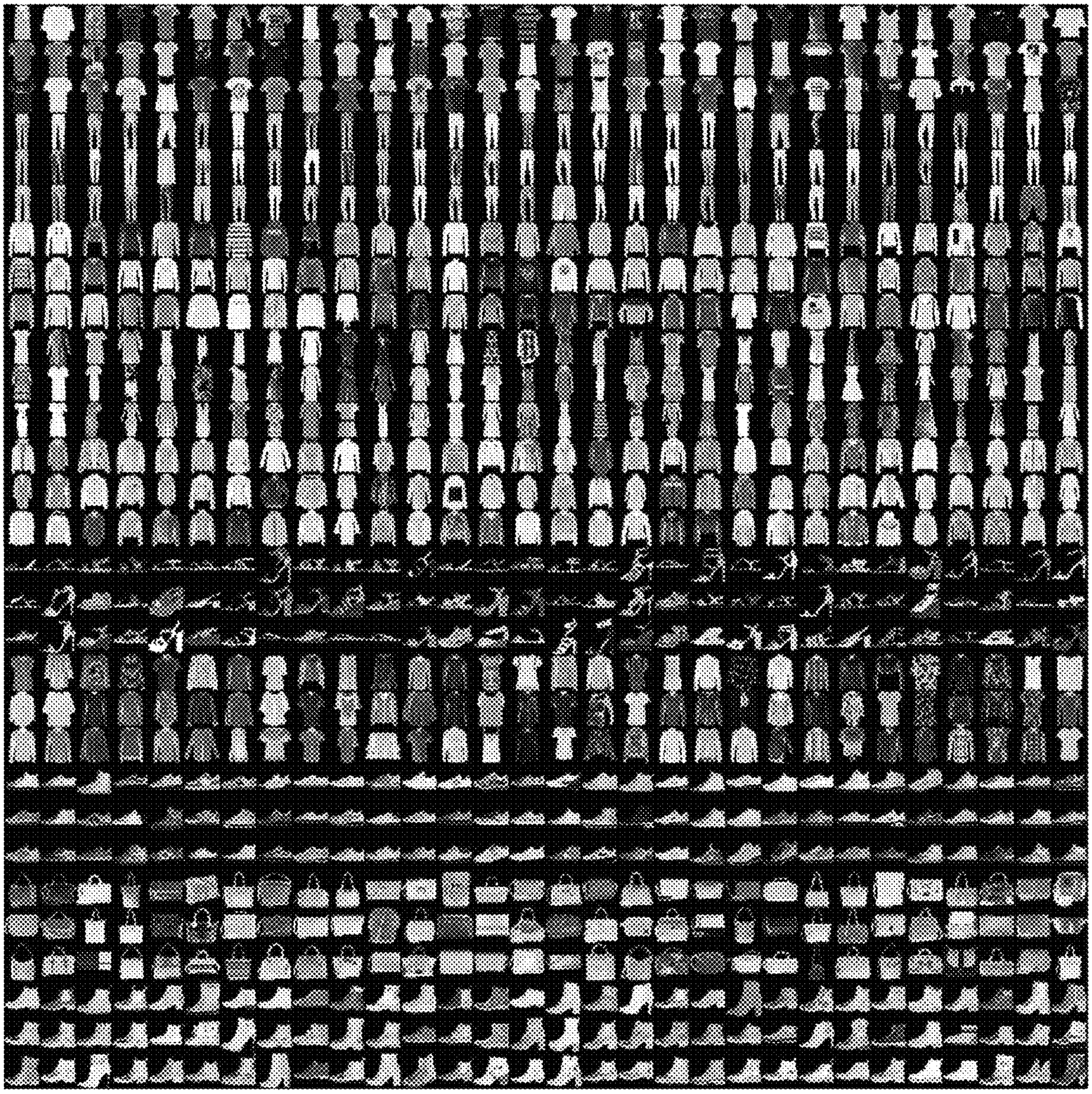
FIG. 17 illustrates some sample images for each class of the Fashion MNIST dataset (https://github.com/zalandoresearch/fashion-mnist).
Figure 18:
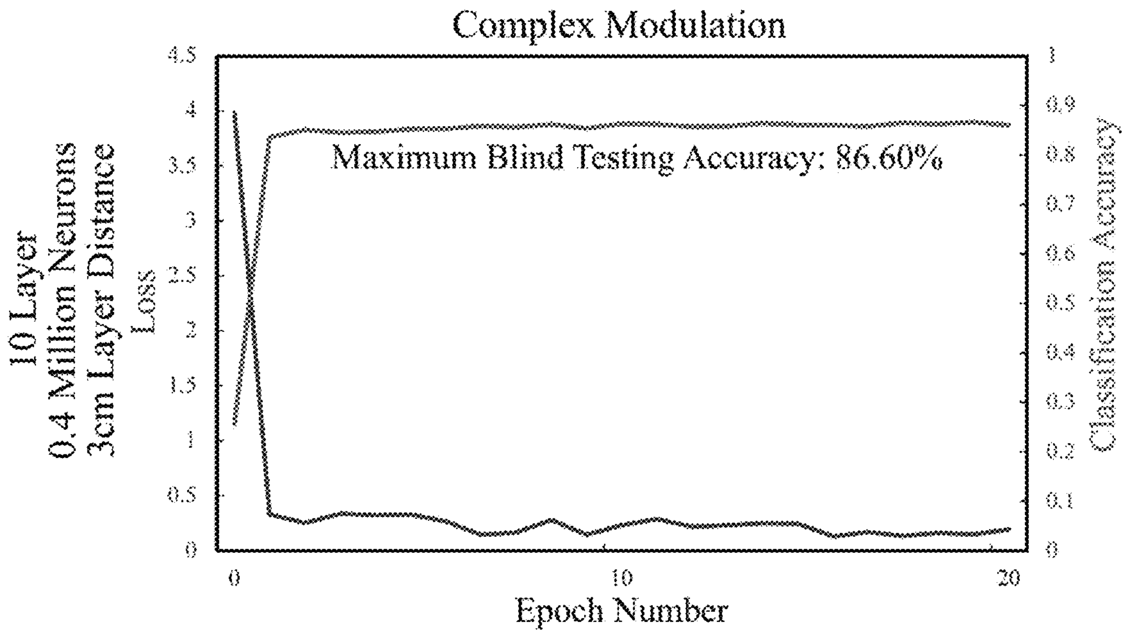
FIG. 18 illustrates convergence plot of a complex-valued modulation $D^2NN$ (for N=10 and 0.4 million neurons in total) for Fashion MNIST classification that achieves a blind testing accuracy of 86.60%. For each class, the detector width was 0.8 mm.

Next, the classification performance of $D^2NN$ framework was tested with a more complicated image dataset, i.e., the Fashion MNIST (github.com/zalandoresearch/fashion-mnist), which includes ten classes, each representing a fashion product (t-shirts, trousers, pullovers, dresses, coats, sandals, shirts, sneakers, bags, and ankle boots; see FIG. 17 for sample images). In general, for a coherently illuminated $D^2NN$ 10 one can use the amplitude and/or phase channels of the input plane 20 to represent data to be classified. In the digit classification results reported earlier, input objects were encoded using the amplitude channel, and to demonstrate the utility of the phase channel of the network input, each input image was encoded corresponding to a fashion product as a phase-only object modulation. The $D^2NN$ inference results (as a function of the number of layers, neurons and connections) for classification of fashion products are summarized in FIG. 3 and FIG. 18. To provide an example of its performance, a phase-only and a complex-valued modulation $D^2NN$ with N=5 diffractive layers (sharing the same physical network dimensions as the digit classification $D^2NN$ shown in FIG. 14A) reached an accuracy of 81.13% and 86.33%, respectively (FIG. 13). By increasing the number of diffractive layers to N=10 and the total number of neurons to 0.4 million, the classification accuracy increased to 86.60% (FIG. 18). For convolutional neural net based standard deep learning, the state-of-the-art performance for Fashion MNIST classification accuracy has been reported as 96.7%, using ~8.9 million learnable parameters and ~2.5 million neurons.

Figures 19A, 19B, 19C:
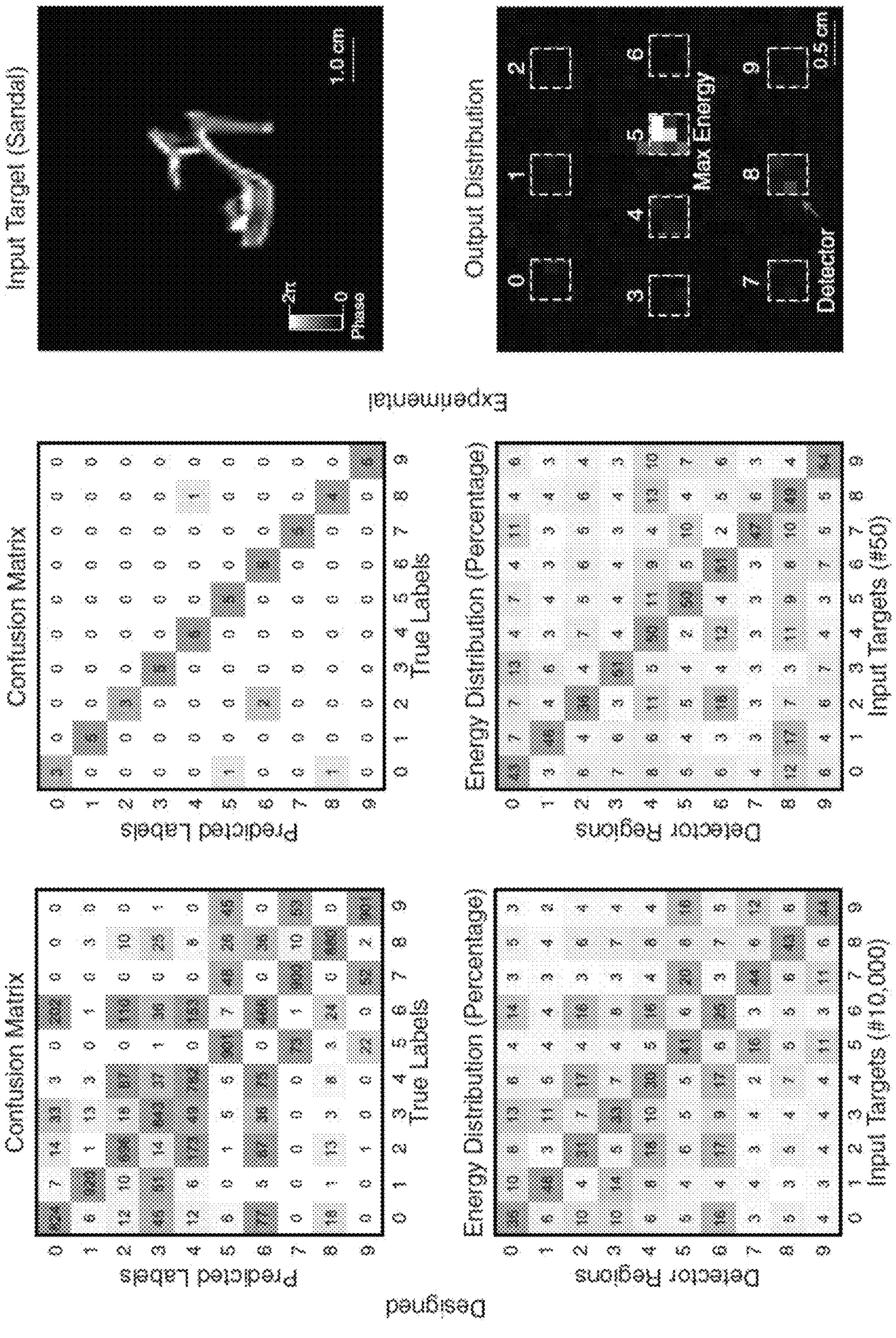
FIG. 19A illustrates how a 3D-printed $D^2NN$ successfully classifies sandal input images (Fashion MNIST class #5) based on ten (10) different detector regions at the output plane of the network, with one detector region corresponding to a sandal image.
FIG. 19B illustrates the confusion matrix and the energy distribution percentage for the experimental results, using 50 different fashion products that were 3D-printed (i.e., 5 per class) selected among the images that numerical testing was successful.
FIG. 19C illustrates an input image of a sandal that is input to the $D^2NN$ along with the output plane at the trained detector regions. The dotted squares represent the trained detector regions for different image classes (number is shown next to each region). The sandal image class corresponds to detector #5 which is illuminated with light from the $D^2NN$.
Figure 19D:
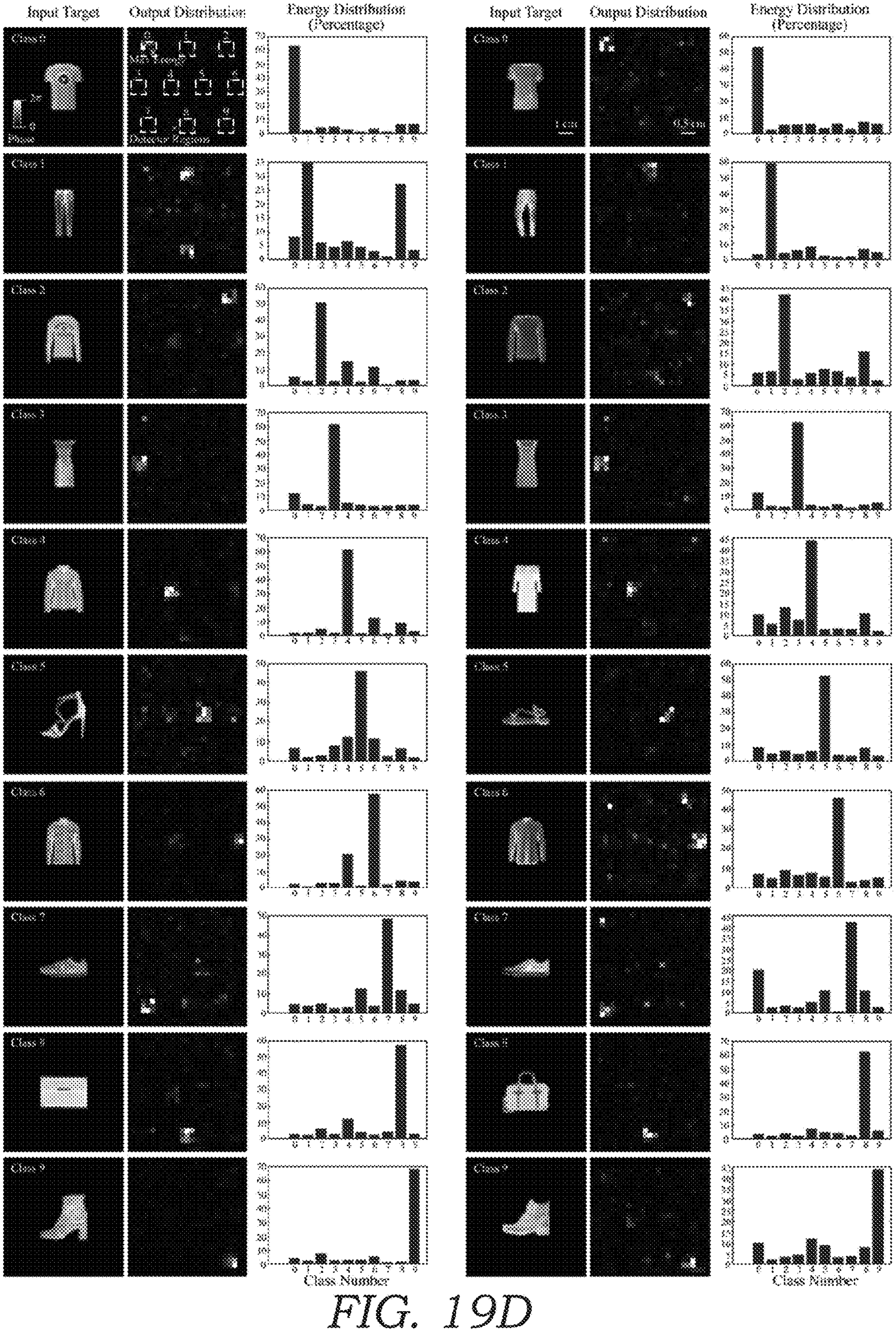
FIG. 19D illustrates sample experimental results for fashion product classifier $D^2NN$. The energy distribution percentage corresponding to each product at the output plane shows that $D^2NN$ has the maximum energy focused on the target detector region of each product.

To experimentally demonstrate the performance of fashion product classification using a physical $D^2NN$ 10, a phase-only five (5) substrate 16 design was 3D-printed and fifty (50) fashion products used as test objects (i.e., 5 per class) based on the same procedures employed for digit classification diffractive network (FIG. 14A, FIG. 15B), except that each input object 14 information was encoded in the phase channel. The results are summarized in FIGS. 19A-19C, revealing a 90% match between the experimental and numerical testing of the 5-layer $D^2NN$ design, with 5 errors out of 50 fashion products. Compared to digit classification (6 errors out of 50 digits, FIG. 15B), a slightly better match was obtained between the experimental and numerical testing results (despite the more challenging nature of Fashion MNIST dataset), which might be related to the fact that the phase channel was used to encode input image information for fashion products, which does not suffer from the challenges associated with 3D-printing of void regions, such as in digits "0", "6", "8" and "9."

Figure 20A:
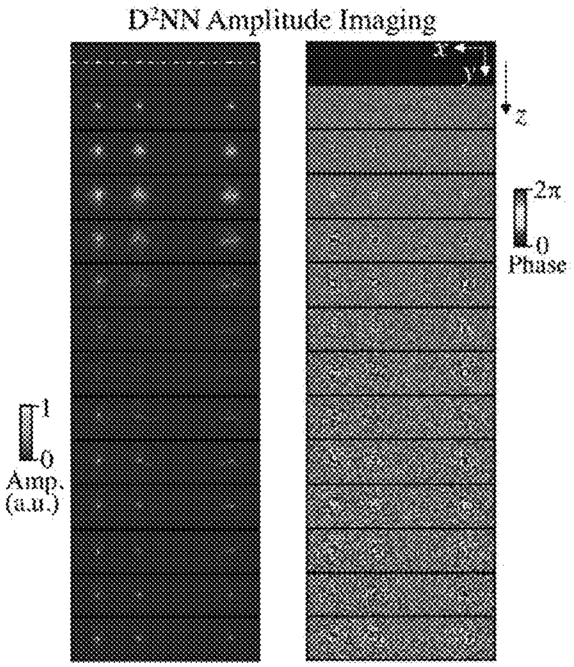
FIGS. 20A-20D illustrate wave propagation within an imaging $D^2NN$ (FIGS. 20A, 20C) as compared to free-space propagation without a $D^2NN$ (FIGS. 20B, 20D). Specifically.
Figure 20B:
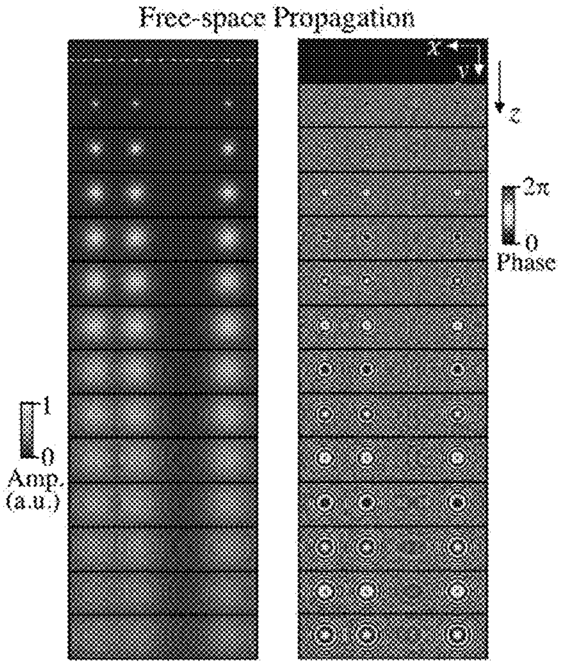
Figure 20C:
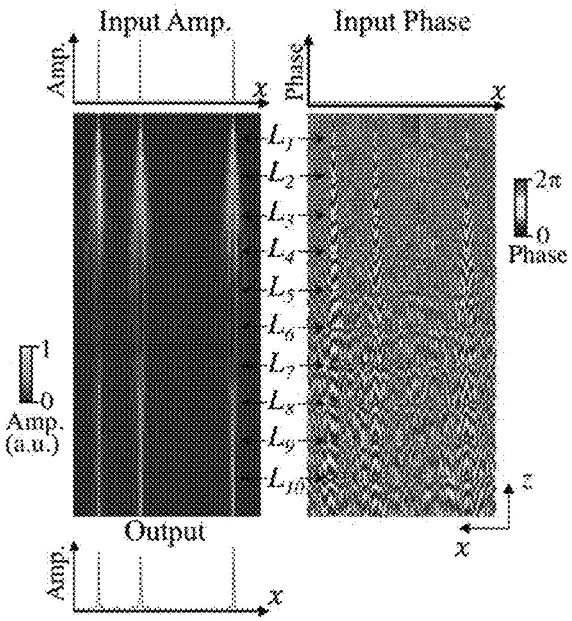
Figure 20D:
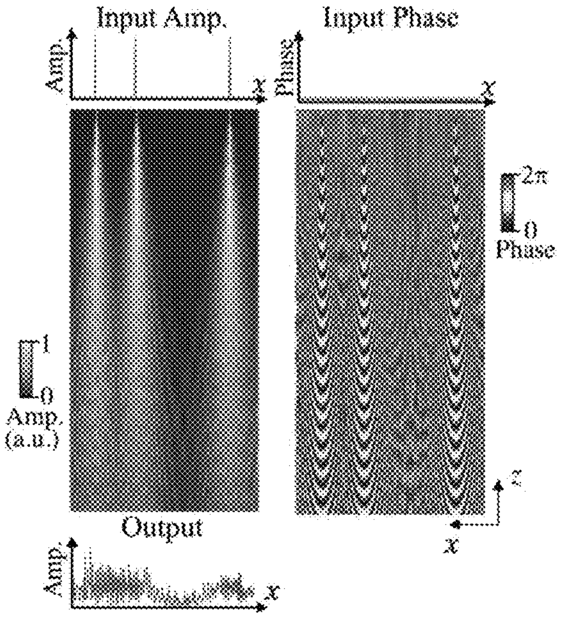

Next, the performance of a phase-only $D^2NN$ 10 was tested, composed of five (5) 3D-printed transmission substrate layers 16 (see FIG. 14B), which was trained using ImageNet database (www.image-net.org) to create a unit-magnification image of the input optical field amplitude at its output plane (~9×9 cm), i.e., the output image 22 has the same physical size as the input object 14. As illustrated in FIGS. 20A, 20C, the trained network initially connects every single amplitude point at the input plane to various neurons and features of the following layers, which then focus the light back to a point at the output (i.e., image) plane, which is, as expected, quite different than the case of free-space diffraction (i.e., without the presence of the diffractive network), illustrated in FIGS. 20B, 20D.

After its training and blind testing, numerically proving the imaging capability of the network as shown in FIGS. 20A-20D and 21A-21C, a 3D-printed physical $D^2NN$ 10 was created based on the design. Using the same experimental set-up shown in FIG. 14C, the output plane 22 of the 3D-printed $D^2NN$ 10 was imaged for various input objects 14 that were uniformly illuminated by continuous wave radiation at 0.4 THz. FIGS. 22A-22D summarizes the experimental results achieved with this 3D-printed $D^2NN$ 10, which successfully projected unit-magnification images ($D^2NN$ images) of the input patterns at the output plane 22 of the network 10, learning the function of an imaging lens, or a physical auto-encoder.

Figure 21A:
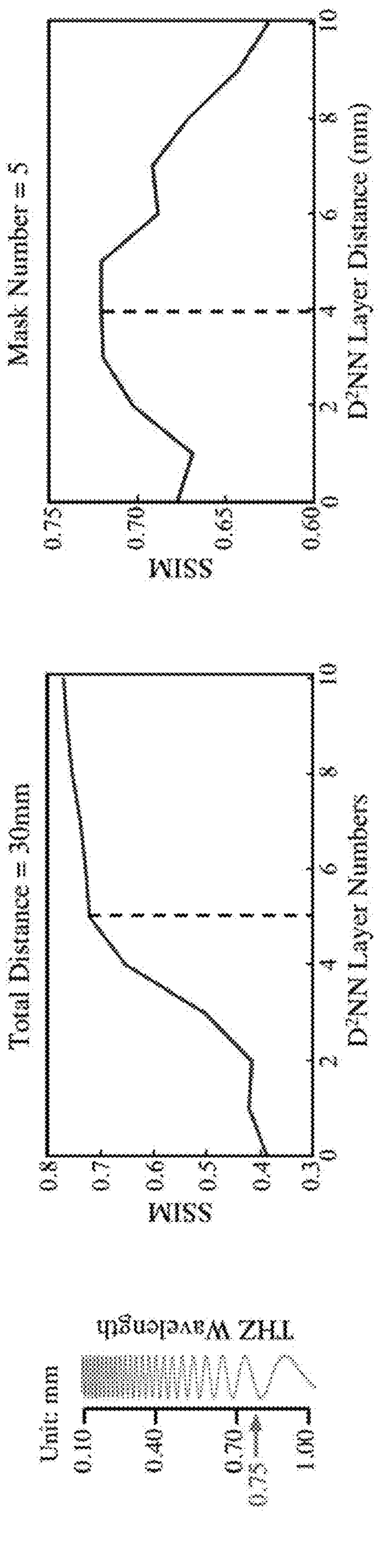
FIG. 21A illustrates how the performance of the imaging lens $D^2NN$ was optimized by tuning the physical layout of its architecture, including the number of layers ($D^2NN$ Layer Number) and the axial distance between the two consecutive layers ($D^2NN$ Layer distance). SSIM (structural similarity index) was used in this analysis, and 5 layers with an axial distance of 4 mm between two successive substrate layers was selected in order to maximize the network performance, while also minimizing its structural complexity.
Figure 21B:
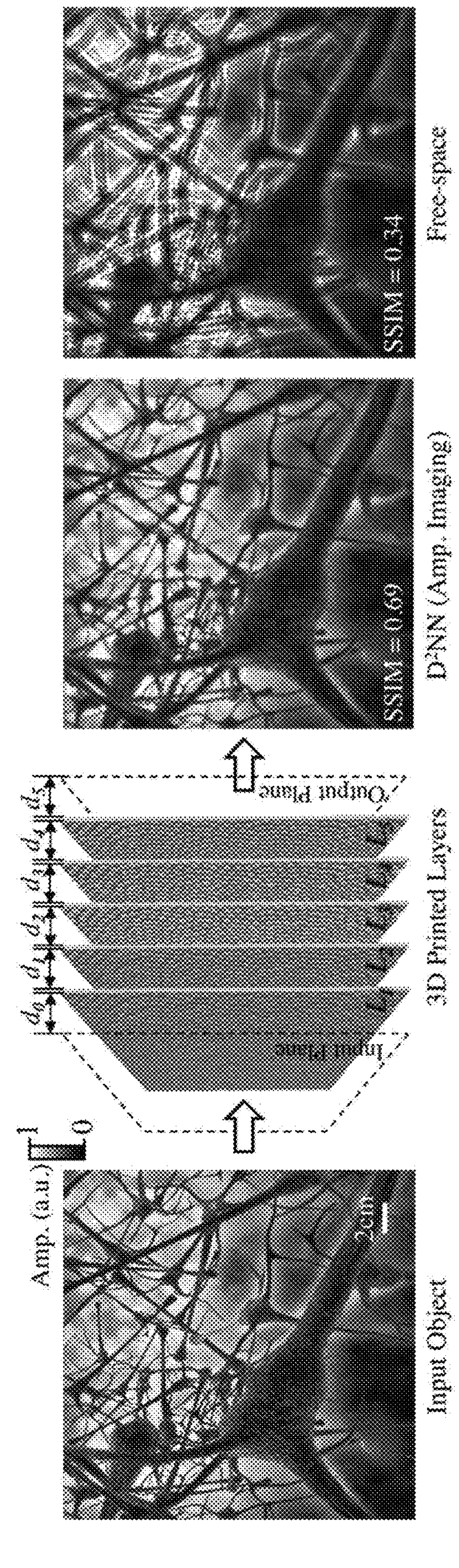
FIG. 21B illustrates that after the selection of the optimal neural network layout, the $D^2NN$ was trained using ImageNet dataset. After its training, the performance of the resulting $D^2NN$ was blinding tested with test images to demonstrate its success in imaging arbitrary input objects.
Figure 21C:
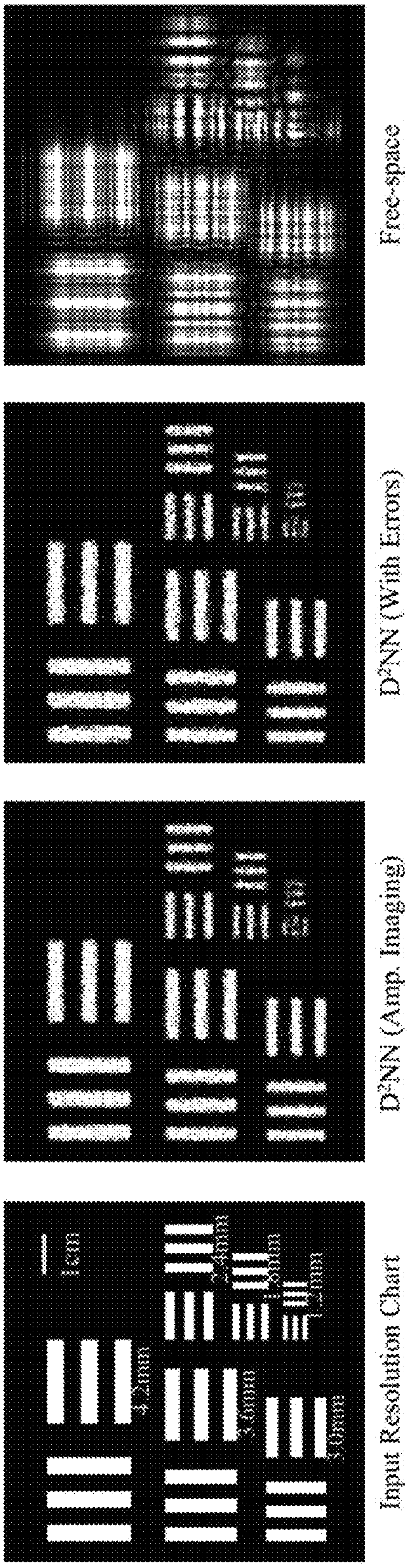
FIG. 21C illustrates blind testing results revealed that the trained $D^2NN$ can resolve at its output plane a linewidth of 1.2 mm. As shown in the 3rd image on the right ($D^2NN$ With Errors), the Poisson surface reconstruction errors, absorption related losses at different layers and a random misalignment error of 0.1 mm for each layer of the network design have little effect on the imaging performance of the $D^2NN$. For comparison, the last image on the right shows the diffracted image at the output plane, without the presence of the $D^2NN$ (i.e., free-space).
Figure 22B:
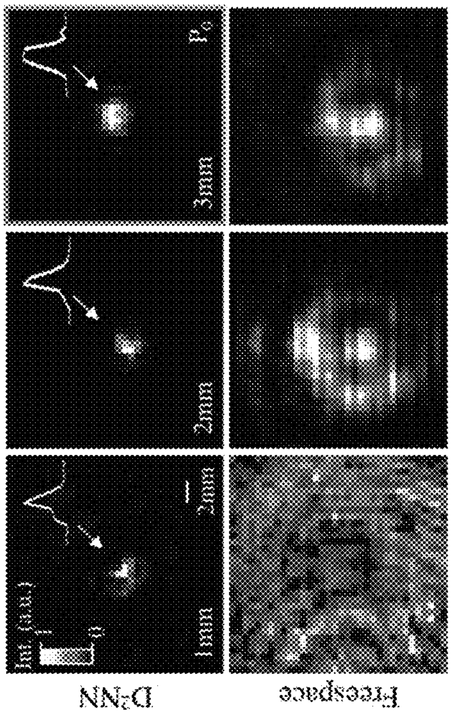
FIG. 22B illustrates output images of the same 3D-printed lens D$^2$NN as used in FIG. 22A except the input objects were pinholes with diameters of 1 mm, 2 mm and 3 mm.
Figure 22A:
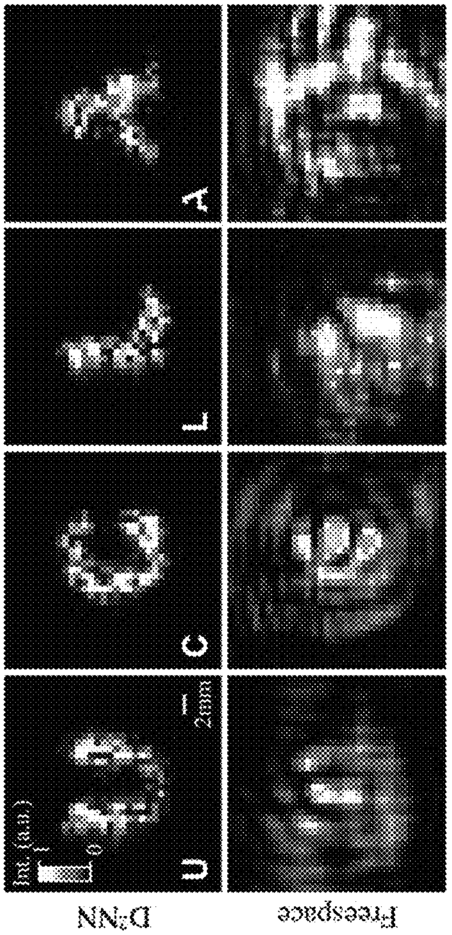
FIG. 22A illustrates output images of the 3D-printed lens $D^2NN$ are shown for different input objects: 'U', 'C', 'L' and 'A'. To be able to 3D-print letter 'A', the letter was slightly modified as shown in the bottom-left corner of the corresponding image panel. For comparison, free-space diffraction results corresponding to the same objects, achieved over the same sample-output plane distance (29.5 mm) without the 3D-printed network, are also shown.
Figure 22D:
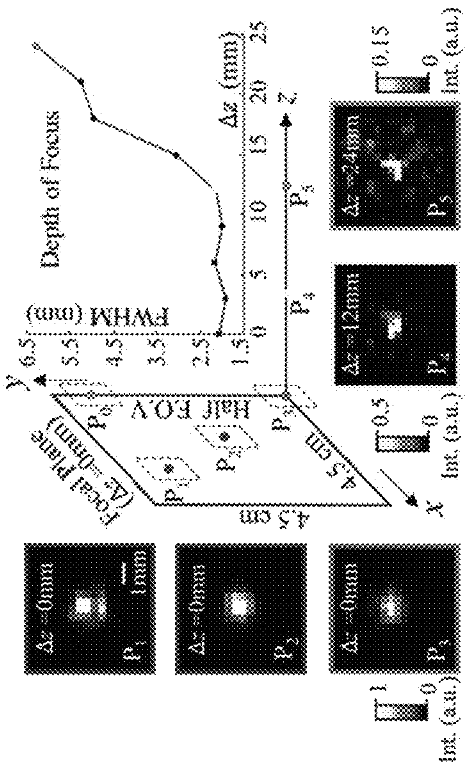
FIG. 22D illustrates the results of using a 3-mm pinhole that is scanned in front of the 3D-printed network where the tolerance of the physical D$^2$NN was evaluated as a function of the axial distance. For four different locations on the input plane of the network, i.e., $P_1$-$P_3$, in FIG. 22D and FIG. 22B very similar output images for the same 3-mm pinhole. The 3D-printed network was found to be robust to axis defocusing up to ~12 mm from the input plane.
Figure 22C:
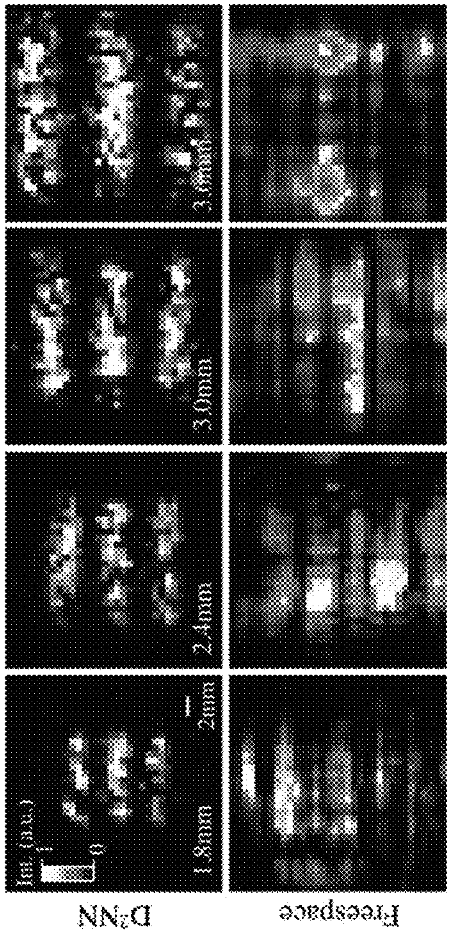
FIG. 22C illustrates that the D$^2$NN can resolve a line-width of 1.8 mm at its output plane.
Figure 23A:
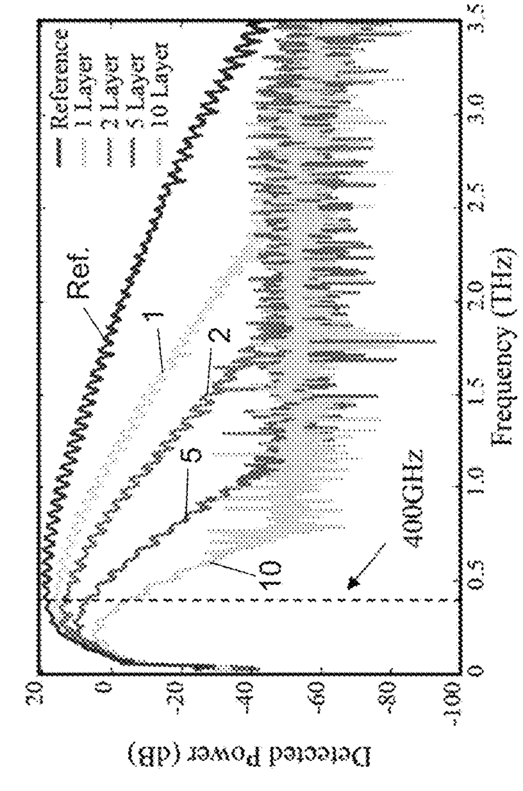
FIG. 23A illustrates a graph showing the characterization of the 3D-printing material (VeroBlackPlus RGD875) with a terahertz time-domain spectroscopy setup. 1 mm-thick plastic layers were placed between the terahertz emitter and detector, and the transmitted field from the plastic layers was measured. The Fourier transform of the detected field was taken to calculate the detected power as a function of the frequency. The detected power levels for different numbers of 3D-printed layers are shown, revealing that the material loss increases at higher frequencies. Reference signal shows the detected power without any plastic layers on the beam path.
Figure 23B:
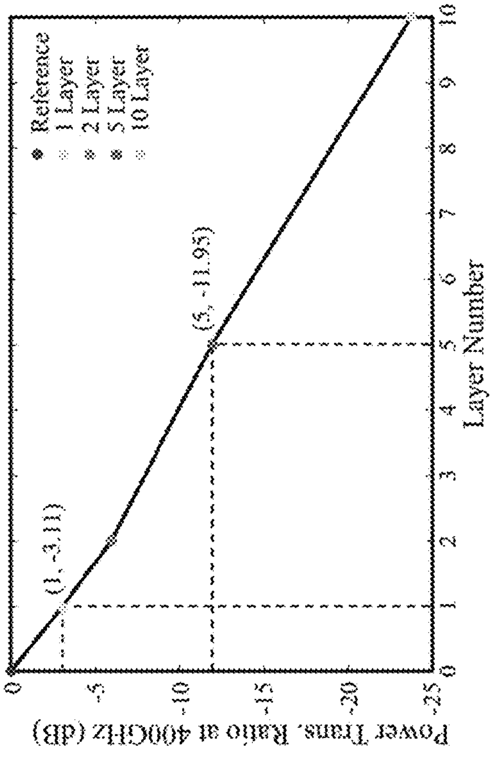
FIG. 23B illustrates a graph of the power transmission ratio as a function of the number of layers is shown. The light transmission efficiency of a single 1 mm-thick 3D-printed layer is $10^{-3.11/10}$=48.87%, and it drops to $10^{-11.95/10}$=6.38% for five 1 mm-thick 3D-printed layers.
Figure 23C:
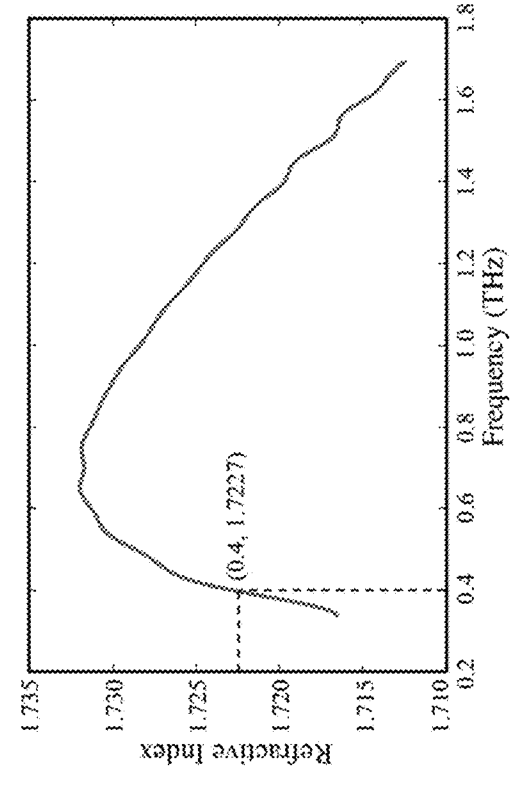
FIG. 23C illustrates a graph of the refractive index of the material as a function of frequency. At 0.4 THz, the refractive index of the 3D-printing material can be calculated as 1.7227.
Figure 23D:
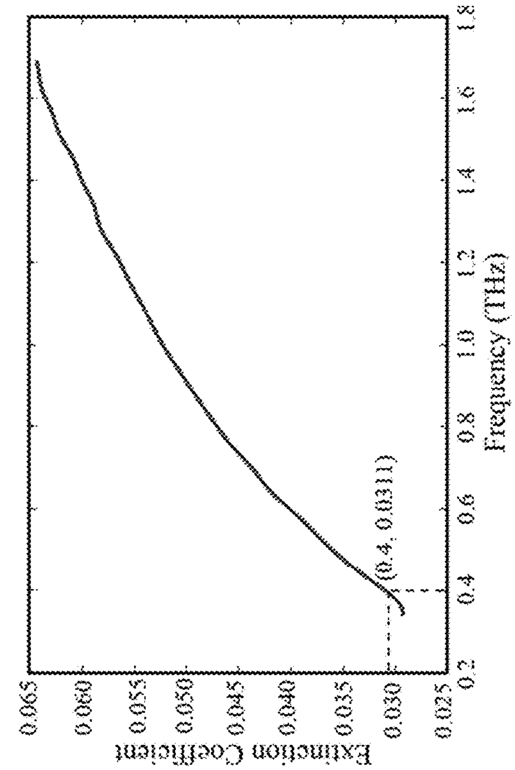
FIG. 23D illustrates a graph of the extinction coefficient of the 3D-printing material as a function of frequency. At 0.4 THz, the extinction coefficient of the 3D-printing material can be calculated as 0.0311. The numbers from FIGS. 23C and 23D were used in the design and training of each D$^2$NN so that the final 3D-printed network works as designed.

To evaluate the point spread function of the $D^2NN$ 10, pinholes were imaged with different diameters (1 mm, 2 mm and 3 mm), which resulted in output images 22, each with a full-width-at-half-maximum (FWHM) of 1.5 mm, 1.4 mm and 2.5 mm, respectively (FIG. 22B). The results also revealed that the printed $D^2NN$ 10 can resolve a line-width of 1.8 mm at 0.4 THz (corresponding to a wavelength of 0.75 mm in air), which is slightly worse in resolution compared to the numerical testing of the $D^2NN$ design, where the network could resolve a line-width of ~1.2 mm (FIG. 21C). This experimentally observed degradation in the performance of the diffractive network can be due to e.g., 3D-printing errors, potential misalignments and absorption related losses in the 3D-printed $D^2NN$ 10.

Figure 14B:
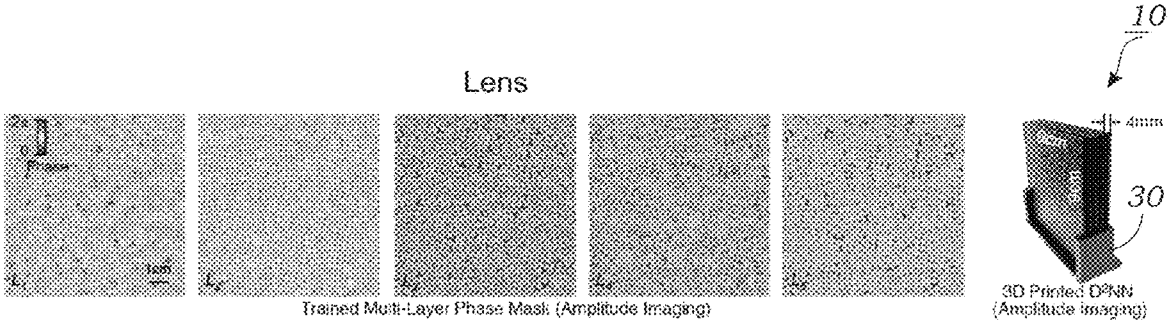
FIG. 14B illustrates the final designs of five different layers ($L_1$, $L_2$, . . . , $L_5$) of the imaging lens $D^2NN$. An image of the $D^2NN$ in a holder is shown on the right side of the page.
Figure 14C:
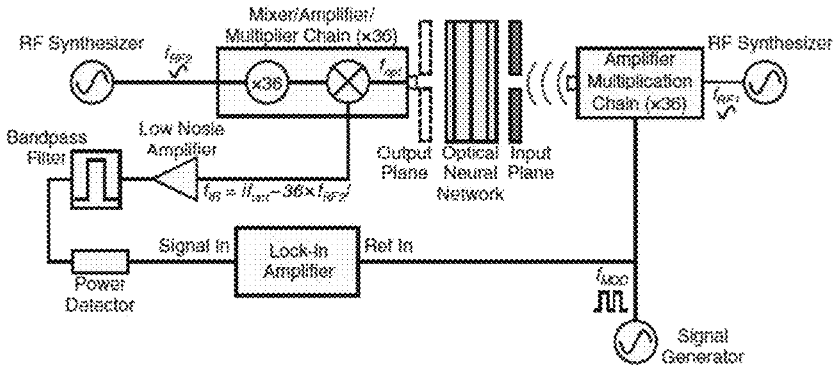
FIG. 14C illustrates a schematic representation of the experimental THz setup used for experiments described herein. An amplifier/multiplier chain was used to generate continuous wave radiation at 0.4 THz and a mixer/amplifier/multiplier chain was used for the detection at the output plane of the network.

Note also that, based on the large area of the 3D-printed network substrate layers 16 (9×9 cm) and the short axial distance between the input (output) plane and the first (last) layer of the $D^2NN$ 10, i.e., 4 mm (7 mm), one can infer that the theoretical numerical aperture of this system approaches 1 in air (see FIG. 14B). During the training phase, however, the diffractive network learned to utilize only part of this spatial frequency bandwidth, which should be due to the relatively large-scale of the image features that were used in the training image set (randomly selected from ImageNet database). If a higher resolution imaging system is desired, images that contain much finer spatial features can be utilized as part of the training phase to design a $D^2NN$ 10 that can approach the theoretical diffraction-limited numerical aperture of the system. One can also change the loss function definition used in the training to teach the diffractive neural network to enhance the spatial resolution. In fact, deep learning provides a powerful framework to improve image resolution by engineering the loss function used to train a neural network.

Discussion

For a $D^2NN$ 10, after all the parameters are trained and the physical diffractive $D^2NN$ 10 is fabricated or otherwise manufactured, the computation of the network function (i.e., inference) is implemented all-optically using a light source 12 and optical diffraction through passive components (i.e., the substrates 16). Therefore, the energy efficiency of a $D^2NN$ 10 depends on the reflection and/or transmission coefficients of the substrates 16. Such optical losses can be made negligible, especially for phase-only networks that employ e.g., transparent materials that are structured using e.g., optical lithography, creating $D^2NN$ 10 designs operating at the visible part of the spectrum. In these experiments, a standard 3D-printing material (VeroBlackPlus RGD875) was used to provide phase modulation, and each layer of the $D^2NN$ 10 shown in FIGS. 14A, 14B had on average ~51% power attenuation at 0.4 THz for an average thickness of ~1 mm (see FIGS. 23A-23D). This attenuation could be further decreased by using thinner substrates 16 or by using other materials (e.g., polyethylene, polytetrafluoroethylene) that have much lower losses in THz wavelengths. In fact, one might also use the absorption properties of the neurons 24 of a given substrate layer 16 as another degree of freedom in the network design to control the connectivity of the network, which can be considered as a physical analog of the dropout rate in deep network training. In principle, a phase-only $D^2NN$ 10 can be designed by using the correct combination of low-loss materials and appropriately selected illumination wavelengths, such that the energy efficiency of the diffractive network is only limited by the Fresnel reflections that happen at the surfaces of different layers. Such reflection related losses can also be engineered to be negligible by using anti-reflection coatings on the substrates. In the discussions so far, multiple-reflections between the substrate layers 16 have been neglected since such waves are much weaker compared to the directly transmitted forward-propagating waves. The match between the experimental results obtained with the 3D-printed $D^2NNs$ 10 and their numerical simulations also supports this.

The operation principles of $D^2NN$ 10 can be easily extended to amplitude-only or phase/amplitude-mixed transmissive or reflective designs. Whether the network layers perform phase-only or amplitude-only modulation, or a combination of both, what changes from one design to another is only the nature of the multiplicative bias terms, $t_i^l$ or $r_i^l$ for a transmissive or reflective neuron 24, respectively, and each neuron 24 of a given substrate layer 16 will still be connected to the neurons 24 of the former layer through a wave-interference process, $\Sigma_k\, n_k^{l-1}(x_i, y_i, z_i)$, which provides the complex-valued input to a neuron 24. Compared to a phase-only D²NN design, where $|t_i^l|=|r_i^l|=1$, a choice of $|t_i^l|<1$ or $|r_i^l|<1$ would introduce additional optical losses, and would need to be taken into account for a given illumination power and detection SNR at the network output plane 22. In some embodiments, one can potentially also create diffractive D²NN 10 networks that employ a physical gain (e.g., through optical or electrical pumping, or nonlinear optical phenomena, including but not limited to plasmonics and metamaterials) to explore the domain of amplified bias terms, i.e., $|t_i^l|>1$ or $|r_i^l|>1$. At the cost of additional complexity, such amplifying layers can be useful for the diffractive neural network to better handle its photon budget and can be used after a certain number of passive layers to boost up the diffracted signal, intuitively similar to e.g., optical amplifiers used in fiber optic communication links.

Optical implementation of learning in artificial neural networks is promising due to the parallel computing capability and power efficiency of optical systems. Compared to previous opto-electronics based learning approaches, the D²NN framework provides a unique all-optical deep learning engine that efficiently operates at the speed of light using passive components and optical diffraction. An important advantage of D²NNs 10 is that they can be easily scaled up using various high-throughput and large-area 3D fabrication methods (e.g., soft-lithography, 3D printing, additive manufacturing) and wide-field optical components and detection systems, to cost-effectively reach tens to hundreds of millions of neurons 24 and hundreds of billions of connections in a scalable and power-efficient manner. For example, integration of a D²NN 10 with lens-free on-chip imaging systems could provide extreme parallelism within a cost-effective and portable platform. Such large-scale D²NNs 10 might be transformative for various applications, including all-optical image analysis, feature detection, object classification, and might also enable new microscope or camera designs that can learn to perform unique imaging tasks/functions using D²NNs 10.

Figure 24A:
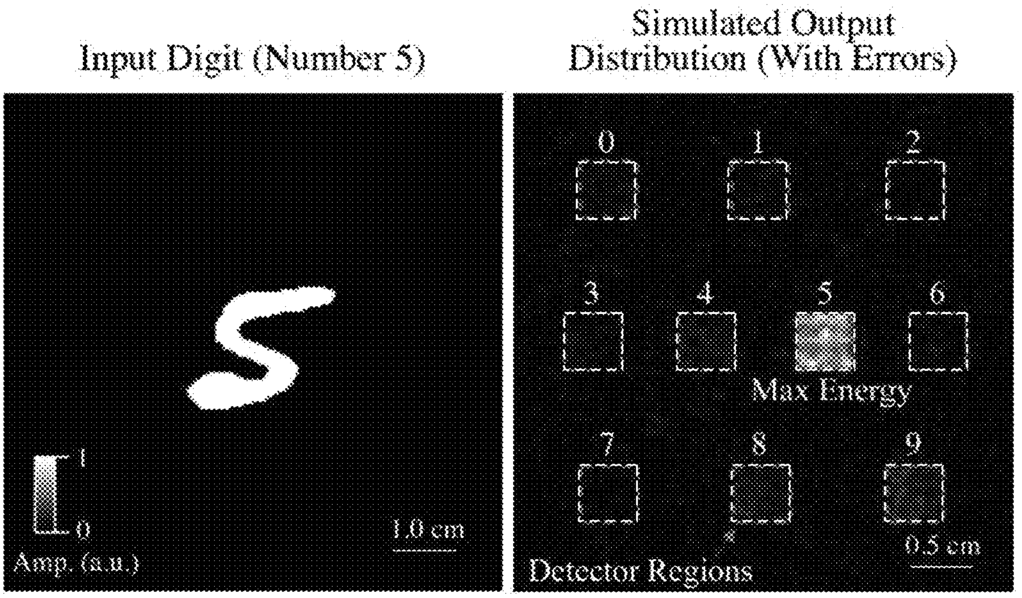
FIG. 24A illustrates an input image of handwritten digit "5" and the output image of the digit classifier D$^2$NN where the squares represent the trained detector regions for each digit.
Figure 24B:
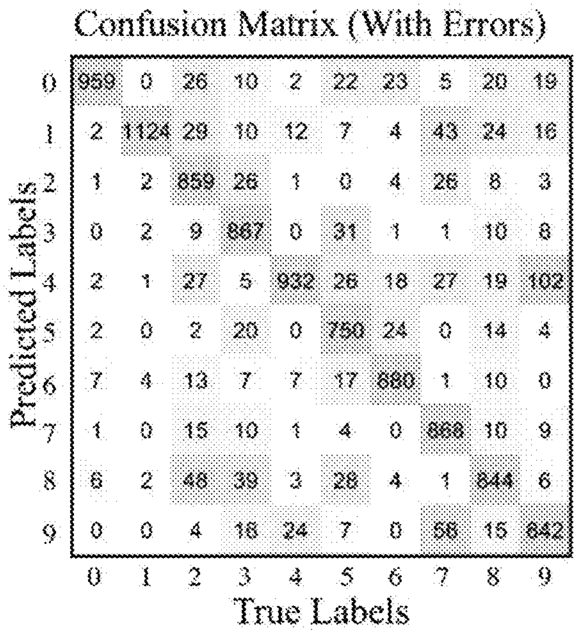
FIG. 24B illustrates the confusion matrix and the energy distribution percentage for experimental results, using fifty (50) different handwritten digits that were 3D-printed (i.e., 5 for each digit) selected among the images that numerical testing was successful similar to FIG. 15B except they now take into account the Poisson surface reconstruction errors, absorption related losses at different layers and a random misalignment error of 0.1 mm for each layer of the network design.
Figure 24C:
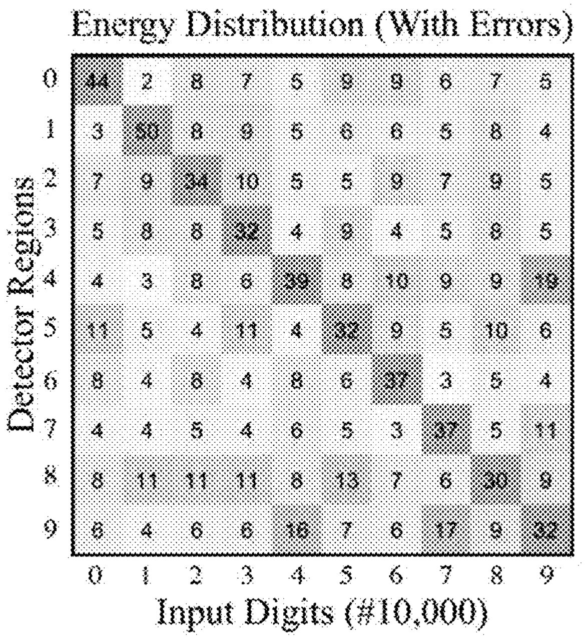
FIG. 24C illustrates the confusion matrix and the energy distribution percentage for numerical testing results for 10,000 different handwritten digits (~1,000 for each digit) (with error correction noted above), achieving a classification accuracy of 91.75% using a 5-layer design. All these sources of error reduced the overall performance of the diffractive network's digit classification accuracy from 91.75% to 89.25%, evaluated over 10,000 different handwritten digits (i.e., approximately 1,000 for each digit).

Some of the main sources of error in the experiments include the alignment errors, fabrication tolerances and imperfections. To mitigate these, a 3D-printed holder (FIGS. 8, 14A, 14B) was made to self-align the multi-layer structure of a 3D-printed D²NN 10, where each substrate layer 16 and the input object 14 were inserted into their specific slots. Based on the resolution of the 3D-printer, the misalignment error of a 3D-printed D²NN (including its holder) is estimated to be smaller than 0.1 mm compared to the ideal positions of the neurons 24 of a given layer, and this level of error was found to have a minor effect on the network performance as illustrated in FIGS. 21A-21C and 24A-24C. In fact, a comparison of FIG. 15A (the performance of a digit classification D²NN design without any alignment errors or imperfections) and FIGS. 24A-24C reveals that the diffractive surface reconstruction errors, absorption related losses at different layers and 0.1 mm random misalignment error for each network substrate layer 16, all combined, reduced the overall performance of the network's digit classification accuracy from 95.08% (FIG. 15A) to 94.77% (FIGS. 24A-24C). This also means that some of the experimental errors that were observed in FIG. 15B can be attributed to the imperfections in 3D-printing of the handwritten digits that have a void region, e.g., "0", "6", "8" and "9".

For an inexpensive 3D-printer or fabrication method, printing/fabrication errors and imperfections, and the resulting alignment problems can be further mitigated by increasing the area of each substrate layer 16 and the footprint of the D²NN 10. This way, the physical feature 18 size at each substrate layer 16 can be increased, which will partially release the alignment requirements. The disadvantage of such an approach of printing larger diffractive networks, with an increased feature 18 size, would be an increase in the physical size of the system and its input optical power requirements. Furthermore, to avoid bending of the network layers over larger areas, an increase in layer thickness and hence its stiffness would be needed, which can potentially also introduce additional optical losses, depending on the illumination wavelength and the material properties. In order to minimize alignment errors and improve the performance of a D²NN 10, a monolithic D²NN 10 design that combines all the substrate layers 16 of the network as part of a 3D fabrication method (i.e., there are not gaps between adjacent substrate layers 16) can be used. Among other techniques, laser lithography based on two-photon polymerization can provide a desired solution for creating such monolithic D²NNs 10.

Another embodiment is the use of spatial light modulators (SLMs) as part of a D²NN 10. This approach of using SLMs in D²NNs 10 has several advantages, at the cost of an increased complexity due to deviation from an entirely passive optical network to a reconfigurable electro-optic one. First, a D²NN 10 that employs one or more SLMs can be used to learn and implement various tasks because of its reconfigurable architecture. Second, this reconfigurability of the physical network can be used to mitigate alignment errors or other imperfections in the optical system of the network. Furthermore, as the optical network statistically fails, e.g., a misclassification or an error in its output is detected, it can mend itself through a transfer learning-based re-training with appropriate penalties attached to some of the discovered errors of the network as it is being used. For building a D²NN 10 that contains SLMs, both reflection and transmission-based modulator devices can be used to create an optical network that is either entirely composed of SLMs or a hybrid one, i.e., employing some SLMs in combination with fabricated (i.e., passive) substrate layers 16.

Materials and Methods

Figure 25A:
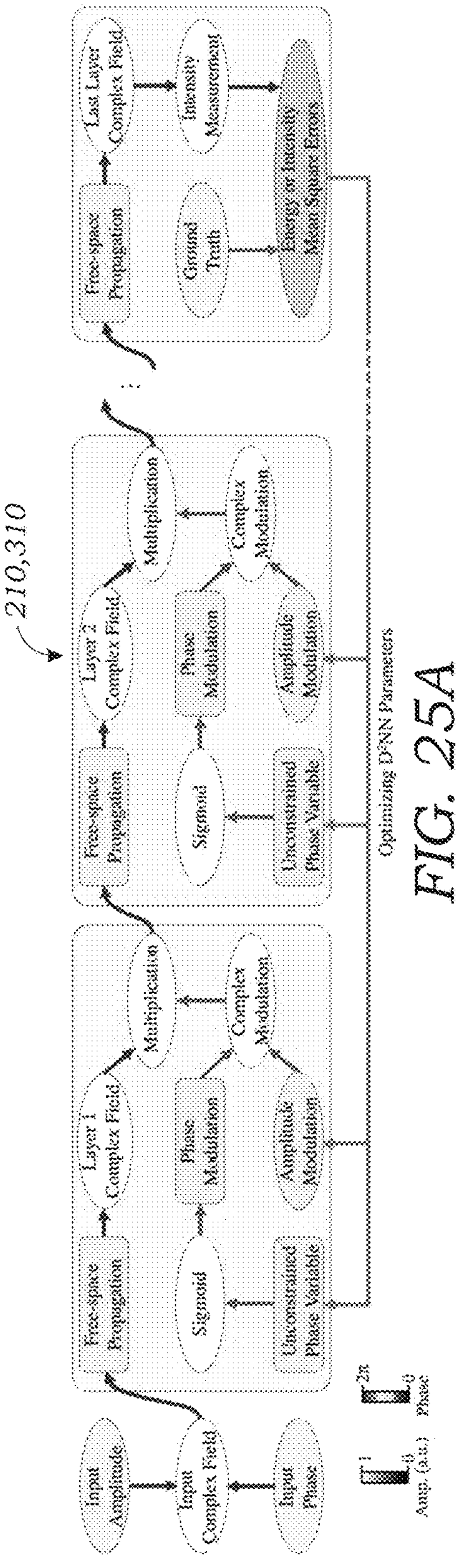
FIG. 25A illustrates the TensorFlow implementation of a diffractive deep neural network training. The resulting complex field of free-space propagated field is multiplied with a complex modulator at each layer and is then transferred to the next layer. To help with the 3D-printing and fabrication of the D$^2$NN design, a sigmoid function was used to constrain the phase value of each neuron.
Figure 25B:
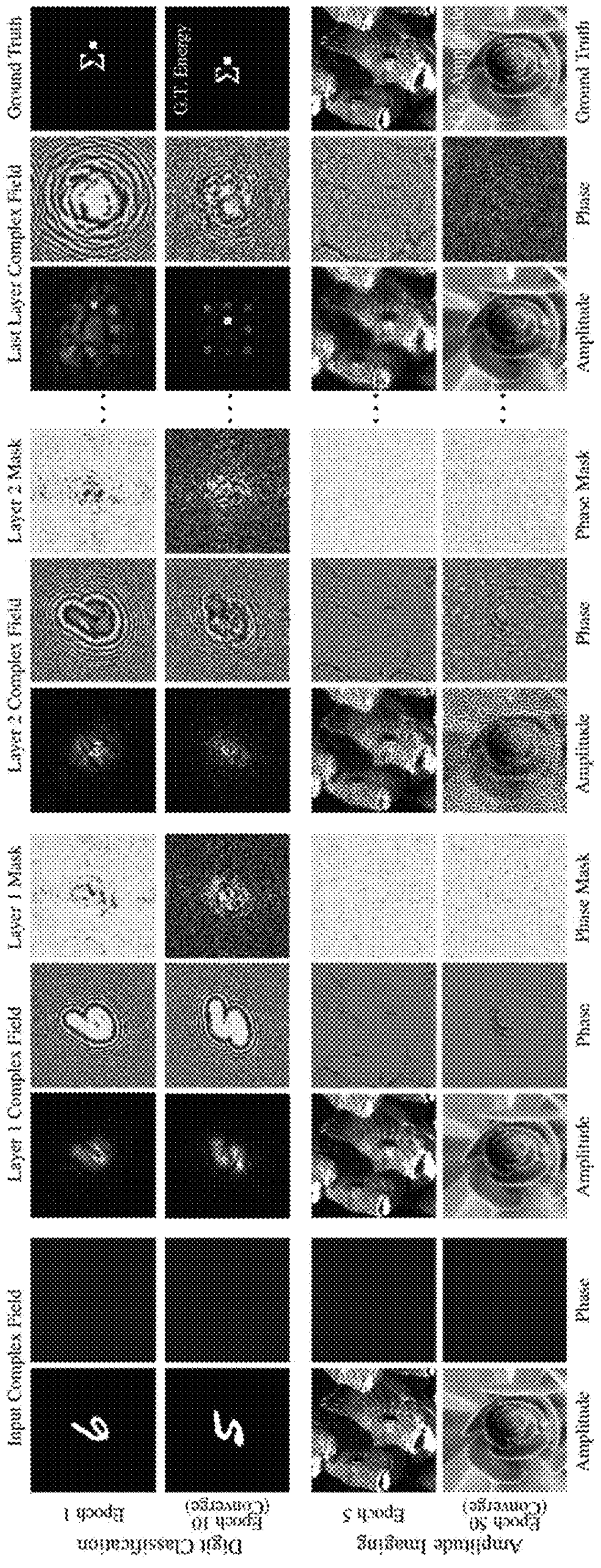
FIG. 25B illustrates MNIST and ImageNet datasets used to train the D$^2$NNs for handwritten digit classification and imaging lens tasks, respectively. Fashion MNIST dataset was used for training the fashion product classifier D$^2$NN. The resulting complex fields and phase patterns of each layer are demonstrated at different epochs of the training phase.

The D²NN 10 design was implemented using TensorFlow (Google Inc.) framework, as shown in FIGS. 25A and 25B. Because coherent illumination was used, the input information can be encoded in the amplitude and/or phase channels of the input plane 20. The free-space propagation module is implemented using the angular spectrum method. To help with the 3D-printing and fabrication of the D²NN design, a sigmoid function was used to limit the phase value of each neuron to 0-2π and 0-π, for imaging and classifier networks, respectively. For each substrate layer 16 of the D²NN 10, the neuron 24 size was set to be 400 μm and 300 μm, for the classifier networks and the imaging network, respectively. With a higher resolution 3D-printer or fabrication method, smaller neurons 24 can also be used in the D²NN design to increase the number of neurons 24 and connections to learn more complicated tasks. Furthermore, as illustrated in FIG. 21A, the number of the substrate layers 16 and the axial distance between the substrate layers 16 are also design parameters.

At the detector/output plane 22, the intensity of the network output was measured, and as a loss function to train the imaging D²NN its mean square error (MSE) was used against the target image. The classification D²NNs were also trained using a nonlinear loss function, where the aim was to maximize the normalized signal of each target's corresponding detector region, while minimizing the total signal outside of all the detector regions (see, e.g., FIG. 15C). The stochastic gradient descent algorithm, Adam, was used to back-propagate the errors and update the layers of the designed $D^2NN$ 10 to minimize the loss function. The digit classifier and lens embodiments of the $D^2NNs$ 10 were trained with MNIST and ImageNet datasets, respectively, and achieved the desired mapping functions between the input and output planes 10, 22 after ten and fifty epochs, respectively. The training batch size was set to be 8 and 4, for the digit classifier network and the imaging network, respectively. The training phase of the fashion product classifier network shared the same details as the digit classifier network, except using the Fashion MNIST dataset. The networks were implemented using Python version 3.5.0. and TensorFlow framework version 1.4.0 (Google Inc.). Using a desktop computer (GeForce GTX 1080 Ti Graphical Processing Unit, GPU and Intel® Core™ i7-7700 CPU @3.60 GHz and 64 GB of RAM, running a Windows 10 operating system, Microsoft), the above-outlined TensorFlow based design of a $D^2NN$ 10 architecture took approximately 8 hours and 10 hours to train for the classifier and the lens networks, respectively.

Figure 26:
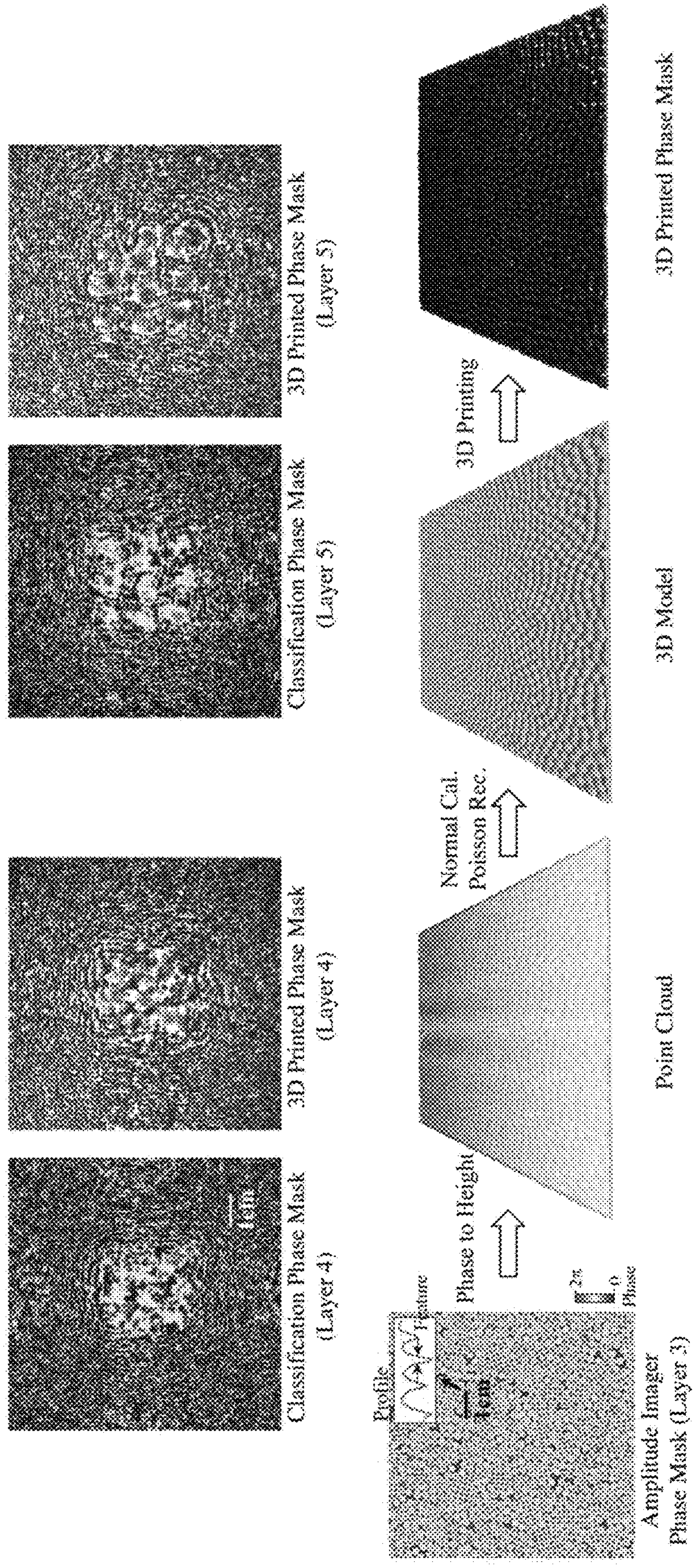
FIG. 26 illustrates 3D model reconstruction of a D$^2$NN layer for 3D-printing. Poisson surface reconstruction is applied to generate the 3D model of each D$^2$NN layer for 3D printing. The phase mask is first converted to a height map with the knowledge of the material refractive index, and the enclosed point cloud is formed by adding the substrate points. The 3D model is then generated by calculating the surface normal and performing the Poisson reconstruction. The final step is the 3D-printing of the D$^2$NN model.

After the training phase of the optimized $D^2NN$ architecture, the 3D model of the network layers to be 3D-printed (i.e., the design of the physical $D^2NN$ 10) was generated by Poisson surface reconstruction (see FIG. 26). First, neurons' phase values were converted into a relative height map ($\Delta z=\lambda\phi/2\pi\Delta n$), where $\Delta n$ is the refractive index difference between the 3D printing material (VeroBlackPlus RGD875) and air. The refractive index n and the extinction coefficient (k) of this 3D-printing material at 0.4 THz were measured as 1.7227 and 0.0311, respectively, which corresponds to an attenuation coefficient of $\alpha=520.7177\ m^{-1}$. Before the 3D-printing process, a uniform substrate thickness of 0.5 mm was added to each layer of a $D^2NN$. A 3D mesh processing software, Meshlab, was used to calculate the 3D structure, which was then used as input to a 3D-printer (Objet30 Pro 3D, Stratasys Ltd, Eden Prairie, Minn. USA). For the training of MNIST digit classifier $D^2NN$ and Fashion-MNIST classifier $D^2NN$, input images were padded with zeros to fit the input aperture of the diffractive network (8 cm×8 cm). In the THz experiments aluminum foil was used to create zero transmission regions at the input plane 20, to match the training settings for each $D^2NN$ design.

Following the corresponding design of each $D^2NN$ 10, the axial distance between two successive 3D-printed substrate layers 16 was set to be 3.0 cm and 4.0 mm for the classifier and lens networks, respectively. The larger axial distance between the successive layers of the classifier $D^2NNs$ increased the number of neuron connections to ~8 billion, which is approximately 100-fold larger compared to the number of the neuron connections of the imaging $D^2NN$ 10, which is much more compact in depth (see FIGS. 14A, 14B).

Figure 27A:
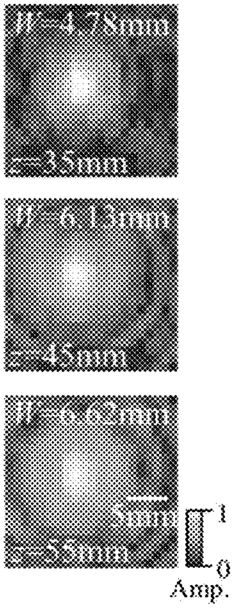
FIG. 27A illustrate beam profiles were imaged at three different axial locations to quantify the beam parameters, based on which the Terahertz light source can be approximated as a Gaussian beam.
Figure 27B:
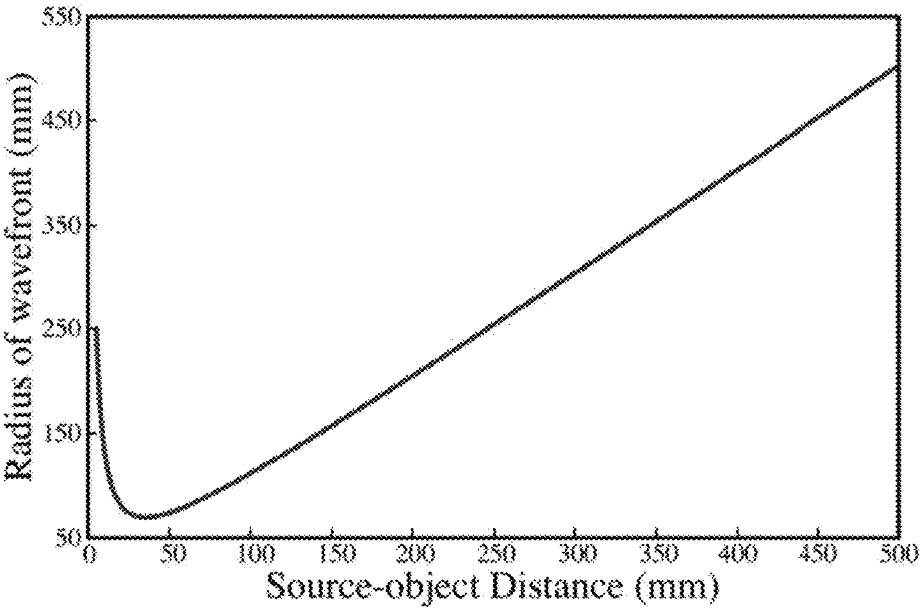
FIG. 27B illustrate a graph of the radius of the source wavefront as a function of the source-object distance. For all the 3D-printed D$^2$NN designs of this work, the illumination at the object/input plane can be approximated as a plane wave.
Figure 27C:
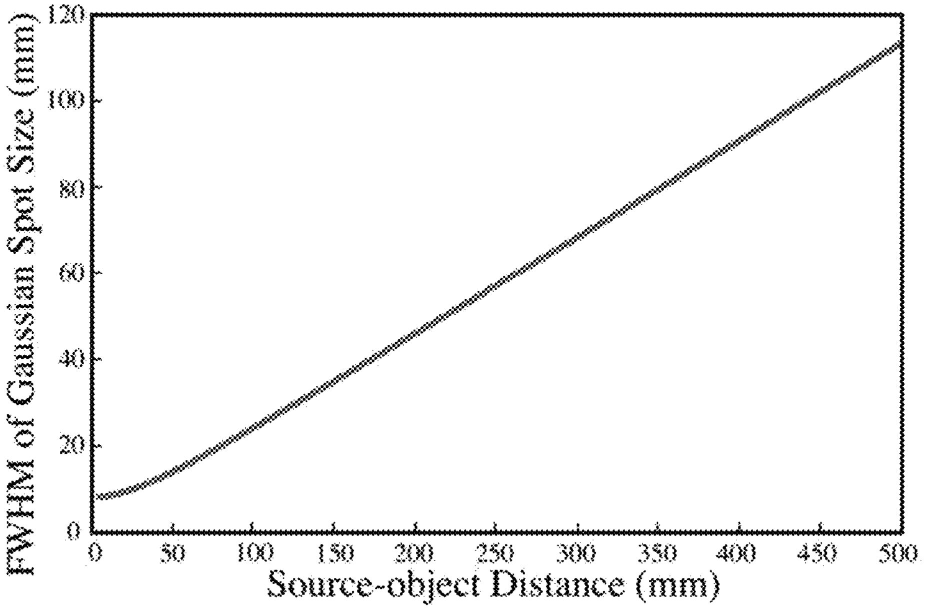
FIG. 27C illustrate a graph of the FWHM of Gaussian spot size as a function of the source-object distance.

Terahertz Set-up. The schematic diagram of the experimental setup is given in FIG. 14C. The electromagnetic wave was generated through a WR2.2 modular amplifier/multiplier chain (AMC) made by Virginia Diode Inc. (VDI). A 16 dBm sinusoidal signal at 11.111 GHz ($f_{RF1}$) was sent as RF input signal and multiplied 36 times by AMC to generate continuous-wave (CW) radiation at 0.4 THz. A horn antenna compatible with WR 2.2 modular AMC was used. The source was electrically-modulated at 1 KHz. The illumination beam profile was characterized as a Gaussian (FIGS. 27A-27C), and the distance between the object and the source planes was selected as approximately 81 mm, 173 mm, and 457 mm to provide a beam spot size of ~20 mm, ~40 mm, and ~104 mm, full-width half-maximum (FWHM), for the imaging $D^2NN$ 10, the digit classification $D^2NN$ 10, and the fashion product classification $D^2NN$ 10, respectively. The beam passed through the input object 14 and then the optical neural network, before reaching the output plane 22, which was scanned by a single-pixel detector placed on an XY positioning stage. This XY stage was built by placing two linear motorized stages (Thorlabs NRT100) vertically to allow precise control of the position of the detector. The detector scanning step size was set to be ~600 μm, ~1.2 mm, and ~1.6 mm for the imaging lens $D^2NN$ 10, the digit classifier $D^2NN$ 10, and the fashion classifier $D^2NN$ 10, respectively. The distance between detector/output plane and the last layer of the optical neural network was adjusted as 3 cm and 7 mm for the classifier $D^2NNs$ and the lens $D^2NN$, respectively. A mixer/AMC made by VDI was used to detect the amplitude of the transmitted wave ($f_{opt}$). A 10-dBm sinusoidal signal at 11.138 GHz (fRF2) was used as a local oscillator. This signal was multiplied by 36 through the multiplier and mixed with the detected signal. The mixing product ($f_{IR}=|f_{RF1}-f_{opt}|$) was obtained at 1 GHz frequency. This down-converted signal passed through an amplification stage which consisted of two low-noise amplifiers (Mini-Circuits ZRL-1150-LN+) to amplify the signal by 80 dBm and a 1 GHz (+/−10 MHz) bandpass filter (KL Electronics 3C40-1000/T10-O/O) to get rid of the noise coming from unwanted frequency bands. After this, the signal went through a low-noise power detector (Mini-Circuits ZX47-60) and the output voltage was read by a lock-in amplifier (Stanford Research SR830). The modulation signal was used as the reference signal for the lock-in amplifier. The dynamic range of the setup was measured as 80 dB.

Forward Wave Propagation Model.

The forward model of the $D^2NN$ 10 architecture is illustrated in FIG. 11A and its corresponding TensorFlow implementation is summarized in FIG. 25A. To simplify the notation of the forward model, one can rewrite Eq. (2) as follows:

$$\begin{cases} n_{i,p}^{l} = w_{i,p}^{l} \cdot t_{i}^{l} \cdot m_{i}^{l} \\ m_{i}^{l} = \sum_{k} n_{k,i}^{l-1} \\ t_{i}^{l} = a_{i}^{l}\exp(j\phi_{i}^{l}) \end{cases}, \quad (3)$$

where i refers to a neuron of the l-th layer, and p refers to a neuron 24 of the next substrate layer 16, connected to neuron i by optical diffraction. The same expressions would also apply for a reflective $D^2NN$ 10 with a reflection coefficient per neuron: $r_i^l$. The input pattern $h_k^0$, which is located at layer 0 (i.e., the input plane), is in general a complex-valued quantity and can carry information in its phase and/or amplitude channels. The resulting wave function due to the diffraction of the illumination plane-wave interacting with the input can be written as:

$$n_{k,p}^{0}=w_{k,p}^{0}\cdot h_{k}^{0}, \quad (4)$$

which connects the input to the neurons 24 of layer 1. Assuming that the $D^2NN$ design is composed of M substrate layers (excluding the input and output planes), then a detector at the output plane measures the intensity of the resulting optical field:

$$s_{i}^{M+1}=|m_{i}^{M+1}|^{2}. \quad (5)$$

The comparison of the forward model of a conventional artificial neural network and a diffractive neural network is summarized in FIG. 11D. Based on this forward model, the results of the network output plane 22 are compared with the targets (for which the diffractive network is being trained for) and the resulting errors are back-propagated to iteratively update the layers of the diffractive network, which will be detailed next.

Error Backpropagation. To train a design for a D²NN 10, the error back-propagation algorithm was used together with the stochastic gradient descent optimization method. A loss function was defined to evaluate the performance of the D²NN output with respect to the desired target, and the algorithm iteratively optimized the diffractive neural network parameters to minimize the loss function. Without loss of generality, here focusing on the imaging D²NN 10 architecture, and define the loss function (E) using the mean square error between the output plane intensity $s_i^{M+1}$ and the target $g_i^{M+1}$:

$$E(\phi_i^l) = \frac{1}{K}\sum_k (s_k^{M+1} - g_k^{M+1})^2, \tag{6}$$

where K refers to the number of measurement points at the output plane. Different loss functions can also be used in D²NN. Based on this error definition, the optimization problem for a D²NN design can be written as:

$$\min_{\phi_i^l} E(\phi_i^l), s.t.\ 0 \le \phi_i^l < 2\pi. \tag{7}$$

To apply the backpropagation algorithm for training a D²NN 10, the gradient of the loss function with respect to all the trainable network variables needs to be calculated, which is then used to update the network layers during each cycle of the training phase. The gradient of the error with respect to $\phi_i^l$ of a given layer l can be calculated as:

$$\frac{\partial E(\phi_i^l)}{\partial \phi_i^l} = \frac{4}{K}\sum_k (s_k^{M+1} - g_k^{M+1}) \cdot \mathrm{Real}\left\{(m_k^{M+1})^* \cdot \frac{\partial m_k^{M+1}}{\partial \phi_i^l}\right\}. \tag{8}$$

In Eq. (8), $$\frac{\partial m_k^{M+1}}{\partial \phi_i^l}$$

quantifies the gradient of the complex-valued optical field at the output layer ($m_k^{M+1} = \sum_{k_1} n_{k_1,k}^M$) with respect to the phase values of the neurons in the previous layers, l≤M. For every layer, l, this gradient can be calculated using:

$$\frac{\partial m_k^{M+1}}{\partial \phi_i^{l=M}} = j \cdot t_i^M \cdot m_i^M \cdot w_{i,k}^M, \tag{9}$$

$$\frac{\partial m_k^{M+1}}{\partial \phi_i^{l=M-1}} = j \cdot t_i^{M-1} \cdot m_i^{M-1} \cdot \sum_{k_1} w_{k_1,k}^M \cdot t_{k_1}^M \cdot w_{i,k_1}^{M-1}, \tag{10}$$

$$\frac{\partial m_k^{M+1}}{\partial \phi_i^{l=M-2}} = j \cdot t_i^{M-2} \cdot m_i^{M-2} \cdot \sum_{k_1} w_{k_1,k}^M \cdot t_{k_1}^M \cdot \sum_{k_2} w_{k_2,k_1}^{M-1} \cdot t_{k_2}^{M-1} \cdot w_{i,k_2}^{M-2}, \tag{11}$$

...

-continued $$\frac{\partial m_k^{M+1}}{\partial \phi_i^{l=M-L}} = j \cdot t_i^{M-L} \cdot m_i^{M-L} \cdot \sum_{k_1} w_{k_1 k}^M \cdot t_{k_1}^M \ \ldots \ \sum_{k_L} w_{k_L,k_{L-1}}^{M-L+1} \cdot t_{k_L}^{M-L+1} \cdot w_{i,k_L}^{M-L}, \tag{12}$$

where, 3≤L≤M−1. In the derivation of these partial derivatives, an important observation is that, for an arbitrary neuron at layer l≤M, one can write:

$$\frac{\partial n_{k_2,k_1}^l}{\partial \phi_i^l} = \begin{cases} j \cdot t_i^l \cdot m_i^l \cdot w_{i,k_1}^l, & \text{for } k_2 = i \\ 0, & \text{for } k_2 \ne i \end{cases}, \tag{13}$$

where $k_{1,2}$ represent dummy variables. During each iteration of the error backpropagation, a small batch of the training data is fed into the diffractive neural network to calculate the above gradients for each substrate layer 16 and accordingly update the D²NN 10.

Imaging D²NN Architecture. Structural similarity index, SSIM, values between the D²NN output plane 22 and the ground truth (i.e., target images) were calculated to optimize the architecture of the diffractive neural network. This way, the number of network substrate layers 16 and the axial distance between two consecutive substrate layers 16 as was optimized shown in FIG. 21A. The SSIM plots in FIG. 21A were calculated by averaging the results of 100 test images randomly selected from ImageNet dataset.

Dataset Preprocessing. To train and test the D²NN 10 as a digit classifier, MNIST handwritten digit database was used, which is composed of 55,000 training images, 5,000 validation images and 10,000 testing images. Images were up-sampled to match the size of the D²NN model. For the training and testing of the imaging or "lens" D²NN 10, ImageNet was used where a subset of 2,000 images was randomly selected. Each color image was converted into grayscale and resized it to match the D²NN 10. It should be noted that color image data can also be applied to D²NN framework although a single wavelength THz system was used for testing. For colorful images, as an example, Red, Green and Blue channels of an image can be used as separate parallel input planes 20 to a diffractive neural network 10. Turning back to training used herein, the selected images were then randomly divided into 1500 training images, 200 validation images and 300 testing images. Very similar imaging performance was obtained by using 10,000 images in the training phase (instead of 2,000 images); this is expected since each training image contains various spatial features at different parts of the image, all of which provide valuable patches of information for successfully training the diffractive imaging network.

To test the performance of the D²NN 10 digit classifier experimentally, 50 handwritten digits were extracted from MNIST test database. To solely quantify the match between the numerical testing results and experimental testing, these 3D-printed handwritten digits were selected among the same 91.75% of the test images that numerical testing was successful. The digits were up-sampled and binarized, as implemented during the training process. Binarized digits were stored as a vector image, in .svg format, before they were 3D printed. The images were then fed into Autodesk Fusion Software (Autodesk Inc.) to generate their corresponding 3D model. To provide amplitude only image inputs to the digit classifier $D^2NN$ 10, the 3D-printed digits were coated with aluminum foil to block the light transmission in desired regions.

In addition to MNIST digit classification, to test the $D^2NN$ framework with a more challenging classification task, the Fashion MNIST database was used which has more complicated targets as exemplified in FIG. 17. The Fashion MNIST database has ten different labels or classes including T-shirt/top (class 0), trouser (class 1), pullover (class 2), dress (class 3), coat (class 4), sandal (class 5), shirt (class 6), sneaker (class 7), bag (class 8), ankle boot (class 9). Some of these target classes, such as pullovers (class 2), coats (class 4) and shirts (class 6), are very similar to each other, making it difficult for different classification methods. For example, the state-of-the-art DENSER convolutional neural network achieves 95.3% classification accuracy on Fashion MNIST dataset compared with 99.7% for MNIST dataset. In order to train a $D^2NN$ with Fashion MNIST database, the target fashion product images were encoded into the phase channel of the input plane 20 instead of the amplitude channel. Grayscale images corresponding to fashion products were scaled between 0 and 2π as the phase-only input to the diffractive neural network 10, and other details of the Fashion MNIST experiments were similar as in MNIST classification experiments.

$D^2NN$ Neuron Numbers and Connectivity. $D^2NN$ uses optical diffraction to connect the neurons at different layers of the network. The maximum half-cone diffraction angle can be formulated as $\varphi_{max}=\sin^{-1}(\lambda f_{max})$, where $f_{max}=\frac{1}{2}d_f$ is the maximum spatial frequency and $d_f$ is the layer feature size. Here, a $D^2NN$ 10 is was used operating at 0.4 THz by using low-cost 3D-printed substrate layers 16. The 3D printer that was used has a spatial resolution of 600 dpi with 0.1 mm accuracy and the wavelength of the illumination system is 0.75 mm in air.

For the digit and fashion product classification $D^2NNs$ 10, the pixel size was set to 400 μm for packing 200×200 neurons over each substrate layer 16 of the network 10, covering an area of 8 cm×8 cm per substrate layer 16. Five (5) transmissive diffraction substrate layers 16 were used with the axial distance between the successive layers set to be 3 cm. These choices mean create a fully-connected diffractive neural network structure because of the relatively large axial distance between the two successive substrate layers 16 of the diffractive network. This corresponds to 200×200×5=0.2 million neurons 24 (each containing a trainable phase term) and $(200\times200)^2\times5=8.0$ billion connections (including the connections to the output layer). This large number of neurons 24 and their connections offer a large degree-of-freedom to train the desired mapping function between the input amplitude (handwritten digit classification, 20) or input phase (fashion product classification, 20) and the output intensity measurement 22 for classification of input objects 14.

For the imaging lens $D^2NN$ 10 design, the smallest feature size was ~0.9 mm with a pixel size set of 0.3 mm, which corresponds to a half-cone diffraction angle of ~25°. The axial distance between two successive substrate layers 16 is set to be 4 mm for 5 layers, and the width of each layer was 9 cm×9 cm. This means the amplitude imaging $D^2NN$ 10 design had 300×300×5=0.45 million neurons 24, each having a trainable phase term. Because of the relatively small axial distance (4 mm) between the successive substrate layers 16 and the smaller diffraction angle due to the larger feature size, there are <0.1 billion connections in this imaging $D^2NN$ design (including the connections to the output layer, which is 7 mm away from the $5^{th}$ layer of the diffractive network). Compared to the classification $D^2NNs$ 10, this amplitude imaging embodiment is much more compact in the axial direction as also pictured in FIGS. 14A, 14B.

There are some unique features of a $D^2NN$ 10 that make it easier to handle large scale connections (e.g., 8 billion connections as reported in FIG. 14A). The connectivity of a $D^2NN$ 10 is controlled by the size of each neuron 24 of a given substrate layer 16 (defining the diffraction angle) and the axial spacing between the substrate layers 16. For example, consider a 5-layer $D^2NN$ design with a certain fixed neuron 24 size; for this design, one can have a very low number of neural connections by closely placing the substrate layers 16, one after another. On the other hand, one can also make the same design fully-connected by simply increasing the axial spacing between the substrate layers 16, significantly increasing the number of connections. Interestingly, these two extreme designs (that vary considerably in their number of connections) would be identical in terms of training complexity because the computation time and complexity of digital wave propagation between substrate layers 16 is a not a function of the axial distance. Therefore, largely spaced $D^2NN$ substrate layers 16 that form a fully connected network would be identical (in terms of their computational implementation complexity) to partially-connected $D^2NN$ designs that have shorter axial distance between the layers (also see FIG. 13, top two rows, for an example of this comparison).

Performance analysis of $D^2NN$ as a function of the number of layers and neurons. A single diffractive substrate layer cannot achieve the same level of inference that a multi-layer $D^2NN$ 10 structure can perform. Multi-layer architecture of $D^2NN$ 10 provides a large degree-of-freedom within a physical volume to train the transfer function between its input and the output planes, which, in general, cannot be replaced by a single phase-only or complex modulation layer (employing phase and amplitude modulation at each neuron).

To expand on this, a single diffractive layer performance is quite primitive compared to a multi-layered $D^2NN$ 10. As shown in FIG. 12, a single phase-only modulation layer or even a complex modulation layer (where both phase and amplitude of each neuron are learnable parameters) cannot present enough degrees of freedom to establish the desired transfer function for classification of input images (MNIST) and achieves a much lower performance compared to a 5-layer $D^2NN$ 10 network. In the results reported in FIG. 12, the same physical neuron size was used in each case, representing the 3D-printing resolution. FIG. 12 shows that a single layer diffractive network can only achieve 55.64% and 64.84% blind testing accuracy for phase-only and complex modulation $D^2NN$ designs, respectively, whereas N=5 layers (with everything else being the same) can achieve 91.75% and 93.23% blind testing accuracy, respectively. The same conclusion also applies for a single layer $D^2NN$ (N=1) that has 0.2 million neurons over the same area (assuming a higher resolution 3D-printer was available for defining smaller neurons)

FIG. 16 further demonstrates that by using a patch of two (2) layers added to an existing/fixed $D^2NN$ 10 (N=5), improved the MNIST classification accuracy to 93.39%; the state-of-the-art convolutional neural net performance varies between 99.60%-99.77% depending on the network design. Similar results were obtained for the Fashion MNIST dataset using N=5, 10 layers (see FIGS. 13 and 18). These results, summarized above, highlight that a single diffractive layer stagnates at its inference performance to modest accuracy values, and increasing the number of layers, neurons and connections of a $D^2NN$ 10 design provides significant improvements in its inference capability.

Error Sources and Mitigation Strategies. There are five main sources of error that contribute to the performance of a 3D-printed $D^2NN$ 10: (1) Poisson surface reconstruction is the first error source. After the transmission substrate layers 16 are trained, 3D structure of each substrate layer 16 is generated through the Poisson surface reconstruction as detailed in earlier. However, for practical purposes, one can only use a limited number of sampling points, which distorts the 3D structure of each substrate layer 16. (2) Alignment errors during the experiments form the second source of error. To minimize the alignment errors, the transmission substrate layers 16 and input objects 14 are placed into single 3D printed holder. However, considering the fact that 3D printed materials have some elasticity, the thin transmission substrate layers 16 do not perfectly stay flat, and they will have some curvature. Alignment of THz source and detector with respect to the transmission layers also creates another error source in the experiments. (3) 3D-printing is the third and one of the most dominant sources of error. This originates from the lack of precision and accuracy of the 3D-printer used to generate network substrate layers 16. It smoothens the edges and fine details on the transmission layers. (4) Absorption of each transmissive substrate layer 16 is another source that can deteriorate the performance of a $D^2NN$ design. (5) The measurements of the material properties that are extensively used in the simulations such as refractive index and extinction coefficient of the 3D printed material might have some additional sources of error, contributing to a reduced experimental accuracy. It is hard to quantitatively evaluate the overall magnitude of these various sources of errors; instead the Poisson surface reconstruction errors, absorption related losses at different layers and 0.1 mm random misalignment error for each network layer were incorporated during the testing phase of the $D^2NNs$ as shown in FIGS. 21A-21C and FIGS. 24A-24C. These errors showed minor influence on the performance of the diffractive networks.

To minimize the impact of the 3D printing error, a relatively large pixel size, i.e. 0.4 mm and 0.3 mm was used for the classification and imaging $D^2NNs$, respectively. Furthermore, a 3D-printed holder (FIGS. 14A, 14B) was used to self-align the multi-layer structure of a 3D-printed $D^2NN$ 10, where each network substrate layer 16 and the input object 14 were inserted into their specific slots. Based on the resolution of the 3D-printer, the misalignment error of a 3D-printed $D^2NN$ (including its holder) is estimated to be smaller than 0.1 mm compared to the ideal positions of the neurons 24 of a given substrate layer 16, and this level of error was found to have a minor effect on the network performance as illustrated in FIGS. 21A-21C and 24A-24C.

Reconfigurable $D^2NN$ Designs. As explained herein, some embodiments use SLMs as part of a $D^2NN$ 10. In addition to using SLMs as part of a reconfigurable $D^2NN$ 10, another option is to use a given 3D-printed or fabricated $D^2NN$ 10 as a fixed input block of a new diffractive network where one trains only the additional layers that plan to be fabricated. Assume for example that a 5-layer $D^2NN$ 10 has been printed/fabricated for a certain inference task. As its prediction performance degrades or slightly changes, due to e.g., a change in the input data, etc., one can train a few additional layers of substrate 16 to be physically added/patched to the existing printed/fabricated network 10 to improve its inference performance. In some cases, one can even peel off (i.e., discard or remove) some of the existing layers of substrates 16 of the printed network and assume the remaining fabricated substrate layers 16 as a fixed (i.e., non-learnable) input block to a new network where the new layers to be added/patched are trained for an improved inference task (coming from the entire diffractive network: old layers and new layers). Intuitively, one can think of each $D^2NN$ 10 as akin to a Lego® piece (with several layers following each other); one can either add a new substrate layer 16 (or multiple substrate layers 16) on top of existing (i.e., already fabricated) ones, or peel off/remove some substrate layers 16 and replace them with the new trained diffractive substrates 16. This provides a unique physical implementation (like blocks of Lego®) for transfer learning or mending the performance of a printed/fabricated $D^2NN$ 10 design.

Figure 28:
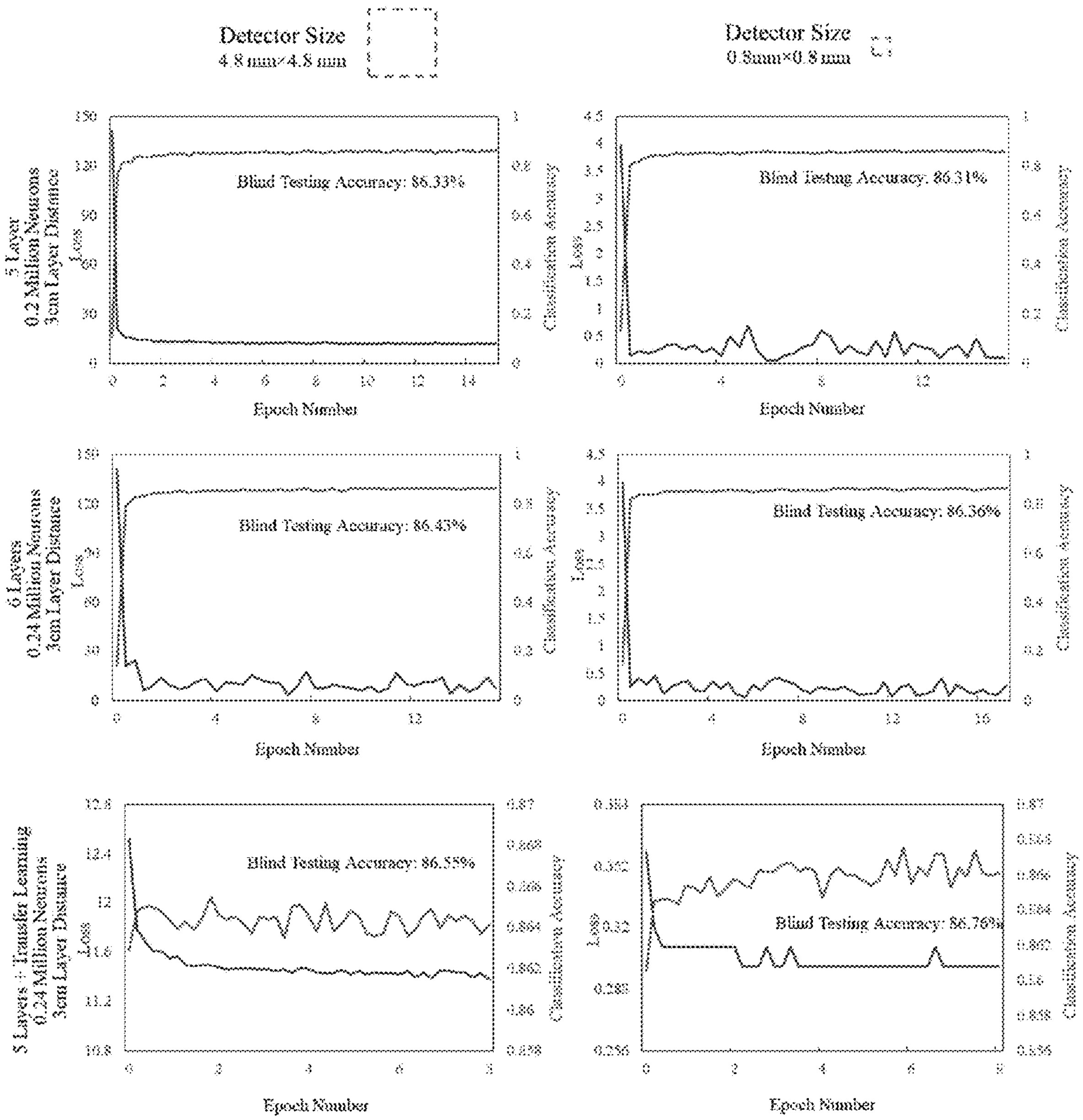
FIG. 28 illustrates fashion MNIST results achieved with complex-valued D$^2$NN framework. Convergence plots of D$^2$NNs (top and middle plots for N=5 and N=6, respectively) are shown. Bottom plots show the case for training only the 6th layer, where the first 5 layers of the network were fixed (i.e., identical to the design resulting from the top case, N=5) and the new layer was added between the 5$^{th}$ layer and the detector plane, at equal distance from both. The layers of the N=5 and N=5 designs were separated by 3 cm from each other and the detector plane. The y-axis values in each plot report the Fashion MNIST classification accuracy and the loss values as a function of the epoch number for the training datasets. Addition of the 6th layer (learnable) to an already trained and fixed D$^2$NN with N=5 improves its inference performance, performing slightly better than the performance of N=6 (middle plots).

This modular design for the Fashion MNIST diffractive network 10 was implemented and the results are summarized in FIG. 28, demonstrating that, for example, the addition of a 6th layer (learnable) to an already trained and fixed $D^2NN$ with N=5 improves its inference performance, performing slightly better than the performance of a $D^2NN$ with N=6 layers that were simultaneously trained. Also see FIG. 16 for an implementation of the same concept for MNIST: using a patch of two (2) substrate layers 16 added to an existing/fixed $D^2NN$ (N=5), the MNIST classification accuracy was improved to 93.39%. The advantage of this modular transfer learning or patching approach is that already fabricated and printed $D^2NN$ 10 designs can be improved in performance by adding additional substrate layers 16 to them or replacing some of the existing diffractive substrate layers 16 with newly trained ones. This can also help with the training process of very large network designs (e.g., N≥25) by training them in patches, making it more compatible with state-of-the-art computers.

Discussion of Unique Imaging Functionalities using $D^2NNs$. The $D^2NN$ framework will help imaging at the macro and micro/nano scale by enabling all-optical implementation of some unique imaging tasks. One possibility for enhancing imaging systems could be to utilize $D^2NN$ 10 designs to be integrated with sample holders or substrates used in microscopic imaging to enhance certain bands of spatial frequencies and create new contrast mechanisms in the acquired images. In other words, as the sample on a substrate (e.g., cells or tissue samples, etc.) diffracts light, a $D^2NN$ 10 can be used to project magnified images of the cells/objects onto a CMOS/CCD imaging senor or chip with certain spatial features highlighted or enhanced, depending on the training of the diffractive network. This could form a very compact chip-scale microscope (just a passive $D^2NN$ 10 placed on top of an imager chip) that implements, all-optically, task specific contrast imaging and/or object recognition or tracking within the sample. Similarly, for macro-scale imaging, such as, for example, face recognition, as an example, could be achieved as part of a sensor design, without the need for a high mega-pixel imager. For instance, tens to hundreds of different classes can potentially be detected using a modest (e.g., <1 Mega-pixel) imager chip placed at the output plane 22 of a $D^2NN$ 10 that is built for this inference task.

For THz part of the spectrum, as another possible use example, various biomedical applications that utilize THz imagers for looking into chemical sensing or the composition of drugs to detect e.g., counterfeit medicine, or for assessing the healing of wounds etc. could benefit from $D^2NN$ 10 designs to automate predictions in such THz-based analysis of specimen using a diffractive neural network.

Optical Nonlinearity in Diffractive Deep Neural Networks. Optical nonlinearity can be incorporated into the $D^2NN$ 10 using various optical non-linear materials (crystals, polymers, semiconductor materials, doped glasses, among others as detailed below). A $D^2NN$ 10 operates based on controlling the diffraction or reflection of light through complex-valued diffractive/reflective elements to perform a desired/trained task. Augmenting nonlinear optical components is both practical and synergetic to the $D^2NN$ 10 structures described herein. Assuming that the input object 14, together with the $D^2NN$ diffractive substrate layers 16, create a spatially varying complex field amplitude E(x,y) at a given substrate layer 16, then the use of a nonlinear medium (e.g., optical Kerr effect based on third-order optical nonlinearity, $\chi^{(3)}$) will introduce an all-optical refractive index change which is a function of the input field's intensity, $\Delta n \propto \chi^{(3)} E^2$. This intensity dependent refractive index modulation and its impact on the phase and amplitude of the resulting waves through the diffractive network 10 can be numerically modeled and therefore is straightforward to incorporate as part of the network training phase. Any third-order nonlinear material with a strong $\chi^{(3)}$ could be used to form the nonlinear diffractive substrate layers 16: glasses (e.g., $As_2S_3$, metal nanoparticle doped glasses), polymers (e.g., polydiacetylenes), organic films, semiconductors (e.g., GaAs, Si, CdS), graphene, among others. There are different fabrication methods that can be employed to structure each nonlinear layer of a diffractive neural network using these materials.

In addition to third-order all-optical nonlinearity, another method to introduce nonlinearity into a $D^2NN$ 10 is to use saturable absorbers that can be based on materials such as semiconductors, quantum-dot films, carbon nanotubes or even graphene films. There are also various fabrication methods, including standard photo-lithography, that can be employed to structure such materials as part of a $D^2NN$ design. For example, in THz wavelengths, recent research has demonstrated inkjet printing of graphene saturable absorbers. Graphene-based saturable absorbers are further advantageous since they work well even at relatively low modulation intensities.

Another promising avenue to bring non-linear optical properties into $D^2NNs$ 10 is to use nonlinear metamaterials. These materials have the potential to be integrated with diffractive or reflective networks owing to their compactness and the fact that they can be manufactured with standard fabrication processes. While a significant part of the previous work in the field has focused on second and third harmonic generation, recent studies have demonstrated very strong optical Kerr effect for different parts of the electromagnetic spectrum, which can be incorporated into the deep diffractive neural network architecture to bring all-optical nonlinearity into its operation.

Finally, one can also use the DC electro-optic effect to introduce optical nonlinearity into the layers of a $D^2NN$ although this would deviate from the "all-optical" operation of the device 10 and require a DC electric-field for each substrate layer 16 of the diffractive neural network 10. This electric-field can be externally applied to each layer of a $D^2NN$ 10. Alternatively, one can also use poled materials with very strong built-in electric fields as part of the material (e.g., poled crystals or glasses). The latter will still be all-optical in its operation, without the need for an external DC field. To summarize, there are several practical approaches that can be integrated with diffractive neural networks to bring physical all-optical nonlinearity into $D^2NNs$ 10.

Figures 29A, 29B, 29C, 29D, 29E:
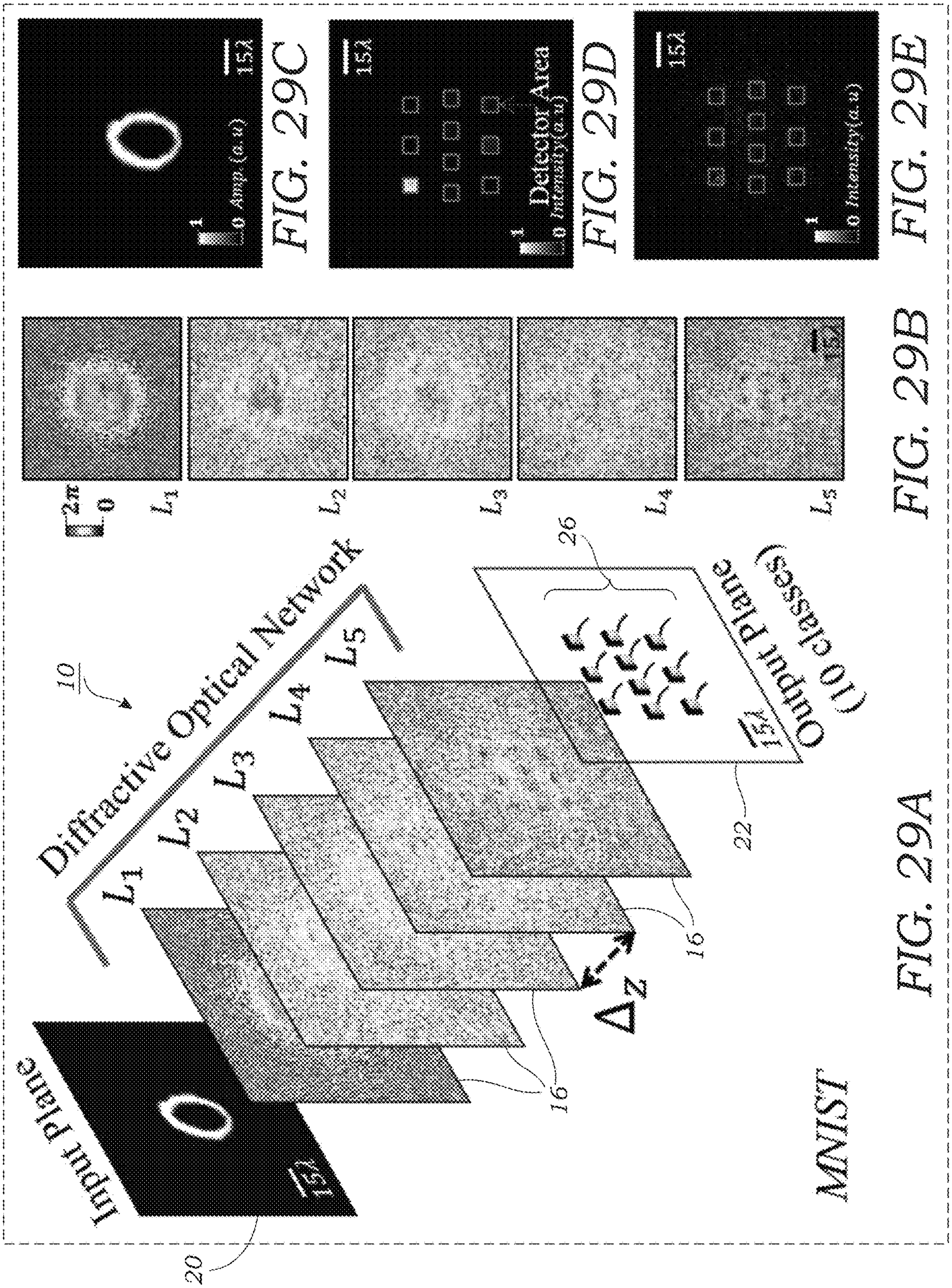
FIG. 29A illustrates a D$^2$NN setup for the task of classification of handwritten digits (MNIST), where the input information is encoded in the amplitude channel of the input plane. These D$^2$NN designs were based on spatially and temporally coherent illumination and linear optical materials/layers.
FIG. 29B illustrates the final design of a 5-layer, phase-only classifier for handwritten digits.
FIG. 29C illustrates the amplitude distribution at the input plane for a test sample (digit '0'). $\lambda$ refers to the illumination source wavelength. Input plane represents the plane of the input object or its data, which can also be generated by another optical imaging system or a lens, projecting an image of the object data onto this plane.
FIG. 29D illustrates intensity patterns at the output plane for the input in FIG. 29C for a MSE-based D$^2$NN design.
FIG. 29E illustrates intensity patterns at the output plane for the input in FIG. 29C for a softmax-cross-entropy (SCE)-based $D^2NN$ design. The softmax function may also be known as the softargmax or normalized exponential function.
Figures 29F, 29G, 29H, 29I, 29J:
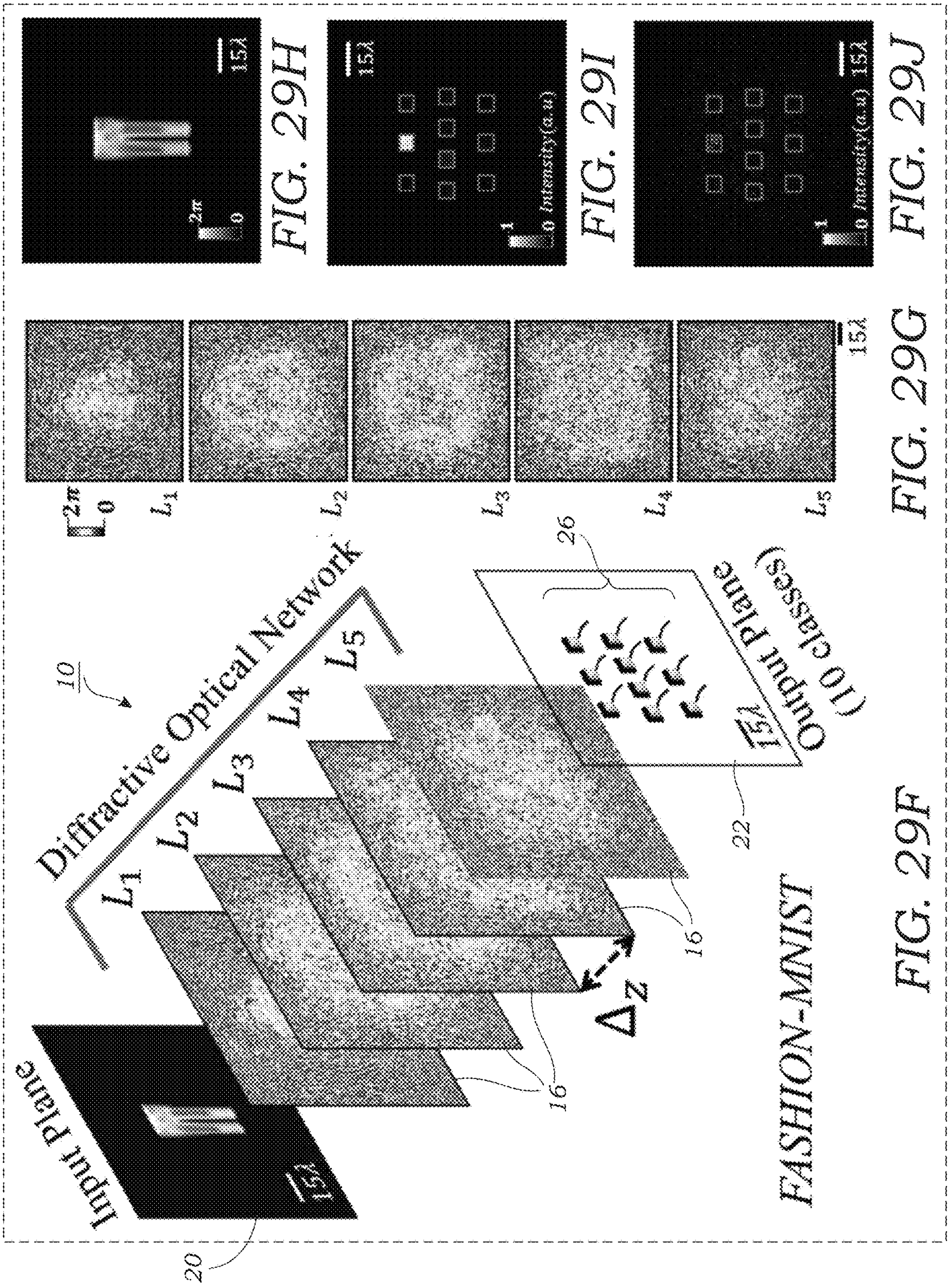
FIG. 29F illustrates a $D^2NN$ setup for the task of classification of fashion products (Fashion-MNIST), where the input information is encoded in the phase channel of the input plane.
FIG. 29G illustrates the final design of a 5-layer, phase-only classifier for fashion products.
FIG. 29H illustrates the amplitude distribution at the input plane for a test sample (e.g., pants). λ refers to the illumination source wavelength. Input plane represents the plane of the input object or its data, which can also be generated by another optical imaging system or a lens, projecting an image of the object data onto this plane.
FIG. 29I illustrates intensity patterns at the output plane for the input in FIG. 29H for a MSE-based $D^2NN$ design.
FIG. 29J illustrates intensity patterns at the output plane for the input in FIG. 29H for a softmax-cross-entropy (SCE)-based $D^2NN$ design.

Experimental—Improved All-Optical $D^2NNs$ and Hybrid Optical $D^2NN$ and Electronic Neural Network-Based System FIG. 9 illustrates an embodiment of a hybrid optical and electronic neural network-based system 40. This embodiment includes an all-optical $D^2NN$ front-end 42 and a digital or electronic trained neural network back-end 44. The hybrid optical and electronic neural network-based system 40 provides significant improvements to its inference performance by changing the loss function involved in the training phase, and reducing the effect of vanishing gradients in the error back-propagation step through the layers. To provide examples of its improved inference performance, using a 5-layer $D^2NN$ design like that illustrated in FIG. 29, two different classifiers were optimized to recognize (1) handwritten digits, 0 through 9, using the MNIST (Mixed National Institute of Standards and Technology) image dataset, and (2) various fashion products, including t-shirts, trousers, pullovers, dresses, coats, sandals, shirts, sneakers, bags, and ankle boots (using the Fashion MNIST image dataset). These 5-layer phase-only all-optical diffractive networks 10 such as that illustrated in FIG. 29 achieved a numerical blind testing accuracy of 97.18% and 89.13% for hand-written digit classification and fashion product classification, respectively. Using the same $D^2NN$ 10 design, this time with both the phase and the amplitude of each neuron's transmission as learnable parameters in a complex-valued $D^2NN$ 10 design, the inference performance was increased to 97.81% and 89.32% for hand-written digit classification and fashion product classification, respectively. Discussed herein is a comparative analysis of $D^2NN$ 10 performance as a function of the design parameters, covering the impact of the number of layers, layer-to-layer connectivity and loss function used in the training phase on the overall classification accuracy, output signal contrast and power efficiency of $D^2NN$ framework.

Furthermore, in an alternative embodiment, a hybrid optical and electronic neural network-based system 40 is disclosed that uses an all-optical front end 42 along with a back-end electronic neural network 44 to create hybrid machine learning and computer vision systems. Such a hybrid system 40 utilizes an all-optical $D^2NN$ front-end 42, before the electronic neural network 44, and if it is jointly optimized (i.e., optical and electronic as a monolithic system design), it presents several important advantages. This $D^2NN$-based hybrid system 40 approach can all-optically compress the needed information by the electronic network 44 using a $D^2NN$ front-end 42, which can then significantly reduce the number of pixels of the optical sensor 26 (e.g., detectors) that needs to be digitized for an electronic neural network 44 to act on. This would further improve the frame-rate of the entire system, also reducing the complexity of the electronic network 44 and its power consumption. This $D^2NN$-based hybrid system 40 can potentially create ubiquitous and low-power machine learning systems that can be realized using relatively simple and compact imagers, with e.g., a few tens to hundreds of pixels at the opto-electronic sensor plane, preceded by an ultra-compact all-optical diffractive network 42 with a layer-to-layer distance of a few wavelengths, which presents important advantages compared to some other hybrid network configurations involving e.g., a 4-f configuration to perform a convolution operation before an electronic neural network.

To better highlight these unique opportunities enabled by $D^2NN$-based hybrid system 40, an analysis was conducted to reveal that a 5-layer phase-only (or complex-valued) $D^2NN$ that is jointly-optimized with a single fully-connected layer, following the optical diffractive layers, achieves a blind classification accuracy of 98.71% (or 98.29%) and 90.04% (or 89.96%) for the recognition of hand-written digits and fashion products, respectively. In these results, the input image to the electronic network 44 (created by diffraction through the jointly-optimized front-end $D^2NN$ 42) was also compressed by more than 7.8 times, down to 10×10 pixels, which confirms that a $D^2NN$-based hybrid system 40 can perform competitive classification performance even using a relatively simple and one-layer electronic network that uses significantly reduced number of input pixels.

In addition to potentially enabling ubiquitous, low-power and high-frame rate machine learning and computer vision platforms, these hybrid neural network systems 40 which utilize $D^2NN$-based all-optical processing at its front-end 42 will find other applications in the design of compact and ultra-thin optical imaging and sensing systems by merging fabricated $D^2NNs$ with optical sensors 26 such as opto-electronic sensor arrays. This will create intelligent systems benefiting from various CMOS/CCD imager chips and focal plane arrays at different parts of the electromagnetic spectrum, merging the benefits of all-optical computation with simple and low-power electronic neural networks that can work with lower dimensional data, all-optically generated at the output of a jointly-optimized $D^2NN$ design.

Mitigating Vanishing Gradients in Optical Neural Network Training

In the $D^2NN$ framework, each neuron 24 has a complex transmission coefficient, i.e., $t_i^l(x_i, y_i, z_i)=a_i^l(x_i, y_i, z_i)\exp(j\phi_i^l(x_i, y_i, z_i))$, where i and l denote the neuron and diffractive layer number, respectively. $a_i^l$ and $\phi_i^l$ are represented during the network training as functions of two latent variables, α and β, defined in the following form:

$$a_i^l=\text{sigmoid}(\alpha_i^l), \tag{14a}$$

$$\phi_i^l=2\pi\times\text{sigmoid}(\beta_i^l), \tag{14b}$$

where, $$\text{sigmoid}(x)=\frac{e^x}{e^x+1},$$

is a non-linear, differentiable function. In fact, the trainable parameters of a $D^2NN$ are these latent variables, $\alpha_i^l$ and $\beta_i^l$, and eqs. (14a, 14b) define how they are related to the physical parameters ($a_i^l$ and $\phi_i^l$) of a diffractive optical network. Note that in eqs. (14a, 14b), the sigmoid acts on an auxiliary variable rather than the information flowing through the network. Being a bounded analytical function, sigmoid confines the values of $a_i^l$ and $\phi_i^l$ inside the intervals (0,1) and (0,2π), respectively. On the other hand, it is known that sigmoid function has vanishing gradient problem due to its relatively flat tails, and when it is used in the context depicted in eqs. (14a, 14b), it can prevent the network to utilize the available dynamic range considering both the amplitude and phase terms of each neuron. To mitigate these issues, eqs. (14a, 14b) were replaced as follows:

$$a_i^l=\frac{\text{Re}LU(\alpha_i^l)}{\max_{0<i\le M}\{\text{Re}LU(\alpha_i^l)\}}, \tag{15a}$$

$$\phi_i^l=2\pi\times\beta_i^l. \tag{15b}$$

where ReLU refers to Rectified Linear Unit, and M is the number of neurons per layer. Based on eqs. (15a, 15b), the phase term of each neuron, $\phi_i^l$, becomes unbounded, but since the $\exp(j\phi_i^l(x_i, y_i, z_i))$ term is periodic (and bounded) with respect to $\phi_i^l$, the error back-propagation algorithm is able to find a solution for the task in hand. The amplitude term, $a_i^l$, on the other hand, is kept within the interval (0,1) by using an explicit normalization step shown in eqs. (15a, 15b).

To exemplify the impact of this change alone in the training of an all-optical $D^2NN$ 10 design, for a 5-layer, phase-only (complex-valued) diffractive optical network 10 with an axial distance of 40×λ between its layers, the classification accuracy for Fashion-MNIST dataset increased from reported 81.13% (86.33%) to 85.40% (86.68%) following the above discussed changes in the parameterized formulation of the neuron transmission values. Further improvements were made in the inference performance of an all-optical $D^2NN$ 10 after the introduction of the loss function related changes into the training phase, which is discussed below.

Effect of the Learning Loss Function on the Performance of All-Optical Diffractive Neural Networks As an alternative to using mean squared error (MSE) loss for $D^2NNs$ 10, the cross-entropy loss may be used as an alternative. Since minimizing the cross-entropy loss is equivalent to minimizing the negative log-likelihood (or maximizing the likelihood) of an underlying probability distribution, it is in general more suitable for classification tasks. Note that, cross-entropy acts on probability measures, which take values in the interval (0,1) and the signals coming from the detectors (one for each class) at the output layer of a $D^2NN$ 10 are not necessarily in this range; therefore, in the training phase, a softmax layer is introduced to be able to use the cross-entropy loss. It is important to note that although softmax is used during the training process of a $D^2NN$ 10, once the diffractive design converges and is fixed, the class assignment at the output plane of a $D^2NN$ 10 is still based solely on the maximum optical signal detected at the output plane, where there is one detector assigned for each class of the input data (see FIG. 29A, 29F).

Figure 30A:
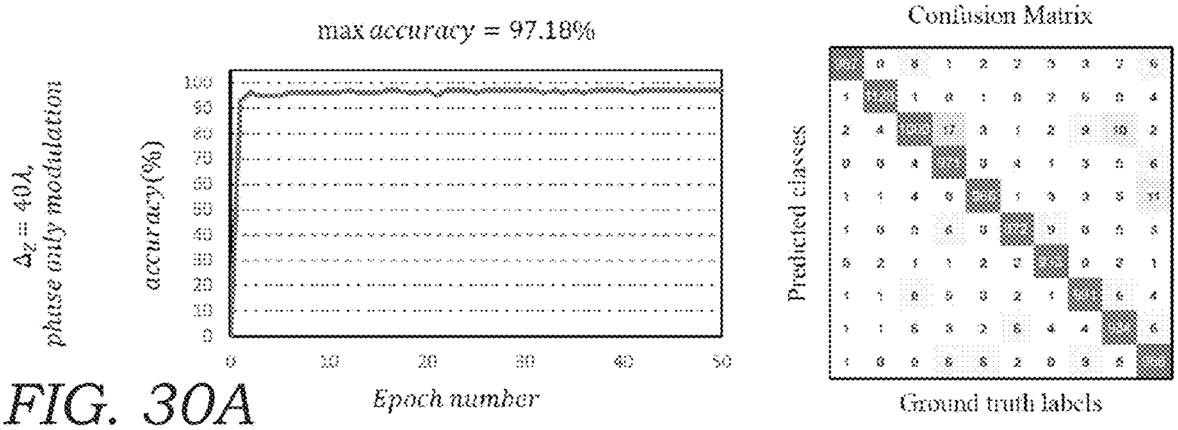
FIGS. 30A-30D illustrates convergence plots and confusion matrices for all-optical $D^2NN$-based classification of handwritten digits (MNIST dataset).
Figure 30B:
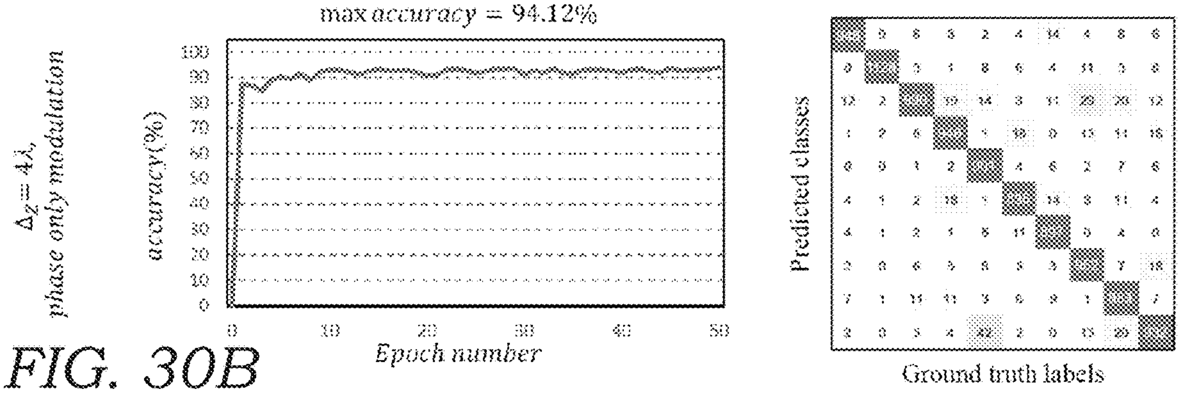
Figure 30C:
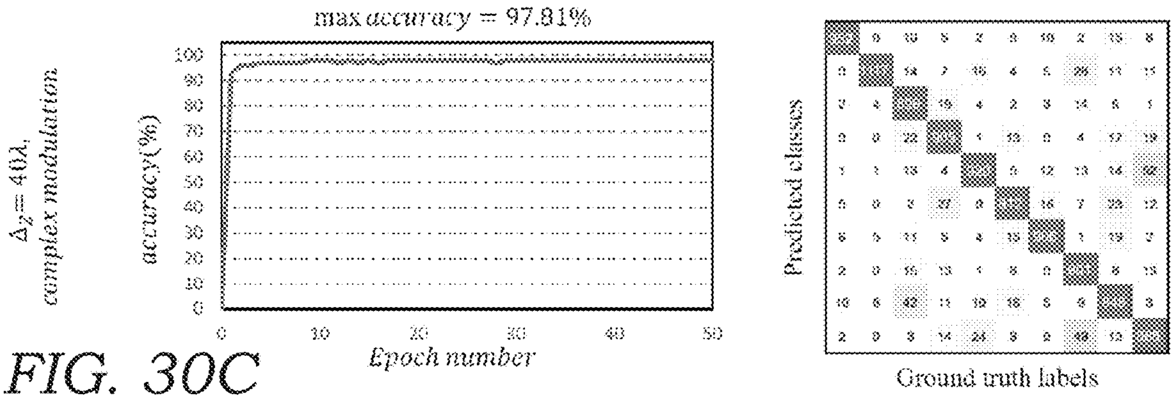
Figure 30D:
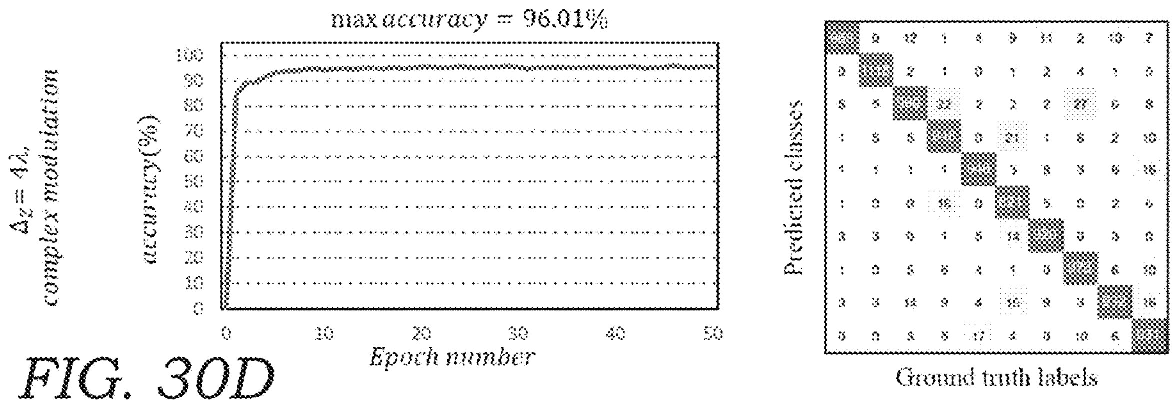
Figure 31A:
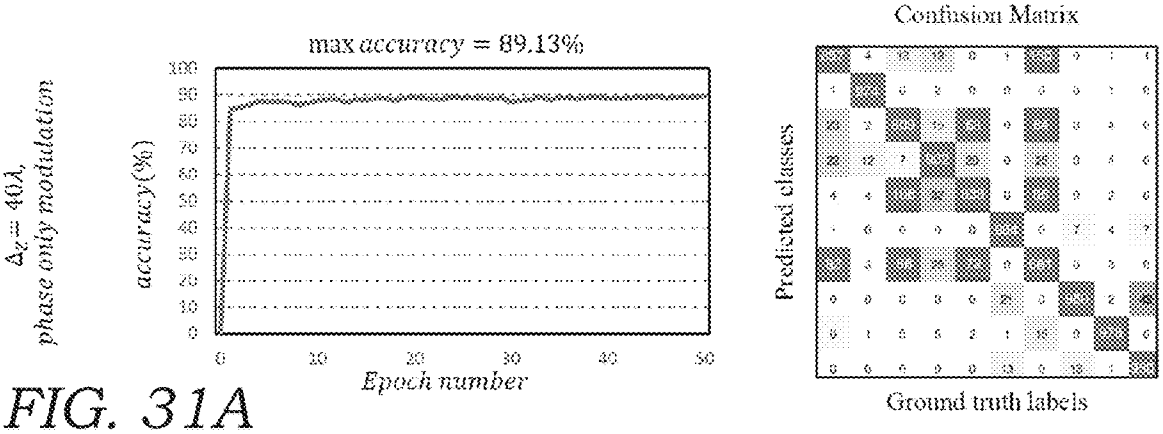
FIGS. 31A-31D illustrates convergence plots and confusion matrices for all-optical $D^2NN$-based classification of fashion products (Fashion-MNIST dataset) encoded in the phase channel of the input plane.
Figure 31B:
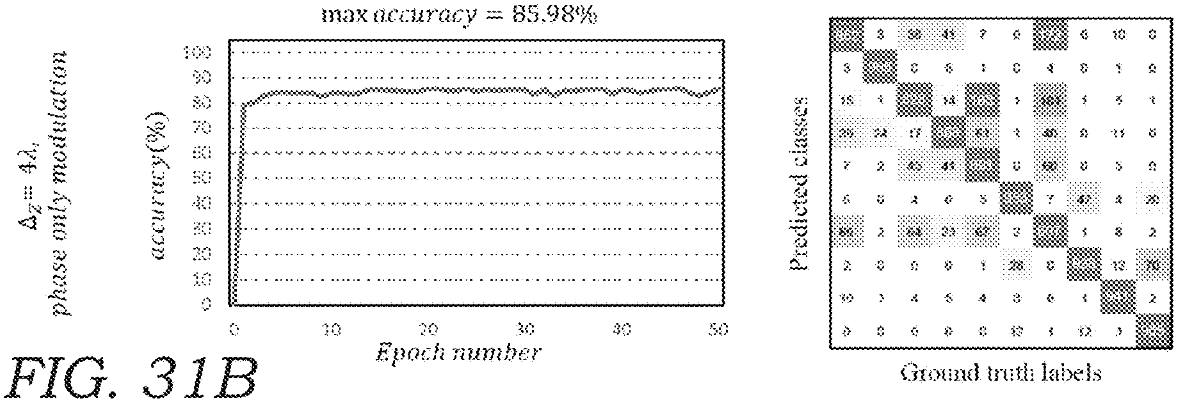
Figure 31C:
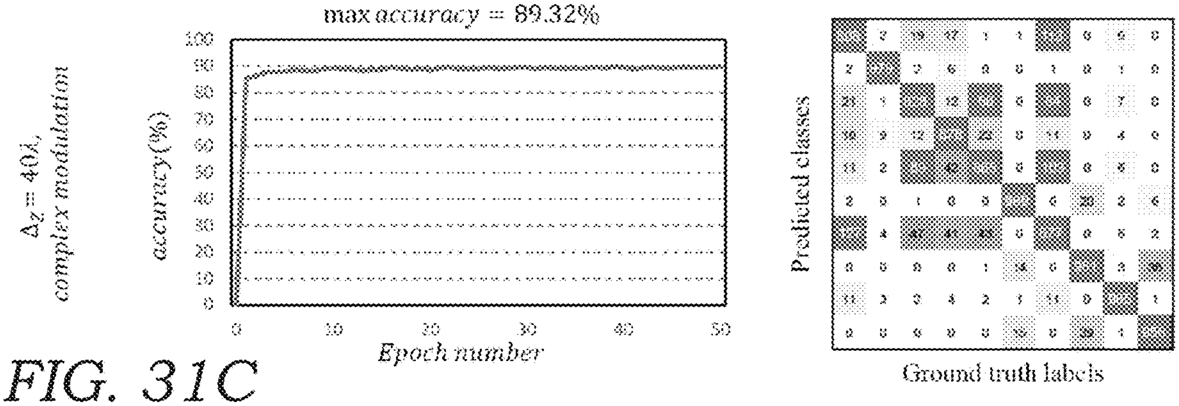
Figure 31D:
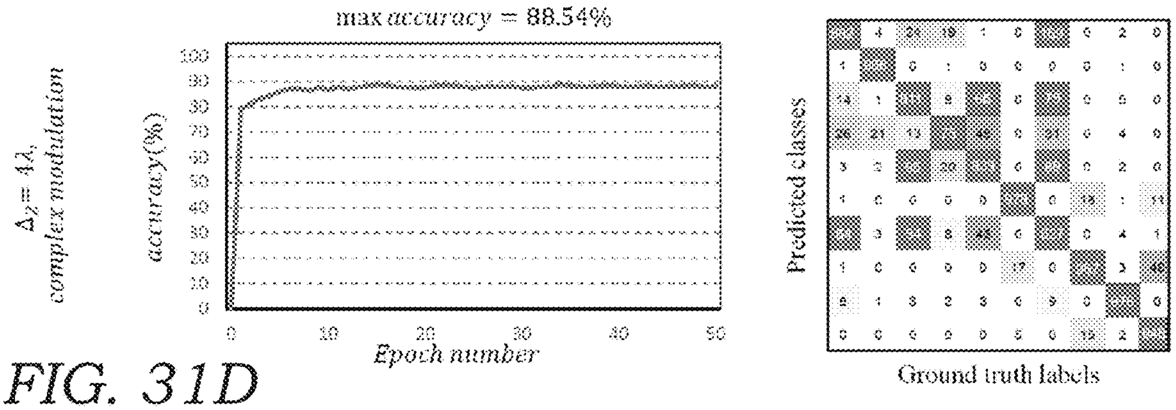

When one combines $D^2NN$ training related changes reported above on the parametrization of neuron modulation (eqs. (15a, 15b)), with the cross-entropy loss outlined above, a significant improvement in the classification performance of an all-optical diffractive neural network 10 is achieved. For example, for the case of a 5-layer, phase-only $D^2NN$ 10 with 40×λ axial distance between the substrate layers 16, the classification accuracy for MNIST dataset increased from 91.75% to 97.18%, which further increased to 97.81% using complex-valued modulation, treating the phase and amplitude coefficients of each neuron as learnable parameters. The training convergence plots and the confusion matrices corresponding to these results are also reported in FIGS. 30A and 30C, for phase-only and complex-valued modulation cases, respectively. Similarly, for Fashion-MNIST dataset, the blind testing classification accuracy of a 5-layer phase-only (complex-valued) $D^2NN$ 10 was improved from 81.13% (86.33%) to 89.13% (89.32%), showing a similar level of advancement as in the MNIST results (FIGS. 30B and 30D show results for 4×λ axial distance between the substrate layers 16). FIGS. 31A and 31C also report the training convergence plots and the confusion matrices for these improved Fashion-MNIST inference results, for phase-only and complex-valued modulation cases, respectively (FIGS. 31B and 31D show results for 4×λ axial distance between the substrate layers 16). As a comparison point, a fully-electronic deep neural network such as ResNet-50 (with >25 Million learnable parameters) achieves 99.51% and 93.23% for MNIST and Fashion-MNIST datasets, respectively, which are superior to the 5-layer all-optical $D^2NN$ inference results (i.e., 97.81% and 89.32% for MNIST and Fashion-MNIST datasets, respectively), which in total used 0.8 million learnable parameters, covering the phase and amplitude values of the neurons at 5 successive diffractive layers.

All these results demonstrate that the $D^2NN$ framework using linear optical materials can already achieve a decent classification performance, also highlighting the importance of the potential of integrating optical nonlinearities into the substrate layers 16 of a $D^2NN$ 10, using e.g., plasmonics, metamaterials or other nonlinear optical materials, in order to come closer to the performance of state-of-the-art digital deep neural networks.

Performance Trade-Offs in $D^2NN$ Design

Despite the significant increase observed in the blind testing accuracy of $D^2NNs$, the use of softmax-cross-entropy (SCE) loss function in the context of all-optical networks also presents some trade-offs in terms of practical system parameters. MSE loss function operates based on pixel-by-pixel comparison of a user-designed output distribution with the output optical intensity pattern, after the input light interacts with the diffractive layers (see e.g., FIGS. 29D and 29I). On the other hand, SCE loss function is much less restrictive for the spatial distribution of the output intensity behind the diffractive layers (see e.g., FIGS. 29E and 29J); therefore, it presents additional degrees-of-freedom and redundancy for the diffractive network to improve its inference accuracy for a given machine learning task.

Figure 32A:
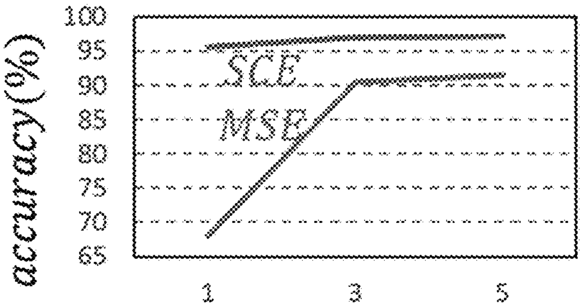
FIG. 32A is a graph showing the blind testing accuracy (%) of MSE and SCE loss function based all-optical phase-only $D^2NN$ classifier designs with 1, 3 and 5-layers. The final design of the $D^2NN$ (fully-connected, phase-only) trained for handwritten digits (MNIST).
Figure 32D:
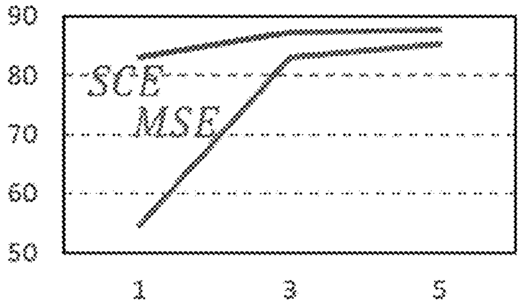
FIG. 32D is a graph showing the blind testing accuracy (%) of MSE and SCE loss function based all-optical phase-only $D^2NN$ classifier designs with 1, 3 and 5-layers. The final design of the $D^2NN$ (fully-connected, phase-only) trained for fashion products in the Fashion-MNIST dataset.
Figure 32B:
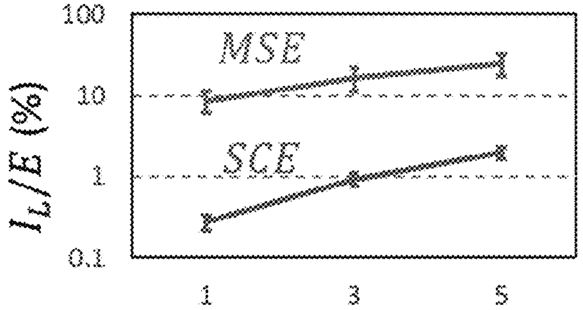
FIG. 32B is a graph showing the power efficiency of MSE and SCE loss function based all-optical phase-only $D^2NN$ classifier designs with 1, 3 and 5-layers. The final design of the $D^2NN$ (fully-connected, phase-only) trained for handwritten digits (MNIST).
Figure 32E:
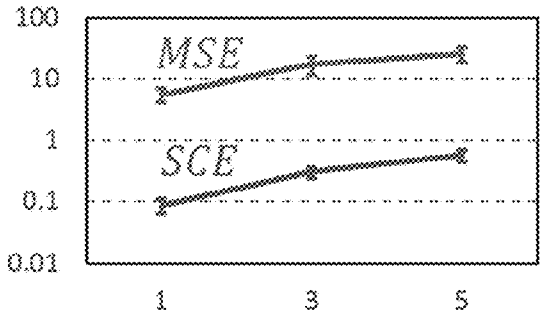
FIG. 32E is a graph showing the power efficiency of MSE and SCE loss function based all-optical phase-only $D^2NN$ classifier designs with 1, 3 and 5-layers. The final design of the $D^2NN$ (fully-connected, phase-only) trained for fashion products in the Fashion-MNIST dataset.

This performance improvement with the use of SCE loss function in a diffractive neural network design comes at the expense of some compromises in terms of the expected diffracted power efficiency and signal contrast at the network output. To shed more light on this trade-off, if one defines the power efficiency of a $D^2NN$ 10 as the percentage of the optical signal detected at the target label detector ($I_L$) corresponding to the correct data class with respect to the total optical signal at the output plane of the optical network (E). FIGS. 32B and 32E show the power efficiency comparison as a function of the number of diffractive layers (corresponding to 1, 3 and 5-layer phase-only $D^2NN$ 10 designs) for MNIST and Fashion-MNIST datasets, respectively. The power efficiency values in these graphs were computed as the ratio of the mean values of $I_L$ and E for the test samples that were correctly classified by the corresponding $D^2NN$ designs (refer to FIGS. 32A and 32D for the classification accuracy of each design). These results clearly indicate that increasing the number of diffractive substrate layers 16 has significant positive impact on the optical efficiency of a $D^2NN$ 10, regardless of the loss function choice. The maximum efficiency that a 5-layer phase-only $D^2NN$ design based on the SCE loss function can achieve is 1.98% for MNIST and 0.56% for Fashion-MNIST datasets, which are significantly lower compared to the efficiency values that diffractive networks designed with MSE loss function can achieve, i.e., 25.07% for MNIST and 26.00% for Fashion-MNIST datasets (see FIGS. 32B and 32E). Stated differently, MSE loss function based $D^2NNs$ 10 are in general significantly more power efficient in all-optical machine learning systems.

Figure 32C:
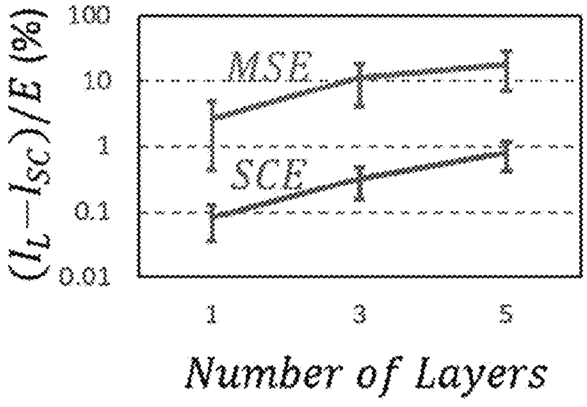
FIG. 32C is a graph showing the signal contrast analysis of MSE and SCE loss function based all-optical phase-only $D^2NN$ classifier designs with 1, 3 and 5-layers. The final design of the $D^2NN$ (fully-connected, phase-only) trained for handwritten digits (MNIST).
Figure 32F:
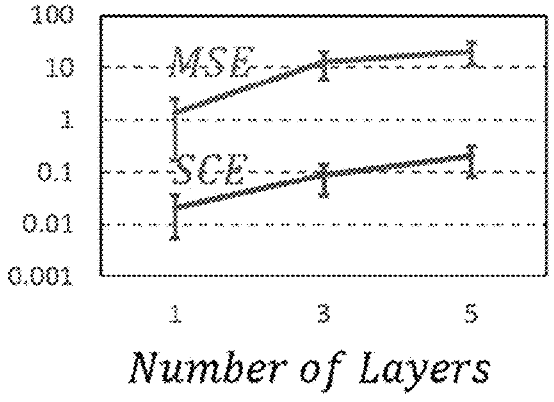
FIG. 32F is a graph showing the signal contrast analysis of MSE and SCE loss function based all-optical phase-only $D^2NN$ classifier designs with 1, 3 and 5-layers. The final design of the $D^2NN$ (fully-connected, phase-only) trained for fashion products in the Fashion-MNIST dataset.

Next the signal contrast of diffractive neural networks was analyzed, which was defined as the difference between the optical signal captured by the target detector ($I_L$) corresponding to the correct data class and the maximum signal detected by the rest of the detectors (i.e., the strongest competitor ($I_{SC}$) detector for each test sample), normalized with respect to the total optical signal at the output plane (E). The results of the signal contrast analysis are reported in FIGS. 32C and 32F for MNIST and Fashion-MNIST datasets, respectively, which reveal that $D^2NNs$ designed with an MSE loss function keep a strong margin between the target detector ($I_L$) and the strongest competitor detector (among the rest of the detectors) at the output plane of the all-optical network. The minimum mean signal contrast value observed for an MSE-based $D^2NN$ design was for a 1-Layer, phase-only diffractive design, showing a mean signal contrast of 2.58% and 1.37% for MNIST and Fashion-MNIST datasets, respectively. Changing the loss function to SCE lowers the overall signal contrast of diffractive neural networks as shown in FIGS. 32C and 32F.

Comparing the performances of MSE-based and SCE-based $D^2NN$ designs in terms of classification accuracy, power efficiency and signal contrast, as depicted in FIGS. 32A-32F, two opposite design strategies are identified in diffractive all-optical neural networks. MSE, being a strict loss function acting in the physical space (e.g., FIGS. 29D and 29I), promotes high signal contrast and power efficiency of the diffractive system, while SCE, being much less restrictive in its output light distribution (e.g., FIGS. 29E and 29J), enjoys more degrees-of-freedom to improve its inference performance for getting better classification accuracy, at the cost of a reduced overall power efficiency and signal contrast at its output plane.

Advantages of Multiple Diffractive Layers in $D^2NN$ Framework

As demonstrated in FIGS. 32A-32F, multiple diffractive layers that collectively operate within a $D^2NN$ design present additional degrees-of-freedom compared to a single diffractive layer to achieve better classification accuracy, as well as improved diffraction efficiency and signal contrast at the output plane of the network; the latter two are especially important for experimental implementations of all-optical diffractive networks as they dictate the required illumination power levels as well as signal-to-noise ratio related error rates for all-optical classification tasks. Stated differently, the $D^2NN$ 10, even when it is composed of linear optical materials, shows depth advantage because an increase in the number of diffractive layers (1) improves its statistical inference accuracy (see FIGS. 32A and 32D), and (2) improves its overall power efficiency and the signal contrast at the correct output detector with respect to the detectors assigned to other classes (see FIGS. 32B, 32C, 32E, 32F). Therefore, for a given input illumination power and detector signal-to-noise ratio, the overall error rate of the all-optical network 10 decreases as the number of diffractive substrate layers 16 increase. All these highlight the depth feature of a $D^2NN$ 10.

This is not in contradiction with the fact that, for an all-optical $D^2NN$ 10 that is made of linear optical materials, the entire diffraction phenomenon that happens between the input and output planes 20, 222 can be squeezed into a single matrix operation (in reality, every material exhibits some volumetric and surface nonlinearities, and what is meant here by a linear optical material is that these effects are negligible). In fact, such an arbitrary mathematical operation defined by multiple learnable diffractive layers cannot be performed in general by a single diffractive layer placed between the same input and output planes 20, 22; additional optical components/layers would be needed to all-optically perform an arbitrary mathematical operation that multiple learnable diffractive layers can in general perform. The $D^2NNs$ 10 creates a unique opportunity to use deep learning principles to design multiple diffractive substrate layers 16, within a very tight layer-to-layer spacing of less than 50×λ, that collectively function as an all-optical classifier, and this framework will further benefit from nonlinear optical materials and resonant optical structures to further enhance its inference performance.

In summary, the "depth" is a feature/property of a neural network, which means the network gets in general better at its inference and generalization performance with more layers. The mathematical origins of the depth feature for standard electronic neural networks relate to nonlinear activation function of the neurons. But this is not the case for a diffractive optical network since it is a different type of a network, not following the same architecture or the same mathematical formalism of an electronic neural network.

Connectivity in Diffractive Neural Networks

In the design of a $D^2NN$ 10, the layer-to-layer connectivity of the optical network is controlled by several parameters: the axial distance between the layers ($\Delta_Z$), the illumination wavelength (λ), the size of each fabricated neuron 24 and the width of the diffractive substrate layers 16. In numerical simulations, a neuron size of approximately 0.53×λ was used. In addition, the height and width of each diffractive substrate layer 16 was set to include 200×200=40K neurons 24 per layer. In this arrangement, if the axial distance between the successive diffractive layers is set to be ~40×λ, then the $D^2NN$ 10 becomes fully-connected. On the other hand, one can also design a much thinner and more compact diffractive network by reducing $\Delta_Z$ at the cost of limiting the connectivity between the diffractive substrate layers 16. To evaluate the impact of this reduction in network connectivity on the inference performance of a diffractive neural network 10, the performance of the $D^2NN$ 10 was tested using $\Delta_Z$=4×λ, i.e., 10-fold thinner compared to the earlier discussed diffractive networks. With this partial connectivity between the diffractive layers, the blind testing accuracy for a 5-layer, phase-only $D^2NN$ decreased from 97.18% ($\Delta_Z$=40×λ) to 94.12% ($\Delta_Z$=4×λ) for MNIST dataset (see FIGS. 30A and 30B, respectively). However, when the optical neural network with $\Delta_Z$=4×λ was relaxed from phase-only modulation constraint to full complex modulation, the classification accuracy increased to 96.01% (FIG. 30D), partially compensating for the lack of full-connectivity. Similarly, for Fashion-MNIST dataset, the same compact architecture with $\Delta_Z$=4×λ provided accuracy values of 85.98% and 88.54% for phase-only and complex-valued modulation schemes, as shown in FIGS. 31B and 31D, respectively, demonstrating the vital role of phase and amplitude modulation capability for partially-connected, thinner and more compact optical networks.

Figure 33A:
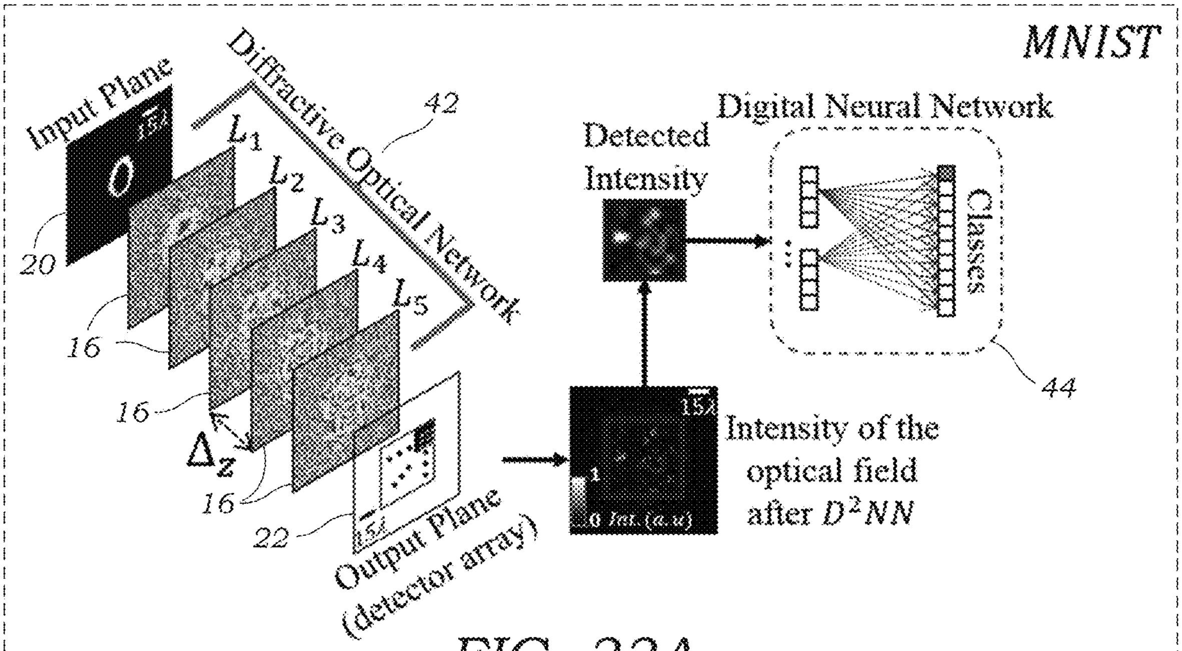
FIG. 33A illustrates the architecture of a hybrid (optical and electronic) classifier according to one embodiment. This embodiment was designed for the MNIST dataset. Input plane represents the plane of the input object or its data, which can also be generated by another optical imaging system or a lens, projecting an image of the object data onto this plane.
Figure 33B:
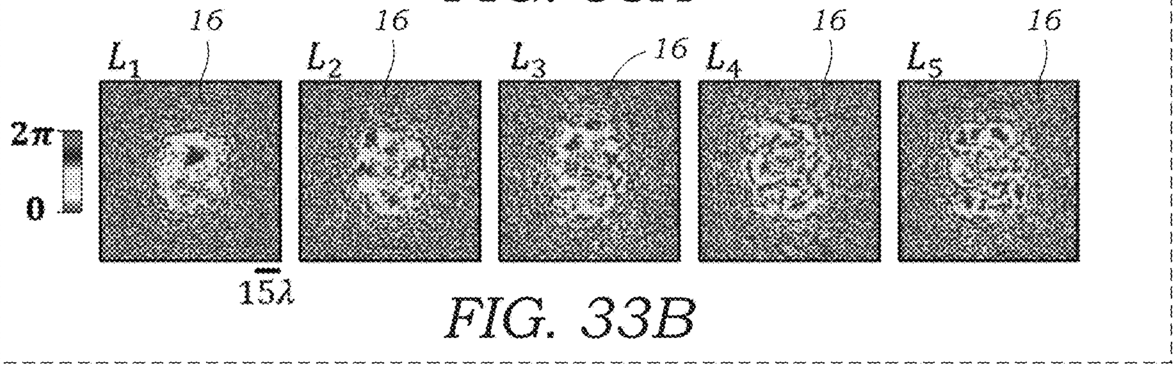
FIG. 33B illustrates the final design of phase-only optical layers ($\Delta_Z$=40×λ) at the front-end of a hybrid handwritten digit classifier with a 10×10 opto-electronic detector array at the bridge/junction between the two modalities (optical vs. electronic).
Figures 33C, 33D:
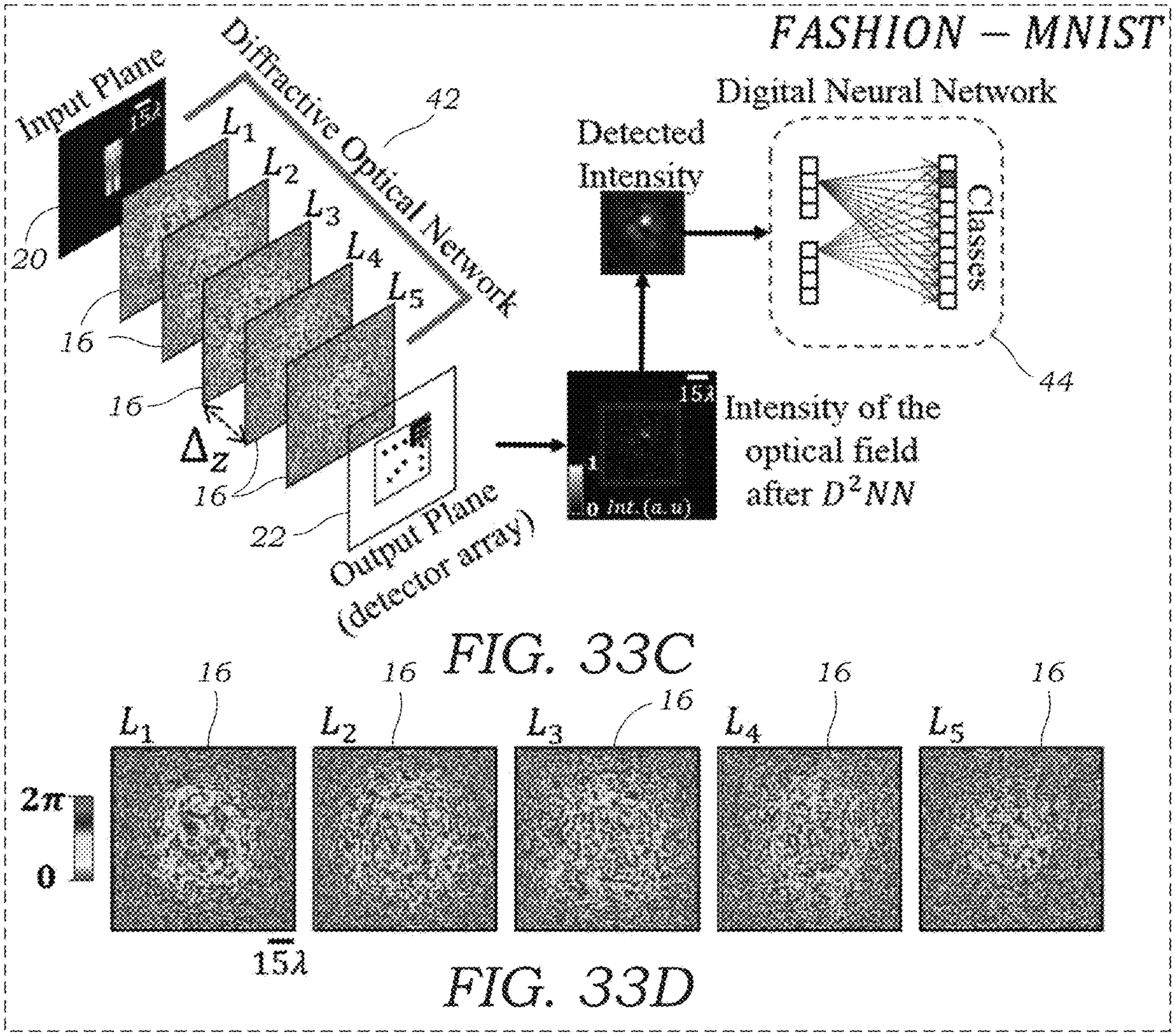
FIG. 33C illustrates the architecture of a hybrid (optical and electronic) classifier according to one embodiment. This embodiment was designed for the Fashion-MNIST dataset. Input plane represents the plane of the input object or its data, which can also be generated by another optical imaging system or a lens, projecting an image of the object data onto this plane.
FIG. 33D illustrates the final design of phase-only optical layers ($\Delta_Z$=40×λ) at the front-end of a hybrid handwritten digit classifier with a 10×10 opto-electronic detector array at the bridge/junction between the two modalities (optical vs. electronic).

Integration of Diffractive Neural Networks with Electronic Networks: Performance Analysis of $D^2NN$-Based Hybrid Machine Learning Systems Integration of passive diffractive neural networks with electronic neural networks (see e.g., FIGS. 9, 33A, and 33C) creates some unique opportunities to achieve pervasive and low-power machine learning systems that can be realized using simple and compact imagers, composed of e.g., a few tens to hundreds of pixels per optical sensor 26 (e.g., opto-electronic sensor frame). To investigate these opportunities, for both MNIST (Tables of FIG. 34) and Fashion-MNIST (Tables of FIG. 35) datasets, the all-optical $D^2NN$ front-end 42 (composed of 5 diffractive layers) was paired with five (5) different electronic neural networks considering various sensor resolution scenarios and parameters as depicted in Tables 1 and 2 below.

TABLE 1

| Digital Neural Networks | Trainable Parameters | FLOPs | Energy Consumption (J/image) | Detector Configuration |
|---|---|---|---|---|
| Single FC Layer | 1000 | 2000 | $1.5 \times 10^{-9}$ | 10 × 10 |
| | 6250 | 12500 | $9.5 \times 10^{-9}$ | 25 × 25 |
| | 25000 | 50000 | $3.8 \times 10^{-8}$ | 50 × 50 |
| 2C2F-1 | 615 | 3102 | $2.4 \times 10^{-9}$ | 10 × 10 |
| | 825 | 9048 | $7.0 \times 10^{-9}$ | 25 × 25 |
| | 3345 | 43248 | $3.3 \times 10^{-8}$ | 50 × 50 |
| LeNet | 60840 | $1 \times 10^6$ | $7.5 \times 10^{-7}$ | 10 × 10 |
| | | | | 25 × 25 |
| | | | | 50 × 50 |
| 2C2F-64 | $3.3 \times 10^5$ | $3.1 \times 10^6$ | $2.4 \times 10^{-6}$ | 10 × 10 |
| | $2.4 \times 10^6$ | $2.5 \times 10^7$ | $1.9 \times 10^{-5}$ | 25 × 25 |
| | $9.5 \times 10^6$ | $8.7 \times 10^7$ | $6.5 \times 10^{-5}$ | 50 × 50 |
| ResNet | $25.5 \times 10^6$ | $4 \times 10^9$ | $3 \times 10^{-3}$ | 50 × 50 |

TABLE 2

| | Network architecture Layer Type | | | | | | | |
|---|---|---|---|---|---|---|---|---|
| | Conv layer 1 | | | Conv layer 2 | | | FC layer 1 | FC layer 2 |
| | Activation | | | | | | | |
| | ReLU | | | ReLU | | | ReLU | Softmax |
| Detector configuration | kernel | Feature map | Stride | kernel | Feature map | Stride | Number of neurons | Number of neurons |
| 10 × 10 | 6 × 6 | 1 | 1 | 3 × 3 | | 1 | 30 | 10 |
| 25 × 25 | | | 2 | | 1 | 2 | | |
| 50 × 50 | | | 2 | | | 2 | | |

For the electronic neural networks that were considered in this analysis, in terms of complexity and the number of trainable parameters, a single fully-connected (FC) digital layer and a custom designed 4-layer convolutional neural network (CNN) (referred to it as 2C2F-1 due to the use of 2 convolutional layers with a single feature and subsequent 2 FC layers) represent the lower end of the spectrum (see Tables 1, 2); on the other hand, LeNet, ResNet-50 and another 4-layer CNN (referred to as 2C2F-64 pointing to the use of 2 convolutional layers, subsequent 2 FC layers and 64 high-level features at its second convolutional layer) represent some of the well-established and proven deep neural networks with more advanced architectures and considerably higher number of trainable parameters (see Table 2). All these digital networks used in the analysis, were individually placed after both a fully-connected ($\Delta_Z$=40×λ) and a partially-connected ($\Delta_Z$=4×λ) $D^2$NN front-end 42 and the entire hybrid system 40 in each case was jointly optimized at the second stage of the hybrid system training procedure.

Among the all-optical $D^2$NN-based classifiers presented in the previous sections, the fully-connected ($\Delta_Z$=40×λ) complex modulation $D^2$NNs 10 have the highest classification accuracy values, while the partially-connected ($\Delta_Z$=4×λ) designs with phase-only restricted modulation are at the bottom of the performance curve (see the all-optical parts of FIGS. 34 and 35). Comparing the all-optical classification results based on a simple max operation at the output detector plane against the first rows of the "Hybrid Systems" sub-tables reported in FIGS. 34 and 35, one can conclude that the addition of a single FC layer (using 10 detectors), jointly-optimized with the optical part, can make up for some of the limitations of the $D^2$NN optical front-end 42 design such as partial connectivity or restrictions on the neuron modulation function.

The $2^{nd}$, $3^{rd}$ and $4^{th}$ rows of the "Hybrid Systems" sub-tables in FIGS. 34 and 35 illustrate the classification performance of hybrid systems when the interface between the optical and electronic networks is a conventional focal plane array (such as a CCD or CMOS sensor array). The advantages of the $D^2$NN front-end 42 become more apparent for these cases, compared against traditional systems that have a conventional imaging optics-based front-end (e.g., a standard camera interface) followed by a digital neural network for which the classification accuracies are also provided at the bottom of the Imaging Optics tables in FIGS. 34 and 35. From these comparisons reported in the tables of FIGS. 34 and 35, one can deduce that having a jointly-trained optical and electronic network improves the inference performance of the overall system using low-end electronic neural networks as in the cases of a single FC network and 2C2F-1 network. Table 1 above shows a comparison of the digital neural networks employed in terms of (1) the number of trainable parameters, (2) FLOPs, and (3) energy consumption. For example, when the 2C2F-1 network is used as the digital processing unit following a perfect imaging optics, the classification accuracies for MNIST (Fashion-MNIST) dataset are held as 89.73% (76.83%), 95.50% (81.76%) and 97.13% (87.11%) for 10×10, 25×25 and 50×50 detector arrays, respectively. However, when the same 2C2F-1 network architecture is enabled to jointly-evolve with e.g., the phase-only diffractive layers in a $D^2$NN front-end 42 during the training phase, blind testing accuracies for MNIST (Fashion-MNIST) dataset significantly improve to 98.12% (89.55%), 97.83% (89.87%) and 98.50% (89.42%) for 10×10, 25×25 and 50×50 detector arrays, respectively. The classification performance improvement of the jointly-optimized hybrid system (diffractive+electronic network) over a perfect imager-based simple all-electronic neural network (e.g., 2C2F-1) is especially significant for 10×10 detectors (i.e., ~8.4% and ~12.7% for MNIST and Fashion-MNIST datasets, respectively). Similar performance gains are also achieved when single FC network is jointly-optimized with a $D^2$NN front-end 42 instead of a perfect imaging optics/camera interface, preceding the all-electronic network as detailed in FIGS. 34 and 35. In fact, for some cases the classification performance of $D^2$NN-based hybrid systems 40, e.g. 5-layer, phase-only $D^2$NN front-end 42 followed by a single FC layer 44 using any of the 10×10, 25×25 and 50×50 detectors arrays, shows a classification performance on par with a perfect imaging system that is followed by a more powerful, and energy demanding LeNet architecture (see Table 1).

Among the three (3) different detector array arrangements that were investigated, 10×10 detectors represent the case where the intensity on the opto-electronic sensor plane is severely undersampled. Therefore, the case of 10×10 detectors represents a substantial loss of information for the imaging-based scenario (note that the original size of the objects 14 in both image datasets is 28×28). This effect is especially apparent in results illustrated in FIG. 35, for Fashion-MNIST, which represents a more challenging dataset for object classification task, in comparison to MNIST. According to the table in FIG. 35, for a computer vision system with a perfect camera interface and imaging optics preceding the opto-electronic sensor array, the degradation of the classification performance due to spatial undersampling varies between 3% to 5% depending on the choice of the electronic network. However, jointly-trained hybrid systems 40 involving trainable diffractive layers maintain their classification performance even with ~7.8 times reduced number of input pixels (i.e., 10×10 pixels compared to the raw data, 28×28 pixels). For example, the combination of a fully-connected (40×λ layer-to-layer distance) $D^2$NN optical front-end 42 with 5 phase-only (complex) diffractive substrate layers 16 followed by LeNet back-end 44 provides 90.24% (90.24%) classification accuracy for fashion products using a 10×10 detector array, which shows improvement compared to 87.44% accuracy that LeNet alone provides following a perfect imaging optics, camera interface. A similar trend is observed for all the jointly-optimized $D^2$NN-based hybrid systems 40, providing 3-5% better classification accuracy compared to the performance of all-electronic neural networks following a perfect imager interface with 10×10 detectors. Considering the importance of compact, thin and low-power designs, such $D^2$NN-based hybrid systems 40 with significantly reduced number of opto-electronic pixels and an ultra-thin all-optical $D^2$NN front-end 42 with a layer-to-layer distance of a few wavelengths cast a highly sought design to extend the applications of jointly-trained opto-electronic machine learning systems to various fields, without sacrificing their performance.

On the other hand, for designs that involve higher pixel counts and more advanced electronic neural networks (with higher energy and memory demand), the results reveal that $D^2$NN based hybrid systems 40 perform worse compared to the inference performance of perfect imager-based computer vision systems. For example, based on table date of FIGS. 34 and 35 one can infer that using ResNet as the electronic neural network of the hybrid system with 50×50 pixels, the discrepancy between the two approaches ($D^2$NN vs. perfect imager based front-end choices) is ~0.5% and ~4% for MNIST and Fashion-MNIST datasets, respectively, in favor of the perfect imager front-end. It is believed that this inferior performance of the jointly-optimized $D^2$NN-based hybrid system 40 (when higher pixel counts and more advanced electronic networks are utilized) is related to sub-optimal convergence of the diffractive layers in the presence of a powerful electronic neural network that is by and large determining the overall loss of the jointly-optimized hybrid network during the training phase. In other words, considering the lack of non-linear activation functions within the $D^2$NN substrate layers 16, a powerful electronic neural network at the back-end 44 hinders the evolution of the optical front-end during training phase due to its relatively superior approximation capability. Some of the recent efforts in the literature to provide a better understanding of the inner workings of convolutional neural networks might be used to devise more efficient learning schemes to overcome this "shadowing" behavior in order to improve the inference performance of the jointly-optimized $D^2NN$-based hybrid systems. It should be noted that the fundamental design principles and methods behind diffractive optical networks to operate under spatially and/or temporally incoherent illumination may also be applied to incoherent ambient light conditions, as most computer vision systems of today rely on this.

Methods

Diffractive Neural Network Architecture

In the diffractive neural network model, the input plane represents the plane of the input object or its data, which can also be generated by another optical imaging system or a lens, e.g., by projecting an image of the object data. Input objects were encoded in amplitude channel (MNIST) or phase channel (Fashion-MNIST) of the input plane and were illuminated with a uniform plane wave at a wavelength of λ for all-optical classification. In the hybrid system simulations, on the other hand, the objects in both datasets were represented as amplitude objects at the input plane, providing a fair comparison between the two tables of FIGS. 34 and 35. A hybrid system performance comparison table for phase channel encoded Fashion-MNIST data is also illustrated in FIG. 37.

Optical fields at each plane of a diffractive network were sampled on a grid with a spacing of ~0.53λ in both x and y directions. Between two diffractive layers, the free-space propagation was calculated using the angular spectrum method. Each diffractive layer, with a neuron size of 0.53λ×0.53λ, modulated the incident light in phase and/or amplitude, where the modulation value was a trainable parameter and the modulation method (phase-only or complex) was a pre-defined design parameter of the network. The number of layers and the axial distance from the input plane to the first diffractive layer, between the successive diffractive layers, and from the last diffractive layer to the detector plane were also pre-defined design parameters of each network. At the detector plane, the output field intensity was calculated.

Forward Propagation Model

Forward propagation was modeled as described previously herein.

Training Loss Function

To perform classification by means of all-optical diffractive networks with minimal post-processing (i.e., using only a max operation), discrete detectors were placed at the output plane. The number of detectors (D) is equal to the number of classes in the target dataset. The geometrical shape, location and size of these detectors (6.4λ×6.4λ) were determined before each training session. Having set the detectors at the output plane, the final loss value (L) of the diffractive neural network is defined through two different loss functions and their impact on $D^2NN$ based classifiers were explored. The first loss function was defined using the mean squared error (MSE) between the output plane intensity, $S^{l+1}$, and the target intensity distribution for the corresponding label, $G^{l+1}$, i.e., $$L = \frac{1}{K}\sum_{i}^{K}(S_i^{l+1} - G_i^{l+1})^2, \tag{16}$$

where K refers to the total number of sampling points representing the entire diffraction pattern at the output plane.

The second loss function used in combination with the all-optical $D^2NN$ 10 is the cross-entropy. To use the cross-entropy loss function, an additional softmax layer is introduced and applied on the detected intensities (only during the training phase of a diffractive neural network design). Since softmax function is not scale invariant, the measured intensities by D detectors at the output plane are normalized such that they lie in the interval (0,10) for each sample. With $I_l$ denoting the total optical signal impinging onto the $l^{th}$ detector at the output plane, the normalized intensities, $I'_l$, can be found by, $$I_l' = \frac{I_l}{\max\{I_l\}} \times 10. \tag{17}$$

In parallel, the cross-entropy loss function can be written as follows:

$$L = -\Sigma_l^D g_l \log(p_l), \tag{18}$$

where $$p_l = \frac{e^{I_l'}}{\sum_l^D e^{I_l'}}$$

and $g_l$ refer to the $l^{th}$ element in the output of the softmax layer, and the $l^{th}$ element of the ground truth label vector, respectively.

A key difference between the two loss functions is already apparent from eq. (16) and eq. (18). While the MSE loss function is acting on the entire diffraction signal at the output plane of the diffractive network, the softmax-cross-entropy is applied to the detected optical signal values ignoring the optical field distribution outside of the detectors (one detector is assigned per class). This approach based on softmax-cross-entropy loss brings additional degrees-of-freedom to the diffractive neural network training process, boosting the final classification performance, at the cost of reduced diffraction efficiency and signal contrast at the output plane. For both the imaging optics-based and hybrid ($D^2NN$+electronic) classification systems presented in the tables of FIGS. 34 and 35, the loss functions were also based on softmax-cross-entropy.

Diffractive Network Training

All neural networks (optical and/or digital) were simulated using Python (v3.6.5) and TensorFlow (v1.10.0, Google Inc.) framework. All-optical, hybrid and electronic networks were trained for 50 epochs using a desktop computer with a GeForce GTX 1080 Ti Graphical Processing Unit, GPU and Intel® Core™ i9-7900X CPU @3.30 GHz and 64 GB of RAM, running Windows 10 operating system (Microsoft).

Two datasets were used in the training of the presented classifiers: MNIST and Fashion-MNIST. Both datasets have 70,000 objects/images, out of which 55,000 and 5,000 were selected as training and validation sets, respectively. A remaining 10,000 were reserved as the test set. During the training phase, after each epoch the performance of the current model in hand was tested on the 5K validation set and upon completion of the $50^{th}$ epoch, the model with the best performance on 5K validation set was selected as the final design of the network models. All the numbers reported herein are blind testing accuracy results held by applying these selected models on the 10K test sets.

The trainable parameters in a diffractive neural network are the modulation values of each layer, which were optimized using a back-propagation method by applying the adaptive moment estimation optimizer (Adam) with a learning rate of $10^{-3}$. A diffractive layer size of 200×200 neurons 24 per substrate layer 16 was chosen, which were initialized with π for phase values and 1 for amplitude values. The training time was approximately 5 hours for a 5-layer $D^2NN$ design with the hardware outlined above.

$D^2NN$-Based Hybrid Network Design and Training

To further explore the potentials of $D^2NN$ framework, diffractive network layers were co-trained together with digital neural networks to form hybrid systems. In these systems, the detected intensity distributions at the output plane 22 of the diffractive network 42 were taken as the input for the digital neural network 44 at the back-end of the system. To begin with, keeping the optical architecture and the detector arrangement at the output plane of the diffractive network same as in the all-optical case, a single fully-connected layer was introduced as an additional component (replacing the simplest max operations in an all-optical network), which maps the optical signal values coming from D individual detectors into a vector of the same size (i.e., the number of classes in the dataset). Since there are 10 classes in both MNIST and Fashion-MNIST datasets, this simple fully-connected digital structure brings additional 110 trainable variables (i.e., 100 coefficients in the weight matrix and 10 bias terms) into the hybrid system 40.

Figure 38A:
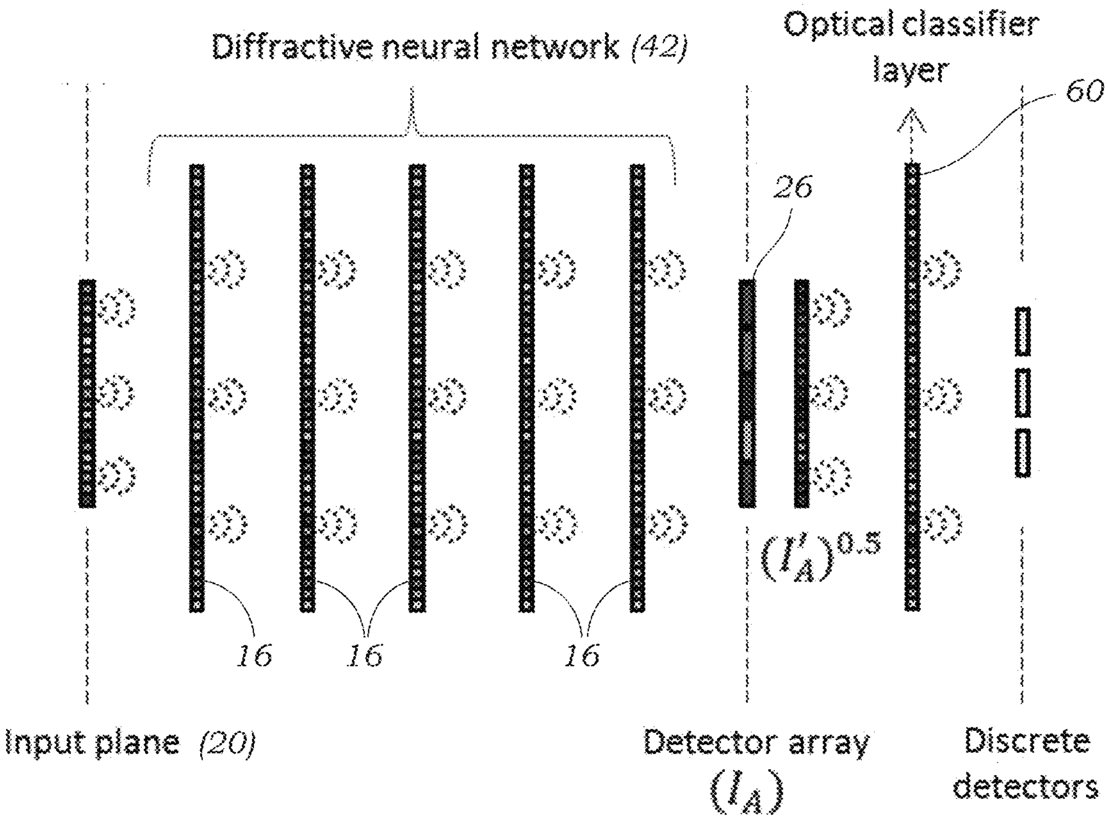
FIGS. 38A and 38B illustrate the hybrid system training process.
Figure 38B:
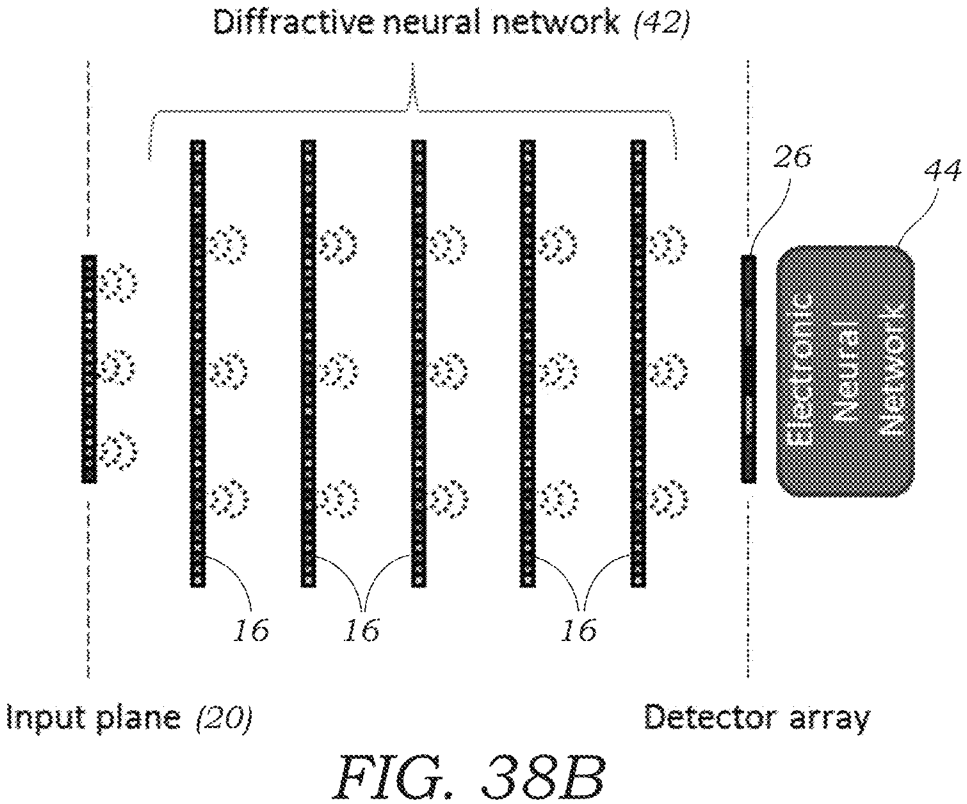

Hybrid configurations that pair $D^2NNs$ with CNNs were also assessed, a more popular architecture than fully-connected networks for object classification tasks. In such an arrangement, when the optical and electronic parts are directly cascaded and jointly-trained, the inference performance of the overall hybrid system was observed to stagnate at a local minimum (see FIGS. 36 and 37). As a possible solution to this issue, the training of the hybrid systems was divided into two stages as shown in FIGS. 38A and 38B. In the first stage, the detector array 26 was placed right after the $D^2NN$ optical front-end 42, which was followed by an additional, virtual optical layer 60, acting as an all-optical classifier (FIG. 38A). It should be emphasized that this additional optical layer 60 is not part of the hybrid system at the end; instead it will be replaced by a digital neural network 44 in the second stage of the training process. The sole purpose of two-stage training arrangement used for hybrid systems is to find a better initial condition for the $D^2NN$ 42 that precedes the detector array 26, which is the interface between the fully optical and electronic networks.

In the second stage of the training process, the already trained 5-layer $D^2NN$ optical front-end 42 (preceding the detector array 26) was cascaded and jointly-trained with a digital neural network 44. It is important to note that the digital neural network in this configuration was trained from scratch. This type of procedure "resembles" transfer learning, where the additional layers (and data) are used to augment the capabilities of a trained model. Using the above described training strategy, the impact of different configurations was studied, by increasing the number of detectors forming an opto-electronic detector array 26, with a size of 10×10, 25×25 and 50×50 pixels. Having different pixel sizes (see Table 1), all the three configurations (10×10, 25×25 and 50×50 pixels) cover the central region of approximately 53.3λ×53.3λ at the output plane of the $D^2NN$ 42. Note that each detector configuration represents different levels of spatial undersampling applied at the output plane 22 of a $D^2NN$ 42, with 10×10 pixels corresponding to the most severe case. For each detector configuration, the first stage of the hybrid system training, shown in FIG. 38A, was carried out for 50 epochs providing the initial condition for 5-layer $D^2NN$ design before the joint-optimization phase at the second stage. These different initial optical front-end designs along with their corresponding detector configurations were then combined and jointly-trained with various digital neural network architectures, simulating different hybrid systems (see FIG. 38B and FIG. 33C). At the interface of optical and electronic networks, a batch normalization layer was introduced and applied on the detected intensity distributions at the sensor 26.

For the digital part, five different networks were analyzed representing different levels complexity regarding (1) the number of trainable parameters, (2) the number of FLOPs in the forward model and (3) the energy consumption; see Table 1. This comparative analysis depicted in Table 1 on energy consumption assumes that 1.5 pJ is needed for each multiply-accumulate (MAC) and based on this assumption, the $4^{th}$ column of Table 1 reports the energy needed for each network configuration to classify an input image. The first one of these digital neural networks was selected as a single fully-connected (FC) network connecting every pixel of detector array with each one of the 10 output classes, providing as few as 1,000 trainable parameters (see Table 1 for details). The 2C2F-1 network was used as a custom designed CNN with 2 convolutional and 2 FC layers with only a single filter/feature at each convolutional layer (see Table 2). As the $3^{rd}$ network, LeNet was used which requires a certain input size of 32×32 pixels, thus the detector array values were resized using bilinear interpolation before being fed into the electronic neural network. The fourth network architecture that was used in the comparative analysis (i.e., 2C2F-64), as described in (https://www.tensorflow.org/tutorials/estimators/cnn), has 2 convolutional and 2 fully-connected layers similar to the second network, but with 32 and 64 features at the first and second convolutional layers, respectively, and has larger FC layers compared to the 2C2F-1 network. The last network choice was ResNet-50 with 50 layers, which was only jointly-trained using the 50×50 pixel detector configuration, the output of which was resized using bilinear interpolation to 224×224 pixels before being fed into the network. The loss function of the $D^2NN$-based hybrid system was calculated by cross-entropy, evaluated at the output of the digital neural network.

As in $D^2NN$-based hybrid systems, the objects were assumed to be purely amplitude modulating functions for perfect imager-based classification systems presented in the tables of FIGS. 34 and 35; moreover, the imaging optics or the camera system preceding the detector array is assumed to be diffraction limited which implies that the resolution of the captured intensity at the detector plane is directly limited by the pixel pitch of the detector array. The digital network architectures and training schemes were kept identical to $D^2NN$-based hybrid systems to provide a fair comparison. Also, worth noting, no data augmentation techniques were used for any of the networks.

The main reason behind the development of the two-stage training procedure stems from the unbalanced nature of the $D^2NN$-based hybrid systems, especially if the electronic part of the hybrid system is a powerful deep convolutional neural network (CNN) such as ResNet. Being the more powerful of the two and the latter in the information processing order, deep CNNs adapt and converge faster than $D^2NN$-based optical front-ends. Therefore, directly cascading and jointly-training $D^2$NNs with deep CNNs offer a suboptimal solution on the classification accuracy of the overall hybrid system. In this regard, the tables in FIGS. 36 and 37 illustrate examples of such a direct training approach. Specifically, the table of FIG. 36 contains blind testing accuracy results for amplitude channel encoded handwritten digits when $D^2$NN-based optical front-end and electronic networks were directly cascaded and jointly-trained. The table of FIG. 37, on the other hand, shows the testing accuracy results for fashion-products which are encoded in the phase channel at the input plane.

FIGS. 38A and 38B illustrate the two-step training procedure which was used for the results reported in tables of FIGS. 34 and 35. In the first step, the detector array model is introduced that is going to be the interface between the optical and the electronic networks. An additional virtual diffractive layer 60 is placed right after the detector plane (see FIG. 38A). The detector array is modeled as an intensity sensor (discarding the phase information). Implementing such a detector array model with an average pooling layer which has strides as large as its kernel size on both directions, the detected intensity, $I_A$, is held at the focal plane array. In simulations, the size of $I_A$ was 10×10, 25×25 or 50×50, depending on the choice of the detector array used in the design. To further propagate this information through the virtual 1-Layer optical classifier (FIG. 38A), $I_A$ is interpolated using the nearest neighbour method back to the object size at the input plane. Denoting this interpolated intensity as $I'_A$, the propagated field is given by $\sqrt{I'_A}$. It is important to note that the phase information at the output plane of the $D^2$NN preceding the detector array is entirely discarded, thus the virtual classifier decides solely based on the measured intensity (or underlying amplitude) as it would be the case for an electronic network.

After training this model for 50 epochs, the layers of the diffractive network preceding the detector array 26 are taken as the initial condition for the optical part in the second stage of the training process (see FIG. 38B). Starting from the parameters of these diffractive layers, the second stage of the training simply involves the simultaneous training of a $D^2$NN-based optical part 42 and an electronic network 44 at the back-end of the detector array 26 bridging two modalities as shown in FIG. 38B. In this second part of the training, the detector array model is kept identical with the first part and the electronic neural network is trained from scratch with optical and electronic parts having equal learning rates ($10^{-3}$).

While embodiments of the present invention have been shown and described, various modifications may be made without departing from the scope of the present invention. The drawings may refer to various dimensions such as spacing between substrate layers 16. Such dimensional information is for explanatory purposes and should not limited the scope of the invention. In addition, features of one specific embodiment may be used in another embodiment even though no explicitly described herein. For example, optically reflective substrates 16 may be combined with optically transmissive substrates 16 in some embodiments. Likewise, the electronic network 44 back-end may be used in conjunction with a reflective embodiment like disclosed in FIG. 2 as well as mixed transmissive/reflective embodiments. The invention, therefore, should not be limited, except to the following claims, and their equivalents.

What is claimed is:

1. An all-optical diffractive deep neural network device comprising:

a plurality of optically transmissive substrate layers arranged in an optical path, each of the plurality of optically transmissive substrate layers comprising a plurality of physical features formed on or within the plurality of optically transmissive substrate layers and having different complex-valued transmission coefficients as a function of lateral coordinates across each substrate layer, wherein the plurality of optically transmissive substrate layers and the plurality of physical features thereon collectively define a trained mapping function between an input optical image or input optical signal to the plurality of optically transmissive substrate layers and an output optical image or output optical signal created by optical diffraction through the plurality of optically transmissive substrate layers; and one or more optical sensors configured to capture the output optical image or output optical signal resulting from the plurality of optically transmissive substrate layers.

2. The all-optical diffractive deep neural network device of claim 1, wherein plurality of optically transmissive substrate layers are separated from one another by a gap.

3. The all-optical diffractive deep neural network device of claim 1, wherein plurality of optically transmissive substrate layers are formed as a monolithic 3D structure.

4. The all-optical diffractive deep neural network device of claim 1, wherein each optically transmissive substrate layer defines a planar or non-planar surface.

5. The all-optical diffractive deep neural network device of claim 1, wherein plurality of optically transmissive substrate layers are mounted or held within a holder.

6. The all-optical diffractive deep neural network device of claim 5, wherein plurality of optically transmissive substrate layers are removable from the holder.

7. The all-optical diffractive deep neural network device of claim 1, wherein the plurality of physical features of the plurality of optically transmissive substrate layers are formed by additive manufacturing.

8. The all-optical diffractive deep neural network device of claim 1, wherein the plurality of physical features of the plurality of optically transmissive substrate layers are lithographically formed.

9. The all-optical diffractive deep neural network device of claim 1, wherein the plurality of physical features comprises an array of neurons formed on or in the optically transmissive substrate layers.

10. The all-optical diffractive deep neural network device of claim 1, wherein the plurality of physical features comprises an array of neurons formed on or in an optically non-linear material that forms the optically transmissive substrate layers.

11. The all-optical diffractive deep neural network device of claim 1, wherein the trained mapping function comprises a classification function that classifies the input optical image or input optical signal into one of a plurality of classifications or tags.

12. The all-optical diffractive deep neural network device of claim 11, wherein the classification or tag of the input optical image or input optical signal is determined based on the location and/or distribution of the optical output image or output optical signal on the image sensor(s) or the photodetectors.

13. The all-optical diffractive deep neural network device of claim 11, wherein the input optical image or input optical signal comprises one or more objects and the plurality of classifications or tags comprise object shape, object type, or object identification.

14. The all-optical diffractive deep neural network device of claim 1, wherein the trained mapping function comprises an imaging function, acting on the phase and/or amplitude channels of the input optical image or the input optical signal.

15. The all-optical diffractive deep neural network device of claim 1, wherein the trained mapping function is generated using deep neural network software trained using a set of training images or data.

16. The all-optical diffractive deep neural network device of claim 15, wherein the trained mapping function comprises the physical locations and the transmission coefficients including both phase and amplitude of an array of neurons formed by the plurality of physical features of the plurality of optically transmissive substrate layers.

17. An all-optical diffractive deep neural network device comprising:

a plurality of optically reflective substrate layers arranged along an optical path, each of the plurality of optically reflective substrate layers comprising a plurality of physical features formed on or within the plurality of optically reflective substrate layers, wherein the plurality of optically reflective substrate layers and the plurality of physical features collectively define a trained mapping function between an input optical image or input optical signal to the plurality of optically reflective substrate layers and an output optical image or output optical signal from the plurality of optically reflective substrate layers; and one or more optical sensors configured to capture the output optical image or output optical signal from the plurality of optically reflective substrate layers.

18. The all-optical diffractive deep neural network device of claim 17, wherein each optically reflective substrate layer defines a planar or non-planar surface.

19. The all-optical diffractive deep neural network device of claim 17, wherein the plurality of physical features of the plurality of optically reflective substrate layers are formed by additive manufacturing.

20. The all-optical diffractive deep neural network device of claim 17, wherein the plurality of physical features of the plurality of optically reflective substrate layers are lithographically formed.

21. The all-optical diffractive deep neural network device of claim 17, wherein the plurality of physical features comprises an array of neurons formed on or in the optically reflective substrate layers.

22. The all-optical diffractive deep neural network device of claim 17, wherein the plurality of physical features comprises an array of neurons formed on or in an optically non-linear material that forms the optically reflective substrate layers.

23. The all-optical diffractive deep neural network device of claim 17, wherein the trained mapping function comprises a classification function that classifies the input optical image or input optical signal into one of a plurality of classifications or tags.

24. The all-optical diffractive deep neural network device of claim 23, wherein the classification or tag of the input optical image or input optical signal is determined based on the location and/or distribution of the optical output image or output optical signal on the image sensor(s) or the photodetectors.

25. The all-optical diffractive deep neural network device of claim 23, wherein the input optical image or input optical signal comprises one or more objects and the plurality of classifications or tags comprise object shape, object type, or object identification.

26. The all-optical diffractive deep neural network device of claim 17, wherein the trained mapping function comprises an imaging function acting on the phase and/or amplitude channels of the input optical signal or image.

27. The all-optical diffractive deep neural network device of claim 17, wherein the trained mapping function is generated using deep neural network software trained using a set of training images or data.

28. The all-optical diffractive deep neural network device of claim 17, wherein the trained mapping function comprises the physical locations and the transmission coefficients including both phase and amplitude of an array of neurons formed by the plurality of physical features of the plurality of optically reflective substrate layers.

29. An all-optical diffractive deep neural network device comprising:

a plurality of substrate layers positioned along an optical path, the plurality of substrate layers comprising one or more optically reflective substrate layers and one or more optically transmissive substrate layers comprising a plurality of physical features formed on or within the respective optically reflective substrate layer(s) and optically transmissive substrate layer(s), wherein the plurality of substrate layers collectively define a trained mapping function between an input optical image or input optical signal to the plurality of substrate layers and an output optical image or output optical signal from the plurality of substrate layers; and one or more optical sensors configured to capture the output optical image or output optical signal from the plurality of substrate layers.

30. An all-optical diffractive deep neural network device comprising:

a plurality of substrate layers positioned along an optical path, the plurality of substrate layers comprising one or more optically reflective substrate layers and/or optically transmissive substrate layers comprising a plurality of physical features formed on or within the respective optically reflective substrate layer(s) and/or optically transmissive substrate layer(s), at least one of the plurality of substrate layers comprising spatial light modulator(s) therein or thereon, wherein the plurality of substrate layers collectively define a trained mapping function between an input optical image or input optical signal to the plurality of substrate layers and an output optical image or output optical signal from the plurality of substrate layers; and one or more optical sensors configured to capture the output optical image or output optical signal from the plurality of substrate layers.

31. The all-optical diffractive deep neural network device of claim 30, wherein the spatial light modulator(s) are formed in one or more of the optically reflective substrate layers.

32. The all-optical diffractive deep neural network device of claim 30, wherein the spatial light modulator(s) are formed in or more of the optically transmissive substrate layers.

* * * * *